(12) United States Patent
Komaki et al.

(10) Patent No.: US 8,124,908 B2
(45) Date of Patent: Feb. 28, 2012

(54) LASER WELDING METHOD, LASER-WELDED JOINT, OUTSIDE SHEATHING PANEL, AND BODY STRUCTURE FOR ROLLING STOCK

(75) Inventors: Osamu Komaki, Akashi (JP); Toshiyuki Hirashima, Kobe (JP); Takayuki Murata, Akashi (JP); Takeo Marutani, Kobe (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 1298 days.

(21) Appl. No.: 11/596,834

(22) PCT Filed: Apr. 12, 2005

(86) PCT No.: PCT/JP2005/007076
§ 371 (c)(1),
(2), (4) Date: Jan. 30, 2007

(87) PCT Pub. No.: WO2005/110663
PCT Pub. Date: Nov. 24, 2005

(65) Prior Publication Data
US 2007/0214998 A1    Sep. 20, 2007

(30) Foreign Application Priority Data

May 18, 2004 (JP) ................. 2004-147598
Jul. 13, 2004 (JP) ................. 2004-206390

(51) Int. Cl.
*B23K 26/00* (2006.01)
*B23K 9/00* (2006.01)
(52) U.S. Cl. .................. 219/121.6; 219/136

(58) Field of Classification Search .. 219/121.6–121.86, 219/85.1, 85.12, 85.13, 136, 137 R
See application file for complete search history.

(56) References Cited

U.S. PATENT DOCUMENTS

| 3,400,449 A | * | 9/1968 | Maguire et al. ............... 228/150 |
| 3,445,630 A | * | 5/1969 | Ulam ............................. 219/438 |
| 4,337,708 A |   | 7/1982 | Peterson |
| 4,462,629 A |   | 7/1984 | Todori et al. |
| 5,343,010 A | * | 8/1994 | Urech ............................ 219/83 |

(Continued)

FOREIGN PATENT DOCUMENTS

EP    0761375    3/1997
(Continued)

OTHER PUBLICATIONS

ESA European Patent Office, Supplementary European Search Report of EP05730654; Mar. 12, 2009; Munich, DE.

(Continued)

*Primary Examiner* — Sang Paik
(74) *Attorney, Agent, or Firm* — Alleman Hall McCoy Russell & Tuttle LLP

(57) ABSTRACT

A side construction 302 has an outside sheathing 306 and outside sheathing reinforcement members 307A and 307B joined to the outside sheathing 306 interiorly of the outside sheathing 306. The reinforcement member 307A (307B) is shaped like a hat in section. The reinforcement members 307A provided in the vicinity of a window opening portion have a laser welding spacing L1 of 80 mm and each have a hat width of 50 mm, while the reinforcement members 307B provided on other part have a laser welding spacing L1 of 100 mm and each have a hat width of 70 mm. The reinforcement members 307A and 307B each have a height of 25 mm.

6 Claims, 46 Drawing Sheets

(d)

U.S. PATENT DOCUMENTS

| | | | |
|---|---|---|---|
| 5,801,351 A * | 9/1998 | Ecoffet et al. | 219/52 |
| 6,797,914 B2 * | 9/2004 | Speranza et al. | 219/121.64 |
| 2003/0184075 A1 * | 10/2003 | Freeman et al. | 280/797 |
| 2004/0084425 A1 | 5/2004 | Yahaba et al. | |

FOREIGN PATENT DOCUMENTS

| | | |
|---|---|---|
| JP | 43-17292 | 7/1943 |
| JP | 53-113512 | 2/1952 |
| JP | 58104764 U | 7/1983 |
| JP | 59-186762 | 10/1984 |
| JP | 61220962 A | 10/1986 |
| JP | 62-105071 | 7/1987 |
| JP | 4-54763 | 5/1992 |
| JP | 06-155260 | 6/1994 |
| JP | 06-156271 | 6/1994 |
| JP | 06-304857 | 11/1994 |
| JP | 07-132471 | 5/1995 |
| JP | 07-196039 | 8/1995 |
| JP | 08-058582 | 3/1996 |
| JP | 09-030414 | 2/1997 |
| JP | 09-076903 | 3/1997 |
| JP | 09-086407 | 3/1997 |
| JP | 09-122911 | 5/1997 |
| JP | 09-183366 | 7/1997 |
| JP | 2763983 | 3/1998 |
| JP | 10-167056 | 6/1998 |
| JP | 2929447 | 5/1999 |
| JP | 11-278258 | 10/1999 |
| JP | 2000-000522 | 1/2000 |
| JP | 2002-046601 | 2/2002 |
| JP | 2002-079936 A | 3/2002 |
| JP | 2002-103074 | 4/2002 |
| JP | 2003-112622 | 4/2003 |
| JP | 2003-112622 A | 4/2003 |
| JP | 2003-260647 | 9/2003 |
| WO | 99/59856 | 11/1999 |
| WO | WO99/59856 | 11/1999 |
| WO | WO99/65637 | 12/1999 |

OTHER PUBLICATIONS

Tetsudo Journal Corporation, "Tetsudo Journal No. 206", pp. 22-26, Apr. 1, 1984, Japan.

Tetsudotosho Kannkokai, "The Railway Pictorial", pp. 41-45, Apr. 1, 1990, Japan.

Nippon Sharyo Corporation, "Topics", URL: http://www.n-sharyo.co.jp/topics/1996-2003/tp020523.html, May 2002, Japan.

Kouyusha Corporation, "Tetsudo Fan vol. 42-494", p. 53, Jun. 1, 2002, (place unknown).

Tetsudo Journal Corporation, "Tetsudo Journal No. 434", p. 42, Dec. 1, 2002, Japan.

Nippon Steel Corporation, "Shinnittetsu Giho No. 379 (Development of All Laser Welded Honeycomb Structure for Civil Transports)", pp. 84-88, Nov. 2003, Japan.

Neko Publishing Corporation, "2005 Jr Zensharyo handbook", pp. 262, 264, Aug. 20, 2005, Japan.

Nippon Steel Techno Research Corporation, "Laser Welded Stainless Honeycomb Panel", http://www.nstr.co.jp/rezacomb.htm, (date unknown), Japan.

ISA European Patent Office, Partial European Search Report of EP 10 01 3937, Jan. 11, 2011, Germany, 3 pages.

ISA European Patent Office, European Search Report of EP 10 01 3937, Aug. 3, 2011, 9 pages.

* cited by examiner (a)

(b)

(c)

(d)

(a)

(b)

(c)

a >> b (a)

(b)

(c)

(a)

(b)

(a)

(b)

(a)

(b)

(c)

(a)

(b)

(a)

(b)

(a)

305
371

(b)

372

(a)

201

(b)

202

(a)

(b)

(c)

LASER WELDING METHOD, LASER-WELDED JOINT, OUTSIDE SHEATHING PANEL, AND BODY STRUCTURE FOR ROLLING STOCK

TECHNICAL FIELD

The present invention relates to a laser welding method and a laser welded joint, as well as an outside sheathing panel and a body structure for rolling stock which are formed by using the method and the joint. The invention is particularly suitable for uncoated body structures for rolling stock or car bodies of buses, trucks and like cars.

BACKGROUND ART

Conventionally known body structures for rolling stock include a stainless steel body structure (body structure made of stainless steel for rolling stock), a light weight stainless steel body structure 201 (outside sheathing+framework+outside sheathing reinforcement members) as shown in FIG. 45(*a*), a double-sheet stainless steel body structure 202 (outside sheathing+integral press-molded inside sheathing) as shown in FIG. 45(*b*), and a double-skin type stainless steel body structure (see Japanese Patent Publication No. 2763983 for example). Such stainless steel body structures have many advantages including freedom from coating, easy maintenance, and anticorrosion.

In joining the outside sheathing and the outside sheathing reinforcement members together to form a body structure for rolling stock, resistance spot welding is frequently used from the viewpoint of reduction in thermal strain. To avoid shunting electric current to previously welded spots, the welding pitch is usually adjusted to about 50 to about 80 mm.

A body structure for general rolling stock, particularly, a side construction has some points to which attention should be paid in strength design. The "side construction", as used here, means a structure comprising a single or plural side outside sheathing panels (each having outside sheathing and outside sheathing reinforcement members).

A side outside sheathing panel 101 is subjected mainly to an in-plane shear action by a vertical load F1 imposed by the car's own weight and passengers, as shown in FIG. 46(*a*). Also, the side outside sheathing panel is subjected to in-plane axial compressing and flexing actions by a load F2 imposed by forward and backward force exerted between adjacent cars (end compressing load) via a car coupler, as shown in FIG. 46(*b*). A breaking mode to which attention should be paid first in strength design is buckling of the side outside sheathing panel, and a basic structure is determined based on the criteria of such buckling.

For example, in a portion where the outside sheathing is extensively subjected to a compressing action (for example, a lower portion of a wainscot panel located centrally of a car under the end compressing load), outside sheathing reinforcement members 101 (stiffener) having required antiplane stiffness are joined to the inside surface of outside sheathing 102, as shown in FIG. 46(*c*). Since the side construction for rolling stock, in general, is subjected to a compressing action working in the longitudinal direction of the car more intensively than in any other direction, it is a common practice to position the outside sheathing reinforcement members (stiffener) on the inside surface of the outside sheathing to extend in the longitudinal direction of the car.

In a portion where the outside sheathing is extensively subjected mainly to shearing (for example, a door pocket part immediately above a bogie under vertical load), it is ideal that the outside sheathing reinforcement members are joined to the outside sheathing at an angle of 45° with respect to the rail direction. However, since such angled joining is complicated in the manufacture, the reinforcement members are actually positioned horizontally (in the rail direction) or vertically. These two positions are comparable to each other in terms of buckling strength.

However, such stainless steel body structures as mentioned above have several problems.

(i) A first problem is a lowered strength against general buckling and local buckling.

Resistance spot welding is frequently used to join the outside sheathing and the outside sheathing reinforcement members together from the viewpoint of reduction in thermal strain, as described above. To avoid shunting electric current to previously welded spots, the welding pitch is usually adjusted to about 50 to about 80 mm. In this case, it is possible that stress is not decentralized over each reinforcement member as desired and, hence, a theoretical buckling strength cannot be obtained.

Specifically, the stiffener panel may have an antiplane flexural stiffness lower than the theoretical value, which results in the possibility of occurrence of general buckling caused by a load that is lower than estimated. Also, the outside sheathing might buckle between adjacent welded spots by compression in a direction parallel with the outside sheathing reinforcement members (stiffeners). Thus, the buckling strength of the outside sheathing against such local buckling is also lower than the theoretical buckling strength.

As can be understood from the idea about buckling strength to be described later, with compression stress exerted on the outside sheathing in a direction parallel with outside sheathing reinforcement members (stiffeners) joined thereto at a pitch of 80 mm for example, the outside sheathing can withstand as low as about 60 Mpa if the reinforcement members are spot-welded to the outside sheathing at 80 mm pitch, though the outside sheathing can withstand a stress up to 160 MPa if the reinforcement members are continuously joined thereto.

Further, initial strain occurs on the outside sheathing due to strain about each spot caused by pressure contact. Such initial strain also causes local buckling strength to lower largely.

(ii) A second problem is permanent deformation in a stress concentrated portion (on the tensioned side) or local buckling (on the compressed side).

In the side outside sheathing, stress is concentrated at the corners of an opening portion of the side outside sheathing. A side construction for commuter cars, in particular, has many openings such as windows and doorways, and stress concentration at the corners of such an opening portion is problematic.

Such stress concentrated portions allow permanent deformation and buckling to occur on the tensioned side and the compressed side, respectively, which will finally lead to failure. A conceivable remedy for this problem is to increase the plate thickness on the tensioned side by providing the outside sheathing with an additional plate-shaped outside sheathing reinforcement member interiorly, thereby relieving the stress. Theoretically, the same remedy is possible on the compressed side. However, the conventional stainless steel body structure assembled by resistance spot welding involves some problems.

That is, in resistance spot welding, the welding pitch is usually adjusted to about 50 to about 80 mm, as described above. In this case, it is possible that stress is not decentralized over the reinforcement plate as desired and, hence, a theoretical buckling strength is not obtained. Further, even though the reinforcement plate is added, the number of welded spots is increased for joining of the reinforcement plate and, as a result, initial strain occurs in the outside sheathing due to strain about each spot caused by pressure contact and heating. The provision of such a reinforcement plate may cause local buckling strength to lower on the contrary.

(iii) A third problem is associated with watertightness.

Since resistance spot welding, which is frequently used in assembling a stainless steel body structure, can form nothing but a lap joint, joining of an outside sheathing to another outside sheathing or an edging member (a window frame, door mask or the like) is achieved by lap joint.

A contrivance to maintain the watertightness of such a joint is needed to prevent penetration of water from the outside. The watertightness of the lap joint is ensured by sandwiching a sealant between lap portions in welding because the lap portions define very fine clearances therebetween and because spot welding is an intermittent welding method. Alternatively, the watertightness is ensured by filling a sealant on lap end portions like a fillet.

However, it is possible that the seal is broken by aged deterioration of the sealant due to weather and washing to allow water to penetrate into the car. Note that such a problem will not occur with body structures of plain steel or aluminum alloy because such a body structure allows continuous welding to be used.

(vi) A fourth problem is associated with the aesthetic value of outside sheathing (side outside sheathing and end outside sheathing).

Since resistance spot welding, which is frequently used in assembling a stainless steel body structure, includes pressing in a spotted fashion during welding, strain occurs around each of the resulting welded spots due to pressing force and heating, while impressions are formed on the welded spots. The outside sheathing is aesthetically impaired by such strain and impressions. Impairment of the aesthetic value of the side outside sheathing or end outside sheathing, in particular, will lower the product value.

Though "scorch" on the outside sheathing resulting from spot welding can be eliminated by an electrolytic process, impressions are relatively deep and hence cannot be rendered invisible by polishing or a like process following the joining.

Though impressions can be covered with a color band (film), the impressions can be more conspicuous at some view angle.

(v) A fifth problem is the complexity of the inside framework.

Conventionally, as a structure for mounting interior trim or equipment on a body structure, screw seats are welded to the main structure or the inside framework, or fixtures are separately provided.

Such fixtures and screw seats are mostly designed individually for each car and a mounting place for such a fixture or screw seat differs depending on the car type and the part.

Accordingly, the count of parts including screw seats, inside framework and fixtures increases and, hence, very much man-hour is required for making and welding of such parts. In addition, dimensional control for mounting of such parts is complicated because mounting places are not standardized.

The inventors of the present invention have found that the aforementioned problems can be solved if laser welding is utilized instead of resistance spot welding in joining the outside sheathing and the outside sheathing reinforcement members together.

In using laser welding as described above, a certain penetration depth is needed to suppress variations in laser-welded joint strength in order to obtain a structure having stabilized quality. However, too large a penetration depth sometimes causes discoloration to occur on the reverse side opposite away from the welding side (back scorch) due to high temperature oxidation or allows the weld bead to be exposed. Methods of solving these problems are known (see Japanese Patent Publication No. 2929447 for example). Alternatively, it is possible to obviate oxidative discoloration by cooling the reverse side opposite away from the welding side during welding or by post-treatment.

With the conventional techniques, however, a member forming a lap joint is slightly bent at its edge due to contraction of the welded portion that has been heated locally by laser beam and such an edge bend may appear as a ridge-like weld mark along a weld line on the reverse side opposite away from the welded side. Such a ridge-like weld mark resulting from the edge bend is not so serious as compared to penetration through of a molten pool or oxidative discoloration caused by laser beam. However, the user requests that such a weld mark be eliminated in order to upgrade the quality and added value of the outside sheathing.

As a remedy for such a weld mark, it is possible to perform joining while controlling the laser power so as not to develop any weld mark. However, in cases where a 1.5 mm-thick lower plate and a 1.0 mm-thick upper plate are welded together, the bead width at the joint interface is 0.3 to 0.5 mm and the penetration depth into the lower plate is 0.1 to 0.2 mm. With such a penetration depth, joining cannot be achieved at all under the influence of some disturbance. Conversely, development of a ridge-like weld mark proves that the joint has been formed certainly. It is therefore difficult to ensure both the joint quality and the aesthetic quality of the outward appearance at a time.

In the case of a lower plate having a thickness of not less than 3 mm, it has been confirmed that little influence is exerted on the outside sheathing surface even if a sufficient penetration depth is ensured. However, an increase in the plate thickness of the lower plate more than necessary results in a considerable increase in the mass of the resulting structure undesirably.

As a result of repeated intensive study made by the inventors, it has been found that, if the outside surface of the outside sheathing is subjected to polishing (for example, belt grinder finishing generally employed for stainless steel body structures for rolling stock) substantially in parallel with the aforementioned weld line formed by laser beam, the weld line is rendered substantially invisible by scattering of light.

DISCLOSURE OF INVENTION

Problems to be Solved by Invention

The present invention has been made in view of the above-described circumstances. It is an object of the present invention to provide a laser welding method capable of rendering a weld mark visually inconspicuous, a laser-welded joint, an outside sheathing panel, and a body structure for rolling stock, as well as a body structure for rolling stock which is free from a decrease in buckling strength due to buckling between adjacent welded spots or initial strain and hence can enjoy a required buckling strength.

Means for Solving Problems

A welding method according to the present invention is a laser welding method comprising the steps of: lapping plural plate members one over another; continuously irradiating one of the lapped plate members with moving laser beam from an antiplane direction to heat the lapped plate members until a region extending to an inner portion of another one of the lapped plate members which is positioned on an opposite side away from the plate member irradiated with the laser beam becomes molten; and joining the plural plate members together while controlling the laser power or moving speed of the laser beam so as not to allow a bottom portion of a resulting molten pool to reach an outside surface of the plate member positioned on the opposite side, the laser welding method characterized by previously polishing the outside surface of the opposite-side plate member substantially in parallel with the direction of a weld line to be formed by the laser beam. The "plate member", as used herein, need not necessarily be wholly plate-shaped but is meant to include a member having a plate-shaped portion to be subjected to joining by laser welding. The "polishing", which is also called BG (belt grinder) finishing by means of a belt grinder, is a process for finishing a steel sheet surface by grinding the steel sheet surface intermittently (discontinuously) in one direction by means of a revolving belt attached with abrasive grains conforming to the prescription "JIS R 6001". (The BG finishing is surface finishing falling under the category No. 3 or No. 4 of "JIS G 4305".)

This method uses a plate member that has been polished substantially in parallel with the direction of a weld line to be formed by laser beam as a plate member forming an outside surface. Such a plate member renders the weld line substantially invisible by scattering of light and hence renders a ridge-like weld mark resulting on the outside surface visually inconspicuous without the need to perform surface finishing on the outside surface as a post-treatment.

A welded joint according to the present invention is a laser-welded joint comprising plural plate members joined together by: lapping the plural plate members one over another; continuously irradiating one of the lapped plate members with moving laser beam from an antiplane direction to heat the lapped plate members until a region extending to an inner portion of another one of the plate member which is positioned on an opposite side away from the plate member irradiated with the laser beam becomes molten; and joining the plural plate members together while controlling the laser power or moving speed of the laser beam so as not to allow a bottom portion of a resulting molten pool to reach an outside surface of the plate member positioned on the opposite side, the laser-welded joint characterized in that the outside surface of the opposite-side plate member is polished substantially in parallel with the direction of a weld line formed by the laser beam. The "being polished substantially in the direction of a weld line formed by the laser beam", as expressed herein, is meant to include the following cases (i) to (iii) which occur when the weld line direction cannot be limited to one specific direction in view of the structure of a plate member (fitting part such as framework material or lining material) to be joined to the inside surface of the plate member forming the outside surface of the joint. That is, case (i): the polishing direction is made to coincide with the direction of a weld line that is most influential on the outward appearance (outside surface); case (ii): a plate member that will define a weld line not coinciding with the polishing direction is welded to a plate member joined along a weld line substantially coinciding with the polishing line; and case (iii) a protective or surfacing material is mounted to cover a weld mark extending on a weld line not coinciding with the polishing direction (a ridge-shaped weld mark caused by edge bend) in order for the weld mark to be visually unobservable or difficult to observe from the outside surface side. The polishing of the outside surface of the plate member substantially in parallel with the direction of the weld line formed by laser beam may be conducted either before or after the joining.

Since the plate member forming the outside surface is thus subjected to polishing substantially in parallel with the direction of the weld line to be formed by laser beam, scattering of light on the outside surface discontinuously polished renders the weld mark along the weld line substantially invisible. That is, the ridge-like weld mark developed on the outside surface by edge bend becomes visually inconspicuous, thus resulting in an improvement in the aesthetic value of the outside sheathing.

By thus using a member polished substantially in parallel with the weld line by means of a belt grinder or the like as a component of a welded lap joint which forms the outside surface (the lower side of the lower plate member forming the welded lap joint) on the reverse side opposite away from the welding side, the weld mark developed as described above on even on a partial penetration welded joint having sufficient penetration can hardly be observed visually (can be rendered visually inconspicuous) by scattering of light or the like. Thus, the outside surface can be made aesthetically satisfactory. That is, it becomes possible to ensure both a stabilized and appropriate joint strength and an outward appearance of aesthetic quality.

Description will be made of a case where two plate members are lap-joined together as a specific example of the above-described arrangement. Referring first to FIG. 1(a), two plate members 1 and 2 (for example, cold-rolled stainless steel sheets such as SUS301L or SUS304) are lapped one over the other; the lapped plate members 1 and 2 are continuously irradiated with moving laser beam R from the side of the plate member 2 opposite away from the side contacting the plate member 1 so as to be heated until a region extending to an inner portion of the plate member 1 opposed to the plate member 2 irradiated with the laser beam R becomes molten; and the plate members 1 and 2 are joined together, while the laser power or moving speed of the laser beam R is controlled so as not to allow a bottom portion of a resulting molten pool to reach an outside surface S1 of the plate member 1 on the opposite side. No weld bead appears on the outside surface S1. In this case, a ridge-like weld mark is developed by a slight edge bend by an angle $\theta$ caused by heat shrinkage following laser welding, as shown in FIG. 1(b). This edge bend (edge bend line L) appears as a streak on the outside surface of the outside plate member 1. Nevertheless, the edge bend (edge bend line L) as a weld mark is rendered substantially invisible by scattering of light incident on the outside surface S1 as shown in FIG. 1(d) because the outside surface S1 is polished in parallel with the weld line. If the surface is smooth, light rays from a specific direction are definitely divided by the edge bend in directions R1 and R2 of reflection toward a point of view, as shown in FIG. 17(a). For this reason, the edge bend line L can be observed. In contrast, if the surface is polished in the weld line direction, light rays from all directions are reflected toward the point of view as shown in FIG. 17(b), thus making the edge bend L invisible.

Thus, (i) there is an advantage in improving the product quality by virtue of the aesthetically excellent outside surface with the weld line rendered invisible and improved dimensional accuracy with less welding strain. (ii) Since laser welding exhibits an increased welding speed, hence, an improved workability, the manufacturing cost can be reduced. (iii) Since laser welding is capable of continuous welding, any sealant can be eliminated, which leads to a reduction in the maintenance cost.

An outside sheathing panel according to the present invention comprises an outside sheathing, and a first reinforcement member lapped over the outer sheathing interiorly of the outside sheathing, the outer sheathing and the first reinforcement member being joined together by being continuously irradiated with moving laser beam from the first reinforcement member side so as to be heated until a region extending to an inner portion of the outside sheathing becomes molten with the laser power or moving speed of the laser beam controlled so as not to allow a bottom portion of a resulting molten pool to reach an outside surface of the outside sheathing, the outside sheathing panel characterized in that the outside surface of the outside sheathing is polished substantially in parallel with the direction of a weld line formed by the laser beam.

Since the outside surface of the outside sheathing is polished substantially in parallel with the direction of the weld line formed by the laser beam, scattering of light on the outside surface renders the weld line on the outside surface substantially invisible. That is, a ridge-like weld mark developed on the outside surface of the outside sheathing panel (outside sheathing) becomes visually inconspicuous.

The above-described outside sheathing panel can be used in a body structure for rolling stock. That is, a body structure for rolling stock according to the present invention comprises an outside sheathing panel as a side outside sheathing of a side construction, the outside sheathing panel comprising an outside sheathing, and a first reinforcement member lapped over the outer sheathing interiorly of the outside sheathing, the outer sheathing and the first reinforcement member being joined together by being continuously irradiated with moving laser beam from the first reinforcement member side so as to be heated until a region extending to an inner portion of the outside sheathing becomes molten with the laser power or moving speed of the laser beam controlled so as not to allow a bottom portion of a resulting molten pool to reach an outside surface of the outside sheathing, the body structure characterized in that: the outside surface of the outside sheathing of the outside sheathing panel is polished substantially in parallel with the direction of a weld line formed by the laser beam; and the direction of the weld line coincides with a specific direction (longitudinal or heightwise direction of the car).

In the body structure for rolling stock thus constructed, since the outside sheathing of the outside sheathing panel is polished substantially in parallel with the direction of the weld line formed by the laser beam, scattering of light on the outside surface renders the weld line substantially invisible. Thus, a ridge-like weld mark developed on the outside surface becomes visually inconspicuous, which results in an improvement in the aesthetic value of the outward appearance of the outside sheathing. Such a body structure is particularly suitable for an uncoated body structure for rolling stock.

In the body structure for rolling stock according to the present invention, it is desirable that: the first reinforcement member have a portion shaped like a hat in section; and that portion has a body part substantially U-shaped in section and flange parts extending continuously from opening defining edges of the body part in opposite directions and joined to the outside sheathing by laser welding, the body part extending in a longitudinal direction of a railway car.

With such a feature, the first reinforcement member and the outside sheathing form a completely closed section, which imparts the first reinforcement member with a very high flexural stiffness in the longitudinal direction of the first reinforcement member while enhancing the buckling strength of the outside sheathing in that direction. Also, the weld line direction and the polishing direction can be made coinciding with each other easily because the first reinforcement member is joined to the outside sheathing so as extend in the longitudinal direction of the railway car.

The substantially U-shaped section of the body part may define therein a space having a constant width from the bottom to the open side. Alternatively, it is possible that: the substantially U-shaped section of the body part defines therein a space gradually widening as the space extends toward the open side; the first reinforcement member is provided on the opposite side away from the outside sheathing with a second reinforcement member which is shaped like a hat in section and extends in a direction perpendicular to the first reinforcement member; and the second reinforcement member has flange parts joined to the body part of the first reinforcement member. Here, though there is no particular limitation on the shape of the second reinforcement member, the second reinforcement member is desirably shaped like a hat in section so as to ensure an adequate weld length. Also, though there is no particular limitation on the method of joining the second reinforcement member, it is possible that joining is made by laser welding so that the bottom portion of a molten pool penetrates through the body part of the first reinforcement member.

With such a feature, the second reinforcement member having a hat-shaped section is lapped over the first reinforcement member so as to extend in a direction perpendicular to the first reinforcement member and, hence, the antiplane flexural stiffness in the direction perpendicular to the first reinforcement member can be enhanced. Also, since the first reinforcement member joined to the outside sheathing by laser welding is shaped like a hat (trapezoidal) in section, the stiffness against antiplane shear deformation in the direction perpendicular to the longitudinal direction of the first reinforcement member can be enhanced. Further, since laser welding is conducted so that the bottom portion of the resulting molten pool penetrates through the body part of the first reinforcement member, a sufficient joint strength can be stably ensured without the outward appearance affected.

Another body structure for rolling stock according to the present invention comprises an outside sheathing of a side construction, and third reinforcement members joined to the outside sheathing interiorly of the outside sheathing by laser welding for stiffening the outside sheathing, the third reinforcement members being arranged in a longitudinal direction of a railway car, the body structure characterized in that the third reinforcement members are arranged at a pitch defined by spacing between adjacent weld lines formed by the laser welding, the pitch being established such that uniaxial stresses σx and σy in respective of the longitudinal direction of the railway car and a direction perpendicular thereto and a shear stress τ, which are obtained by resolution of an in-plane stress component exerted on the outside sheathing, are not larger than a buckling stress value determined by Euler's buckling formula and a plasticity correction formula. Though the laser welding of the third reinforcement members to the outside sheathing is continuous welding basically, continuous welding may not be conducted on a portion which does not need continuous welding for a structural reason (for example, a portion which is unlikely to buckle because of a low stress to be exerted on the outside sheathing) or on a portion which does not allow continuous welding to be conducted thereon for a structural reason.

The above-described invention has been made based on the following idea about buckling strength.

The Euler's buckling formula for a rectangular flat plate is expressed as the following formula (see FIG. 18(*a*)):

[Numerical formula 1]

$$\sigma_{cr}^{e} = K \frac{\pi^2 E}{12(1-v^2)} \left(\frac{t}{b}\right)^2 \quad (1)$$

Here, E represents a modulus of longitudinal elasticity, v represents a Poisson's ratio and t represents the thickness of the flat plate. K represents a buckling factor. When the rectangular plate is simply supported (rotational support) by its four sides, K is theoretically represented as:

[Numerical formula 2]

$$K = \begin{cases} \left(\alpha + \frac{1}{\alpha}\right)^2 & (\alpha < 1) \\ 4 & (\alpha \geq 1) \end{cases} \quad (2)$$

Here, α represents a side length ratio expressed as:

[Numerical formula 3]

$$\alpha = \frac{a}{b} \quad (3)$$

When the stress produced is large, the influence of plasticity is not negligible. In such a case, plasticity correction is made using, for example, Johnson's experimental formula as follows:

[Numerical Formula 4]

$$\sigma_{cr} = \begin{cases} \sigma_{cr}^{e} & (\sigma_{cr}^{e} \leq \sigma_Y/2) \\ \sigma_Y\left(1 - \frac{\sigma_Y}{4\sigma_{cr}^{e}}\right) & (\sigma_{cr}^{e} > \sigma_Y/2) \end{cases} \quad (4)$$

Here, σY represents the yield strength of the material.
Similarly, the shear buckling stress is expressed as follows.

[Numerical formula 5]

$$\tau_{cr}^{e} = K \frac{\pi^2 E}{12(1-v^2)} \left(\frac{t}{b}\right)^2 \quad (5)$$

$$K = 6 \text{ (four side support, } \alpha \gg 1) \quad (6)$$

$$\tau_{cr} = \begin{cases} \tau_{cr}^{e} & (\tau_{cr}^{e} \leq \tau_Y/2 = \sigma_Y/2\sqrt{3}) \\ \tau_Y\left(1 - \frac{\tau_Y}{4\tau_{cr}^{e}}\right) & (\tau_{cr}^{e} > \tau_Y/2 = \sigma_Y/2\sqrt{3}) \end{cases} \quad (7)$$

(See FIG. 18(b).)

In an actual body structure, an outside sheathing panel is constructed by joining reinforcement members to a thin-sheet outside sheathing for a stiffening purpose. The arrangement and the pitch of the reinforcement members have to be determined so as not to allow a rectangular region of the outside sheathing surrounded by the reinforcement members to buckle.

With respect to the in-plane stress exerted on the outside sheathing of the side construction by either of a vertical load or an end compressing load imposed on the body structure, the stress exerted in the longitudinal direction of the car is larger than that exerted in the direction perpendicular to the longitudinal direction (in the vertical direction) at many points. For this reason, the reinforcement members should be arranged so that the long sides of the rectangular region of the outside sheathing to be surrounded by the reinforcement members extend coincidentally with the longitudinal direction of the car. This is because the side construction has a buckling strength against compression along the long side several times as high as a buckling strength against compression along the short side, as can be seen from the buckling mode shown in FIG. 18(c).

This can be expressed by the following numerical formulae:

[Numerical formula 6]

$$\sigma_{cr,x}^{e} = 4 \times \frac{\pi^2 E}{12(1-v^2)}\left(\frac{t}{b}\right)^2 = 4 \times A\left(\frac{t}{b}\right)^2 (\alpha \gg 1) \quad (8)$$

$$\sigma_{cr,y}^{e} = \left(\alpha + \frac{1}{\alpha}\right)^2 \times \frac{\pi^2 E}{12(1-v^2)}\left(\frac{t}{a}\right)^2 = \frac{1}{\alpha^2}\left(\alpha + \frac{1}{\alpha}\right)^2 \times A\left(\frac{t}{b}\right)^2 \quad (9)$$

$$= \left(1 + \frac{2}{\alpha^2} + \frac{1}{\alpha^4}\right) \times A\left(\frac{t}{b}\right)^2 \to A\left(\frac{t}{b}\right)^2 (\alpha \to \infty)$$

$$\tau_{cr}^{e} = 6 \times \frac{\pi^2 E}{12(1-v^2)}\left(\frac{t}{b}\right)^2 = 6 \times A\left(\frac{t}{b}\right)^2 (\alpha \gg 1) \quad (10)$$

wherein, $A = \frac{\pi^2 E}{12(1-v^2)}$

Therefore, the approximation made by the above formulae holds well if the length of the long side is five times or more as large as that of the short side.

FIGS. 19(a) to 19(c) plot the relationships between the short side length b of the rectangular region and buckling stresses (σcr,x, σcr,y and τcr).

The pitch at which the reinforcement members are arranged on the outside sheathing panel is considered to be equal to the short side length b of the rectangular region.

Conversely, if the stresses (σx, σy and τ) to be produced can be estimated through stress analysis or structural test, the pitch b at which the reinforcement members are to be arranged can be determined from FIGS. 19(a) to 19(C). The pitch b can be expressed by the following formula:

[Numerical formula 7]

$$b = \min\left(t\sqrt{\frac{4A}{\sigma_x^*}}, t\sqrt{\frac{A}{\sigma_y^*}}, t\sqrt{\frac{6A}{\tau^*}}\right) \quad (11)$$

wherein

[Numerical formula 8]

$$\sigma_x^* = \begin{cases} \sigma_x & (\sigma_x \leq \sigma_Y/2) \\ \sigma_Y^2/\{4(\sigma_Y - \sigma_x)\} & (\sigma_x > \sigma_Y/2) \end{cases} \quad (12)$$

$$\sigma_y^* = \begin{cases} \sigma_y & (\sigma_y \leq \sigma_Y/2) \\ \sigma_Y^2/\{4(\sigma_Y - \sigma_y)\} & (\sigma_y > \sigma_Y/2) \end{cases} \quad (13)$$

$$\tau^* = \begin{cases} \tau & (\tau \leq \sigma_Y/2\sqrt{3}) \\ \sigma_Y^2/\{12(\sigma_Y/\sqrt{3} - \tau)\} & (\tau > \sigma_Y/2\sqrt{3}) \end{cases} \quad (14)$$

Yet another body structure for rolling stock according to the present invention comprises an outside sheathing of a side construction, and third reinforcement members joined to the outside sheathing interiorly of the outside sheathing by laser welding for stiffening the outside sheathing, the third reinforcement members being arranged in a rail direction, the body structure characterized in that the third reinforcement members are arranged at a pitch defined by spacing between adjacent weld lines formed by the laser welding, the pitch being established based on a buckling strength of a portion at which a load to be imposed on the third reinforcement members becomes maximized in a direction in which the third reinforcement members extends.

This construction, which employs continuous laser welding as joining means to join the outside sheathing and the third reinforcement members together, is free from a decrease in buckling strength due to buckling between adjacent welded spots or initial strain which is essential to joining by the conventional resistance spot welding and hence can obtain a required buckling strength. Accordingly, if the pitch of the reinforcement members is determined theoretically, there is no need to provide the outside sheathing with additional small reinforcement plates for further reinforcement, which can contributes to a reduction in parts count and in man-hour.

Yet another body structure for rolling stock according to the present invention comprises an outside sheathing of a side construction, and third reinforcement members joined to the outside sheathing interiorly of the outside sheathing by laser welding for stiffening the outside sheathing, the third reinforcement members being arranged in a longitudinal direction of a railway car, wherein it is possible that: the third reinforcement members are each shaped like a hat in section and each have a U-shaped part substantially U-shaped in section and two fitting flange parts extending continuously from end edges of the U-shaped part in opposite directions and joined to the outside sheathing by laser welding; and the U-shaped part of each of the third reinforcement members is smaller in width than a U-shaped part of a first member provided on other part of the body structure. This body structure is characterized by stringers separately provided to stiffen the body structure against antiplane flexure in a direction perpendicular to the longitudinal direction of the railway car.

This construction uses the third reinforcement members having two types of sectional shape, the number of which is markedly smaller than required by the conventional art, thus leading to a reduction in the parts manufacturing cost. Also, the decreased number of types of parts makes it easy to improve the dimensional accuracy of the parts.

In the present invention, it is possible that: the third reinforcement members are each shaped like a hat in section and each have a U-shaped part substantially U-shaped in section and two fitting flange parts extending continuously from end edges of the U-shaped part in opposite directions and joined to the outside sheathing by laser welding; and a fourth reinforcement member is previously mounted in the U-shaped part of each of the third reinforcement members for enhancing the stiffness of a portion of the outside sheathing around the U-shaped part.

With such a feature, even when an insufficient local buckling strength results despite the provision of the third reinforcement members, necessary and minimum reinforcement can be provided reliably and easily without increase in man-hour.

In the present invention, each of the third reinforcement members may have a head portion having an opening or a notch for allowing the fourth reinforcement member to be joined to the outside sheathing by laser welding.

This feature allows the fourth reinforcement members as well as the third reinforcement members to be joined directly to the outside sheathing. Thus, it is possible to enhance local reinforcement of the outside sheathing thereby to enhance the buckling strength efficiently.

In the present invention, each of the third reinforcement members may have a root portion joined to the outside sheathing by laser welding, and a hollow bulged portion having closed ends.

With such a feature, each of the third reinforcement members has no free edge ends and hence enjoys an enhanced buckling strength and stiffness at its end portions.

In the present invention, it is desirable that an inside plate frame is joined to end portions of those third reinforcement members located adjacent a corner of an opening portion formed in the outside sheathing by laser welding to interconnect the end portions.

With such a feature, such a simple arrangement as to provide the inside plate frame makes it possible to reinforce the end portions of the third reinforcement members easily, thereby to enhance the strength of the corner portion of the opening portion on which concentration of stress is likely.

In the present invention, it is possible that the third reinforcement members and the inside plate frame are joined together by laser welding so as to form closed weld lines. The "closed weld line" is meant to include a ring-shaped (elliptical or circular) weld line and a rectangular weld line.

With such a feature, even though the joint portion to be made by laser welding is narrow and small, a long weld line can be ensured. Further, since the weld line is closed, concentration of stress on the weld bead ends will not occur, which can ensure a required strength.

In the present invention, it is desirable that: the outside sheathing has an opening portion having a peripheral edge provided with an edging member; and the edging member is formed with a notch for allowing a hold-down roller to advance thereinto in laser-welding the third reinforcement members to the outside sheathing, the hold-down roller being configured to press a portion of each of the third reinforcement members to be joined against the outside sheathing while moving together with the laser beam.

With such a feature, it is possible to avoid interference between the edging member and the hold-down roller at a location adjacent the end portion (edging member) of each third reinforcement member, thereby to allow continuous laser welding up to a point adjacent the end portion to be achieved.

In the present invention, it is possible that: the third reinforcement members are each shaped like a hat in section and each have a U-shaped part substantially U-shaped in section and two fitting flange parts extending continuously from end edges of the U-shaped part in opposite directions and joined to the outside sheathing by laser welding; an inside plate frame is joined to free edge ends of the third reinforcement members outwardly of the free edge ends; and the inside plate frame has a body part joined to the U-shaped parts of the third reinforcement members, a leg part extending continuously from the body part in such a direction as to close the free edge ends, and a flange part extending continuously from the leg part and joined to the outside sheathing.

With such a feature, the end portions of the third reinforcement members are joined to the outside sheathing via the inside plate frame and, hence, the stiffness and strength of the end portions can be enhanced.

In the present invention, it is possible that: an inside plate frame is joined to free edge ends of the third reinforcement members outwardly of the free edge ends; and the inside plate frame has a first flange part joined to the U-shaped parts of the third reinforcement members, a second flange part joined to the outside sheathing, first and second leg parts extending parallel from respective of the first and second flange parts to a same height, and a horizontal part extending parallel with the outside sheathing to interconnect upper end edges of respective of the first and second leg parts.

With such a feature, the inside plate frame has a larger height than the third reinforcement member and hence can enhance the antiplane stiffness.

In the present invention, it is possible that at least one of a side outside sheathing of the side construction and a roof outside sheathing of a roof construction has an end edge portion extending in the longitudinal direction of the railway car and having a folded part by which the side outside sheathing and the roof outside sheathing are joined together by continuous laser welding.

With such a feature, the provision of the folded part can enhance the stiffness and, hence, the folded part can serve as a counterforce receiver during laser welding.

In the present invention, it is desirable that the folded part has a U-shaped section which opens upwardly of the roof outside sheathing.

This feature can ensure required stiffness while forming a rainwater guttering (U-shaped part).

In the present invention, it is desirable that: an end outside sheathing of an end construction and a side outside sheathing of a side construction be joined together perpendicularly to each other via an end corner post having a substantially L-shaped section; the end corner post be either joined with a separate member defining a closed space cooperatively with the end corner post by continuous laser welding or formed with a closed space forming part defining the closed space cooperatively with the end corner post; and the closed space be configured to function as a rainwater guttering for guiding rainwater from a roof to the ground.

This feature can realize the rainwater guttering for guiding rainwater from the roof to the ground without the need to provide any additional member such as a water tube.

In the present invention, the outside sheathing desirably has an outside surface which is surface-finished by brushing or shot blasting.

With such a feature, a stainless steel body structure with its outside sheathing having a high-precision outside surface of aesthetic value.

In the present invention, it is possible that: the outside sheathing is interiorly fitted with a continuous rail member which is U-shaped in section for mounting interior trim or equipment on the outside sheathing by means of a mounting bolt having a head portion configured to engage the rail member.

With such a feature that the outside sheathing is fitted with the rail member, it is possible to reduce the parts count and the man-hour for mounting secondary structural material such as inside framework and facilitate dimensional control.

In the present invention, the outside sheathing is desirably thicker than each of the third reinforcement members and has a plate thickness of not less than 3 mm.

With such a feature, no weld line appears on the surface of the outside sheathing.

In the present invention, it is possible that: the outside sheathing defines an opening portion having a peripheral edge exteriorly provided with an edging member; and the edging member has a joint portion joined to the outside sheathing by continuous laser welding from the outside sheathing side, the joint portion comprising a folded plate structure formed by folding a flat plate.

With such a feature, no weld line appears on the surface of the outside sheathing even if piercing welding is conducted.

Advantage of Invention

With the welding method, welded joint, outside sheathing panel and body structure for rolling stock according to the present invention, the body structure stiffness (weight reduction) and the dimensional accuracy as well as the outward appearance can be improved as compared to a conventional joint formed by resistance spot welding. Also, with the outside sheathing having an outside surface polished substantially in parallel with the direction of a weld line formed by laser beam, no post-treatment is required and, hence, the productivity can also be improved.

Another body structure for rolling stock according to the present invention is free from a decrease in buckling strength due to buckling between adjacent welded spots or initial strain by virtue of continuous laser welding used to join the third reinforcement members to the outside sheathing of the side construction for stiffening the outside sheathing and hence can enjoy a required buckling strength. Accordingly, if the pitch of the reinforcement members is determined theoretically, there is no need to provide the outside sheathing with additional small reinforcement plates for further reinforcement, which can contributes to reduction in parts count and in man-hour.

BEST MODE FOR CARRYING OUT THE INVENTION

Hereinafter, embodiments of the present invention will be described in detail with reference to the drawings.

First Embodiment

Figure 1:
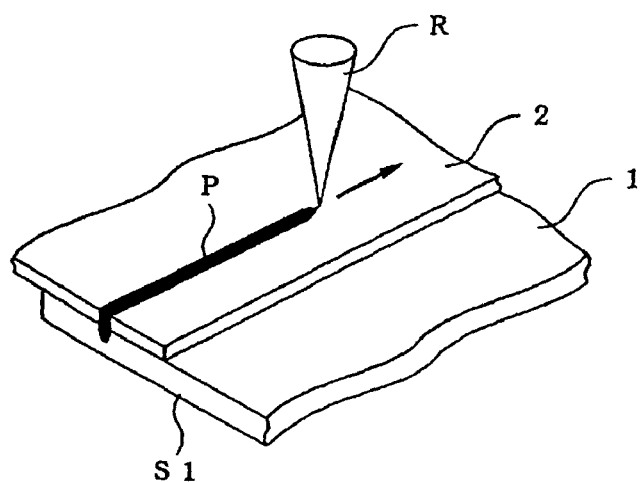
FIGS. 1(a) to 1(d) are each an explanatory view illustrating the principle underlying a laser-welded joint according to the present invention.
Figure 1:
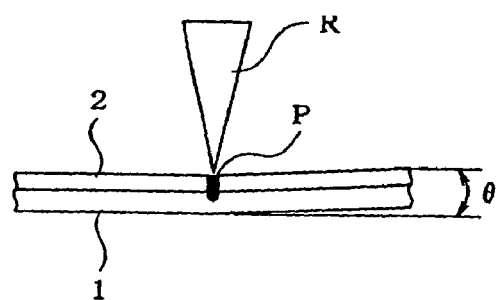
Figure 1:
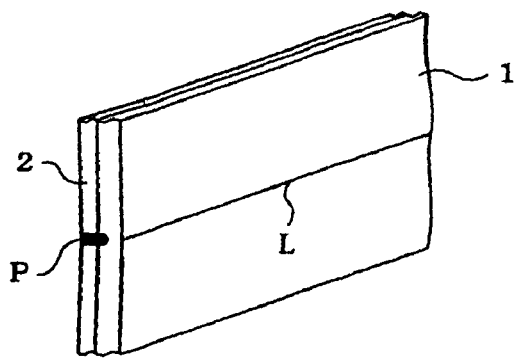
Figure 1:
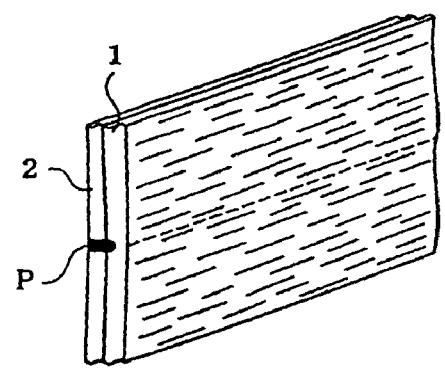
Figure 2:
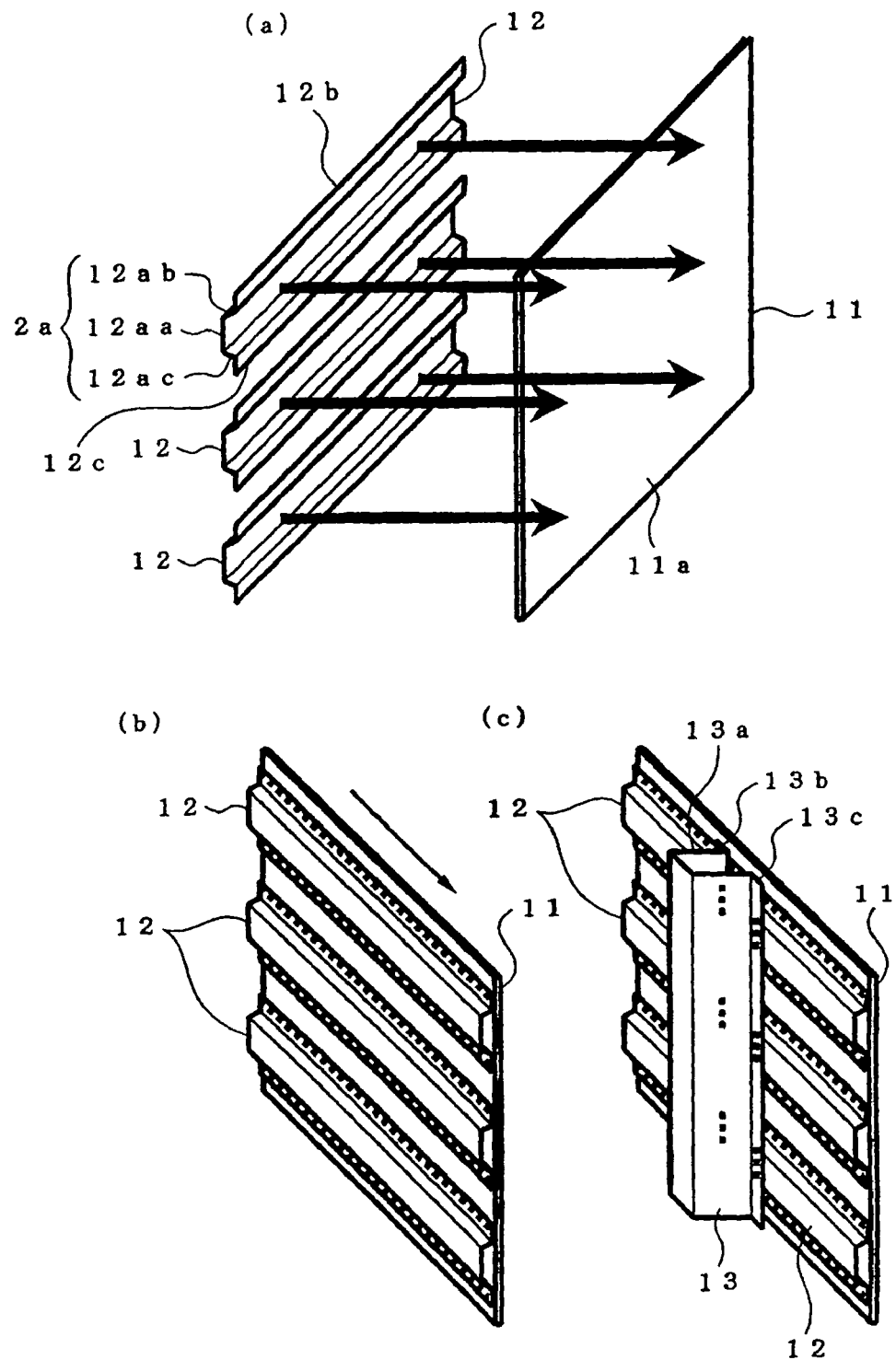
FIGS. 2(a) to 2(c) are each an explanatory view illustrating an outside sheathing panel according to the present invention.

FIG. 2 illustrates a basic principle based on which a body structure for rolling stock is constructed using a laser-welded joint according to the present invention.

As shown in FIGS. 2(a) and 2(b), partial penetration laser welding is used to join first reinforcement members 12 each substantially shaped like a hat in section to an inside surface of an outside sheathing 11 (a surface ground material having an outside surface 11a previously polished by a belt grinder substantially in parallel with the direction of a weld line to be formed by laser welding) so that the bottom of a resulting molten pool will not reach the outside surface 11a of the outside sheathing 11. At that time, the outside surface 11a of the outside sheathing 11 has been previously polished substantially in parallel with the direction of a weld line to be formed by laser welding. That is, the direction of the weld line to be formed by laser welding and the direction in which the outside surface 11a has been polished (the direction in which the ground surface finishing is made) substantially coincide with each other.

Each of the first reinforcement members 12 is shaped like a hat in section and has a body part 12a substantially U-shaped in section and defining therein a space gradually widening as it extends toward the opening side, and flange parts 12b and 12c to be joined to the outside sheathing 11 by laser welding, the flange parts 12b and 12c extending continuously from opening defining edges of the body part 12a in opposite directions. The body part 12a has a base plate portion 12*aa* extending substantially in parallel with the outside sheathing 11 in a joined condition, and side plate portions 12*ab* and 12*ac* extending from the opposite side edges of the base plate portion 12*aa* toward the opening defining edges in such a manner that the spacing therebetween widens as it extends toward the opening defining edges.

Since the body part 12*a* is substantially U-shaped in section in such a manner that the spacing between the side plate portions 12*ab* and 12*ac* widens gradually as it extends toward the flange parts 12*b* and 12*c*, each first reinforcement member 12 is hard to deform (shear deformation) by a shear load working in a direction perpendicular to the first reinforcement member 12 and parallel with the outside sheathing plane. Accordingly, when a high antiplane flexural stiffness is required also in the direction perpendicular to the first reinforcement member 12 to suppress sectional deformation as in cases where the first reinforcement member 12 is used in an outside sheathing panel of a body structure for rolling stock, it is possible to obtain such a high antiplane flexural stiffness by joining a second reinforcement member 13 having a hat-shaped section to the upper side of the first reinforcement member 12 (body part 12*a*) perpendicularly thereto by laser welding. This is because the first reinforcement member 12 can suppress shear deformation that occurs between the second reinforcement member 13 and the outside sheathing and hence can prevent the antiplane shear stiffness of the outside sheathing panel from lowering, which results in the outside sheathing panel having an antiplane flexural stiffness kept high against any load. By so doing, the antiplane flexural stiffness of the outside sheathing panel can be kept satisfactory without the need to join the second reinforcement member 13 directly to the outside sheathing 11 and, hence, the outside sheathing 11 can be kept aesthetically satisfactory.

The second reinforcement member 13 also has a body part 13*a* substantially U-shaped in section and flange parts 13*b* and 13*c* to be joined to the outside sheathing 11 by laser welding, the flange parts 12*b* and 12*c* extending continuously from opening defining edges of the body part 13*a* in opposite directions, as shown in FIG. 2(*c*).

When use is made of a member, like the second reinforcement member 13, to be formed with a weld line extending in a direction that is not coincident with the surface polishing direction (ground surface finishing direction) on the outside surface of the outside sheathing 11, laser welding should be conducted to join the second reinforcement member 13 to the first reinforcement member 12 (body part 12*aa*) directly joined to the outside sheathing 11 so as to prevent a resulting weld mark from being exposed on the outward appearance (outside surface). Since the weld mark is not exposed at a place that can be viewed from the outside, the laser welding conducted in this case can be full penetration laser welding which is easy to control during welding unlike the laser welding conducted to join the outside sheathing 11 and the first reinforcement member 12 (flange parts 12*b* and 12*c*) together. By thus employing partial penetration laser welding and full penetration laser welding separately in constructing the entire structure by laser welding, the entire structure can be imparted with required joint strength easily without impairment of its outward appearance.

Figure 3:
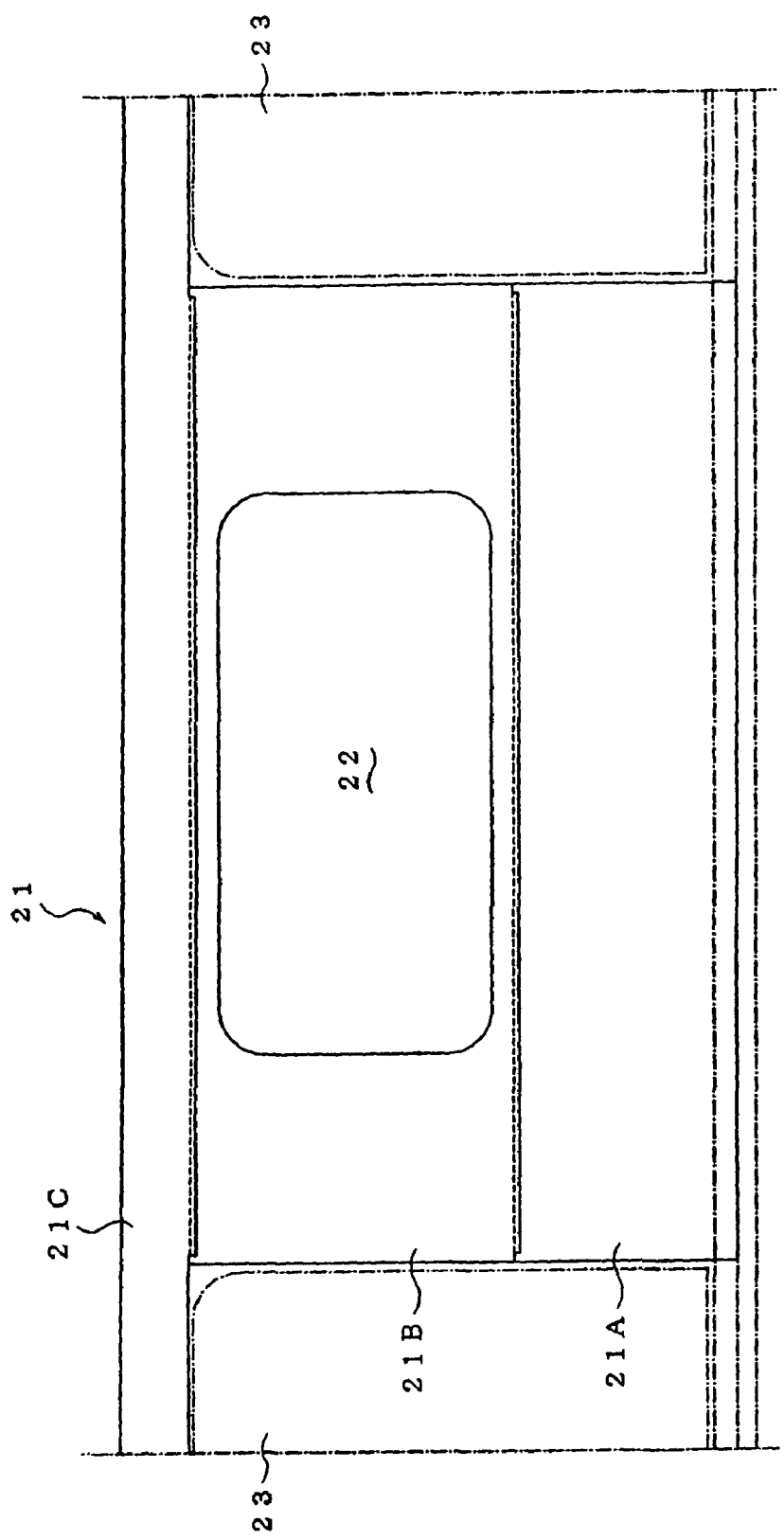
FIG. 3 is a view showing a side construction for rolling stock according to the present invention as viewed from the outside of the railway car.

With reference to FIGS. 3 to 14, description will be made of a case in which such a laser-welded joint or outside sheathing panel is used in a body structure for rolling stock As shown in FIG. 3, an outside sheathing 21 (having a thickness of 1.5 mm for example) comprises three parts including a wainscot sheathing part 21A, a pier panel/window periphery part 21B, and a frieze board part 21C, which have their respective end edges lapped over the other and joined together by partial penetration laser welding.

These parts 21A to 21C of the outside sheathing 21 each has an outside surface previously polished in a direction coinciding with the longitudinal direction of a railway car (rail direction) and formed with a weld line extending parallel with the longitudinal direction of the railway car by laser beam. Reference numerals 22 and 23 denote a window opening portion and a door opening portion, respectively.

As shown in FIGS. 4 to 9 and 12 to 14, the parts 21A to 21C of the outside sheathing 21 are interiorly joined with inside plate panels (each having a thickness of 1 mm for example) 25 to 29 extending parallel in the longitudinal direction of the railway car by partial penetration laser welding, each of the inside plate panels 25 to 29 being shaped like a hat in section. That is, the inside plate panels 25 to 29 extend in the longitudinal direction of the railway car, which coincides with the direction of the weld line formed by laser welding.

Figure 4:
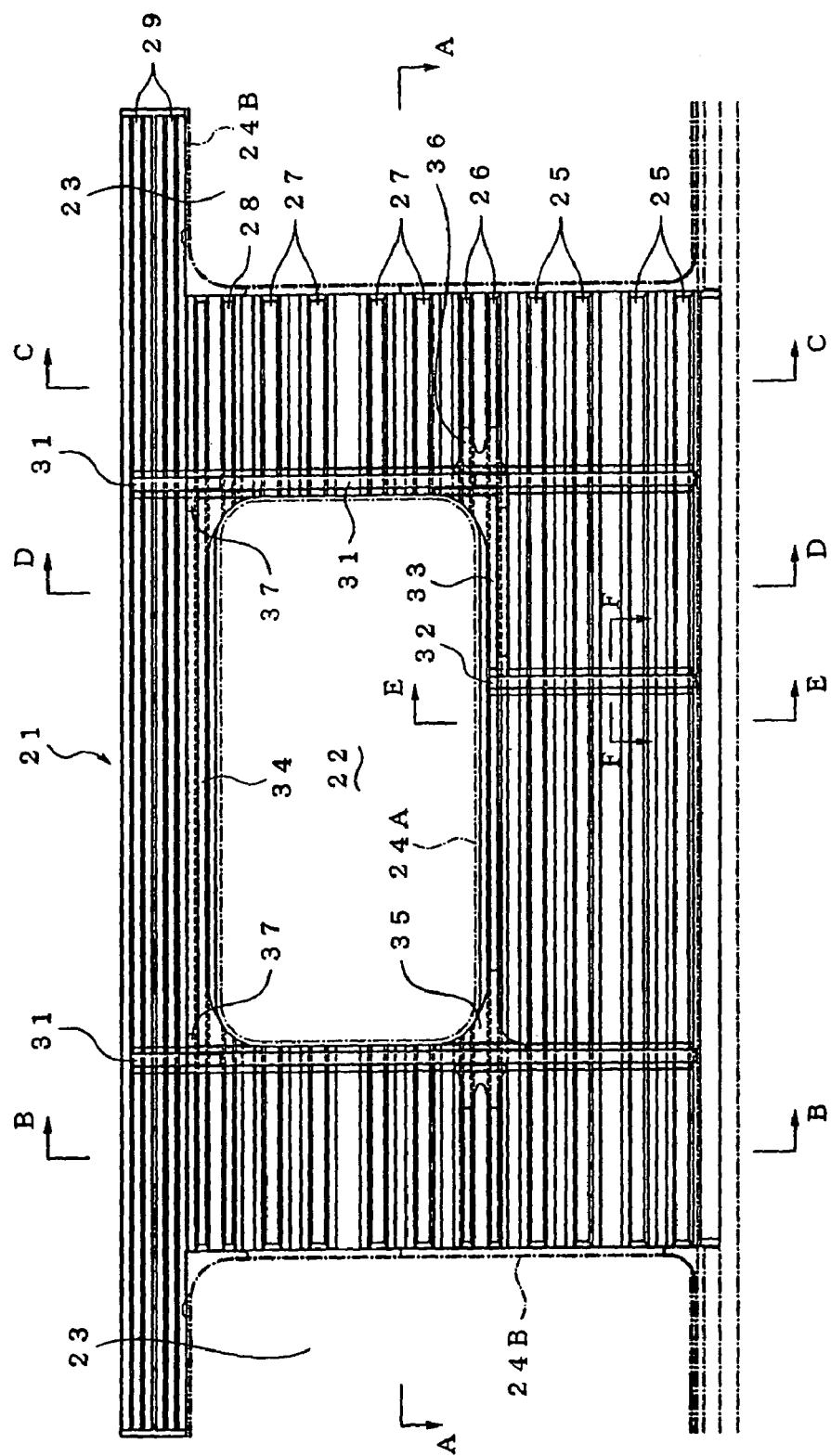
FIG. 4 is a view showing the side construction for rolling stock as viewed from the inside of the railway car.
Figure 5:
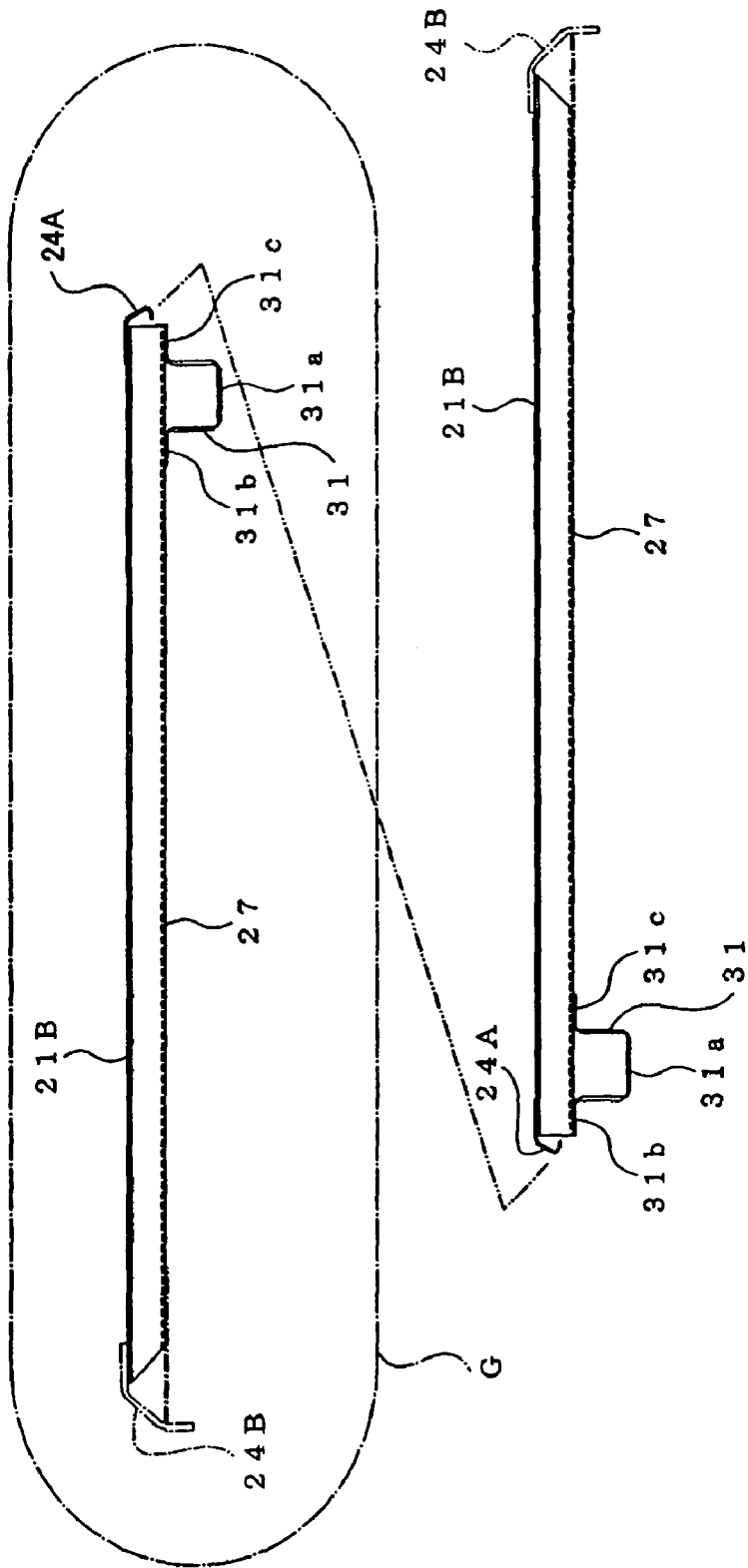
FIG. 5 is a sectional view taken along line A-A of FIG. 4.

As shown in FIG. 4, the wainscot sheathing part 21A of the outside sheathing 21 is interiorly provided with four inside plate panels 25 each shaped like a hat in section and extending in the longitudinal direction of the railway car. The inside plate panels 25 are vertically arranged in parallel at predetermined pitches. The pier panel/window periphery part 21B (of the outside sheathing) is interiorly provided with two inside plate panels 26 each having a ridge portion, four inside plate panels 27 each shaped like a hat in section, and two inside plate panels 28 each having a ridge portion, which are arranged in the ascending order on each of the front and rear sides of the window opening portion 22. All the inside plate panels 26, 27 and 28 are vertically arranged in parallel at predetermined pitches so as to extend in the longitudinal direction of the railway car. The frieze board part 21C of the outside sheathing 21 is interiorly provided with two inside plate panels 29 which are vertically arranged in parallel with a predetermined spacing therebetween so as to extend in the longitudinal direction of the railway car.

On the front and rear sides of the window opening portion 22, door end posts 31 each shaped like a hat in section and extending in a direction perpendicular to the inside plate panels 25 to 29 are laid over the inside plate panels 25 to 29 on the inner side in the railway car. Each of the door end posts 31 has flange parts which are joined to the body parts of the inside plate panels 25 to 29 by full penetration laser welding by which the bottom of a molten pool penetrates through each of the inside plate panels 25 to 29. In this way, a portion around the side opening is stiffened. Each of the door end posts 31 corresponds to the aforementioned second reinforcement member and has a body part 31*a* having a U-shaped section and flange parts 31*b* and 31*c* joined to the inside plate panels 25 to 29 by laser welding and extending continuously from the body part 31*a* in opposite directions, as shown in FIGS. 5 to 11.

Also, a window post 32 shaped like a hat in section is provided under the window opening portion 22 as shown in FIG. 4. The window post 31 has a structure similar to the aforementioned door end post 31, having a body part 32*a* having a U-shaped section and flange parts 32*b* and 32*c* extending continuously from the body part 32*a* in opposite directions, the flange parts 32*b* and 32*c* being joined to the body parts of the inside plate panels 25 and the like by full penetration laser welding by which the bottom of a molten pool penetrates through each of the inside plate panels 25 or the like.

Figure 6:
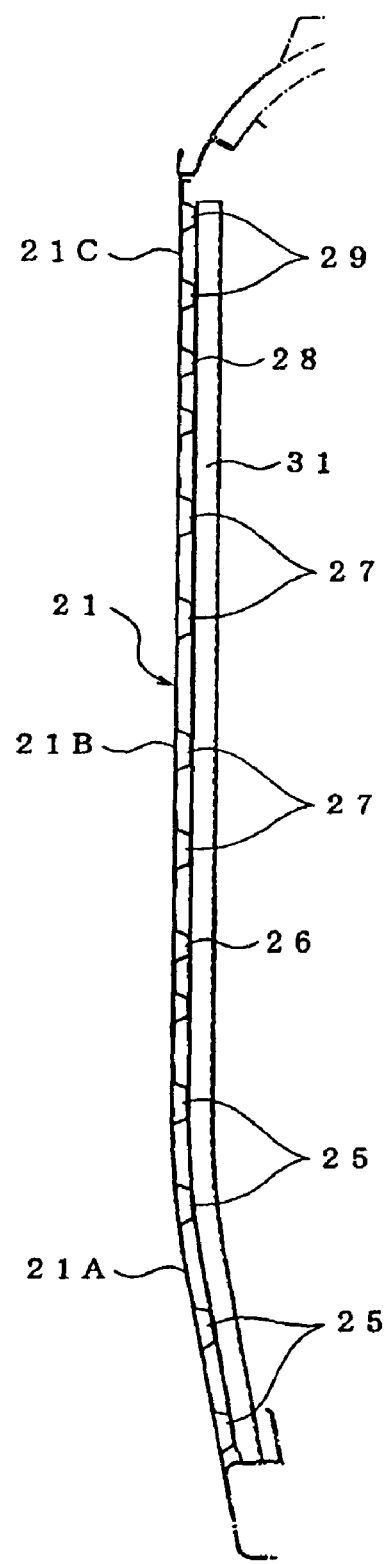
FIG. 6 is a sectional view taken along line B-B of FIG. 4.
Figure 7:
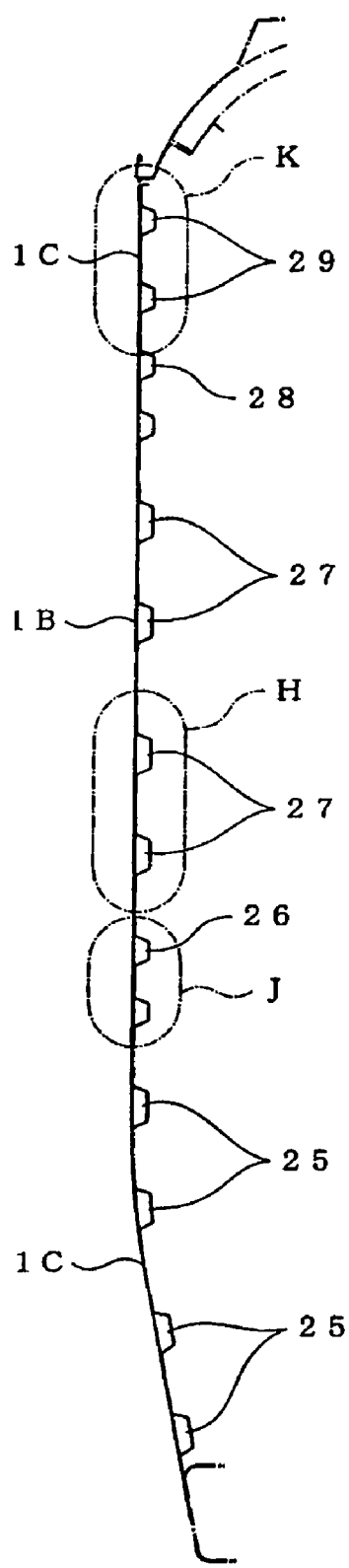
FIG. 7 is a sectional view taken along line C-C of FIG. 4.
Figure 8:
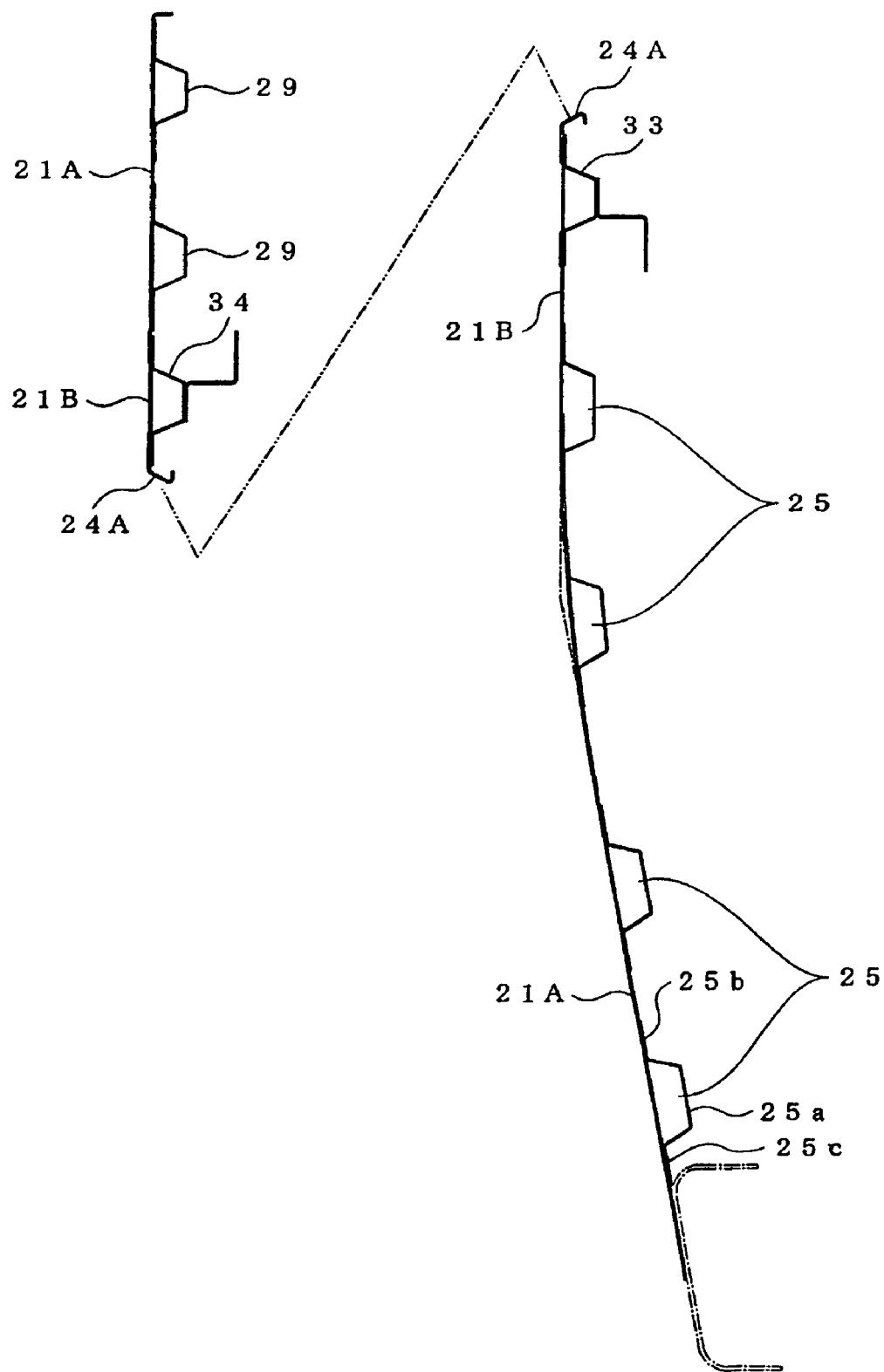
FIG. 8 is a sectional view taken along line D-D of FIG. 4.

Each of the above-described internal panels 25 to 29 corresponds to the aforementioned first reinforcement member 12 and is shaped like a hat in section to define therein a space gradually widening as it extends toward the opening as shown in FIG. 6. For example, the inside plate panel 25 has a body part 25a U-shaped in section to define therein a space gradually widening as it extends toward the opening, and flange parts 25b and 25c joined to the outside sheathing 21A by laser welding and extending continuously from the body part 25a in opposite directions, as shown in FIG. 8.

Figure 9:
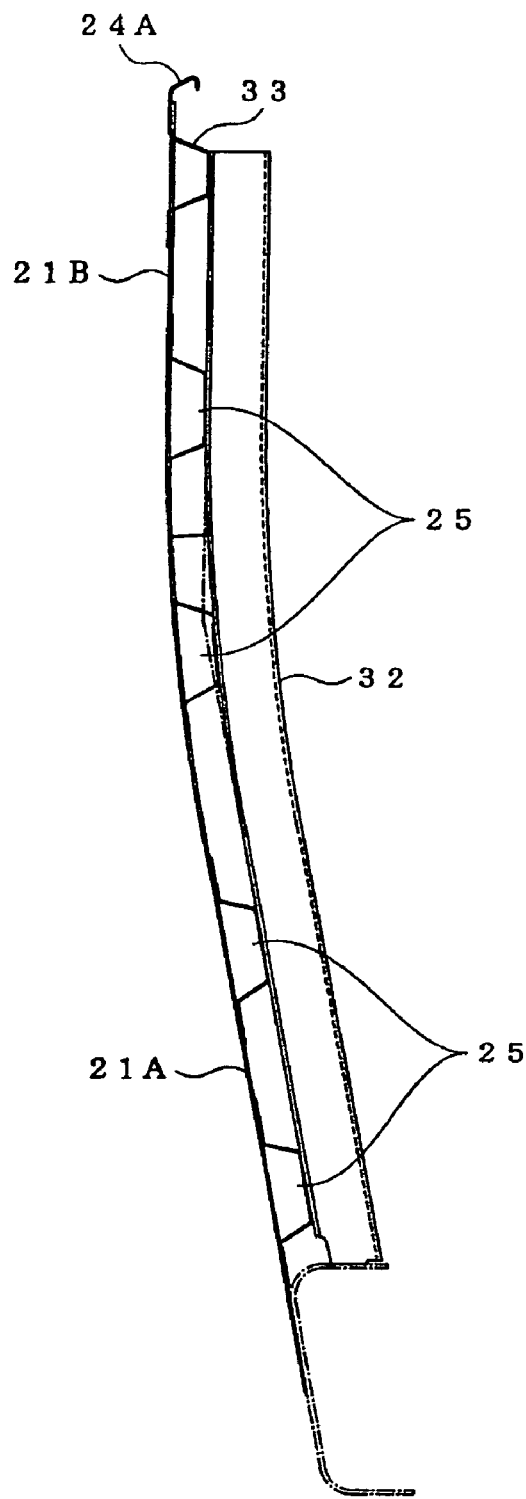
FIG. 9 is a sectional view taken along line E-E of FIG. 4.
Figure 10:
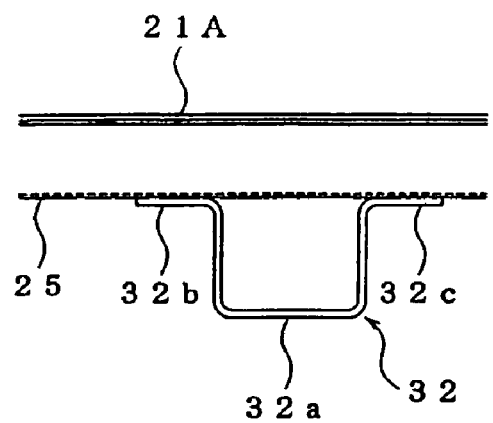
FIG. 10 is a sectional view taken along line F-F of FIG. 4.
Figure 11:
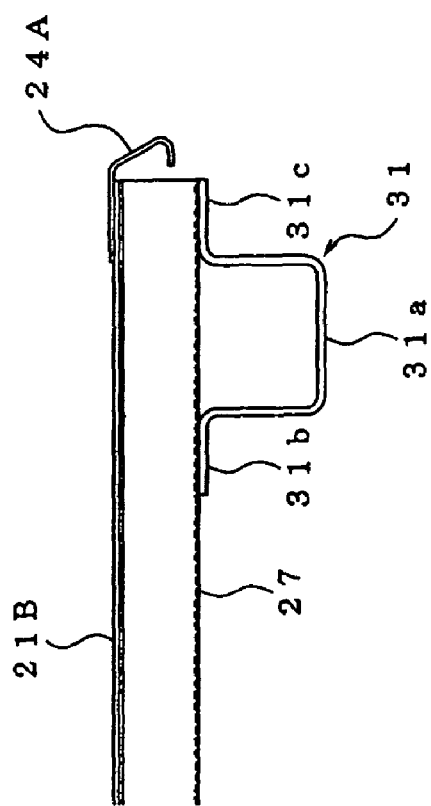
FIG. 11 is an enlarged view showing a portion G shown in FIG. 5.
Figure 11:
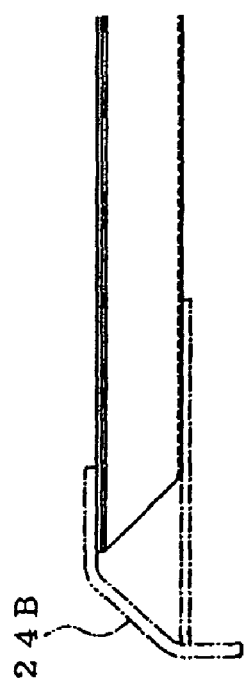
Figure 12:
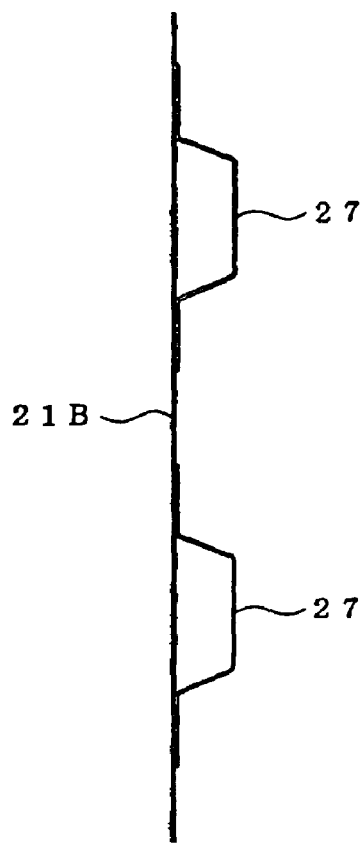
FIG. 12 is an enlarged view showing a portion H shown in FIG. 7.
Figure 13:
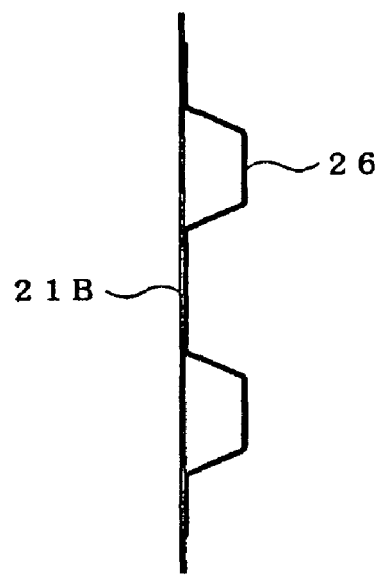
FIG. 13 is an enlarged view showing a portion J shown in FIG. 7.
Figure 14:
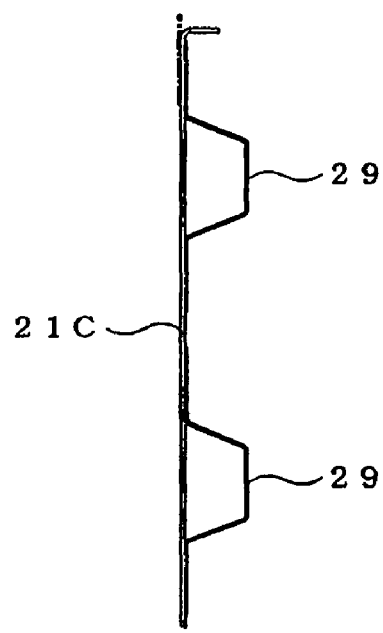
FIG. 14 is an enlarged view showing a portion K shown in FIG. 7.

As shown in FIG. 4, a belt rail 33 and a window head 34 are joined to respective portions lying under and above the window opening portion 22 by laser welding. Like the inside plate panels 25 to 29, the belt rail 33 and the window head 34 are each shaped like a hat in section to define therein a space gradually widening as it extends toward the opening as shown in FIGS. 8 and 9. Reference numerals 24A and 24B denote a window frame and a doorframe, respectively.

As shown in FIG. 4 again, the window opening portion 22 has four corners provided with respective joints 37, and each of the lower joints 37 is opposed to another joint 36 across the adjacent door end post 31.

The inside plate panels 25 to 29 are joined to the outside sheathing 21 in such a manner that: the inside plate panels 25 to 29 are overlaid on the inside surface of the outside sheathing 21; and the resulting structure is continuously irradiated with moving laser beam from the inside plate panel side so as to be heated until a region extending to an inner portion of the outside sheathing 21 becomes molten with the laser power or moving speed of the laser beam controlled so as not to allow a bottom portion of a resulting molten pool to reach an outside surface of the outside sheathing 21 (partial penetration laser welding). Such unification of the type of joint between the outside sheathing 21 and the inside plate panels 25 to 29 (partial penetration laser-welded joint) makes it possible to stabilize the welding operation. Further, since the outside sheathing 21 is supported by highly stiff framework members (inside plate panels 25 to 29, door end posts 31, window post 32 and the like) against antiplane deformation, the accuracy of sectional dimensions can be improved.

Figure 15:
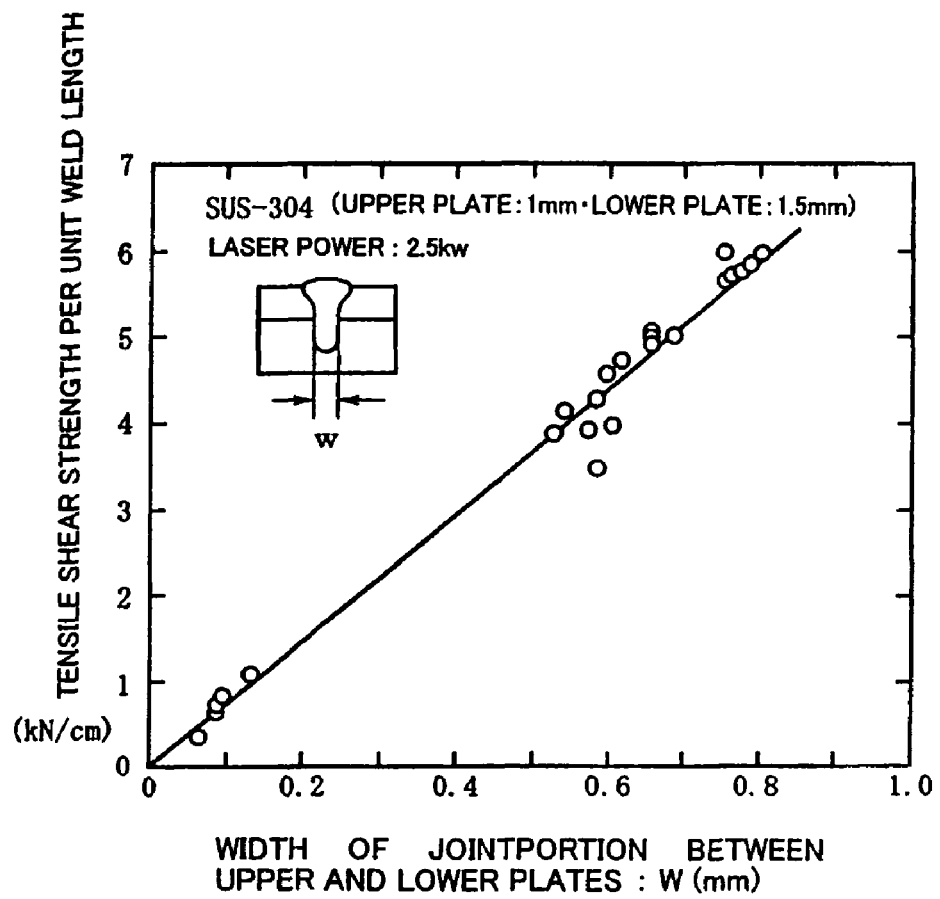
FIG. 15 is a diagram showing the relationship between the width of a joint portion of upper and lower plates and the tensile shear strength per unit weld length.

Any one of the outside sheathings 21 (21A to 21C) is a plate member having an outside surface polished (surface-finished) in the longitudinal direction of the railway car which is substantially parallel with the direction of a weld line to be formed by the aforementioned laser beam. The polishing is desirably BG (belt grinder) finishing using a belt grinder. A trial model of a side construction was constructed using, for example, SUS304#80BG material, which is frequently used as an outside sheathing for rolling stock for domestic old railroad lines. In the case where inside plate panels (each having a thickness of 1 mm) were laser-welded to an outside sheathing from the upper plate side at a laser power of 2.5 kW, the relationship between the width of the joint portion between the upper and lower plates and the tensile shear strength was proved to be as shown in FIG. 15. As can be understood from FIG. 15, if the welding speed is controlled to adjust the joint width w to about 0.7 mm, a required joint strength (a tensile shear strength of about 5 kN/cm) can be ensured. Because scorch results from welding if the upper plate is not thinner than the lower plate, it can be estimated from various experiments that the plate thickness of the lower plate need be 1.5 times or more as large as the plate thickness of the upper plate (for example, a combination of an upper plate thickness of 1 mm and a lower plate thickness of 1.5 mm or a combination of an upper plate thickness of 1 mm and a lower plate thickness of 2.0 mm).

Figure 16:
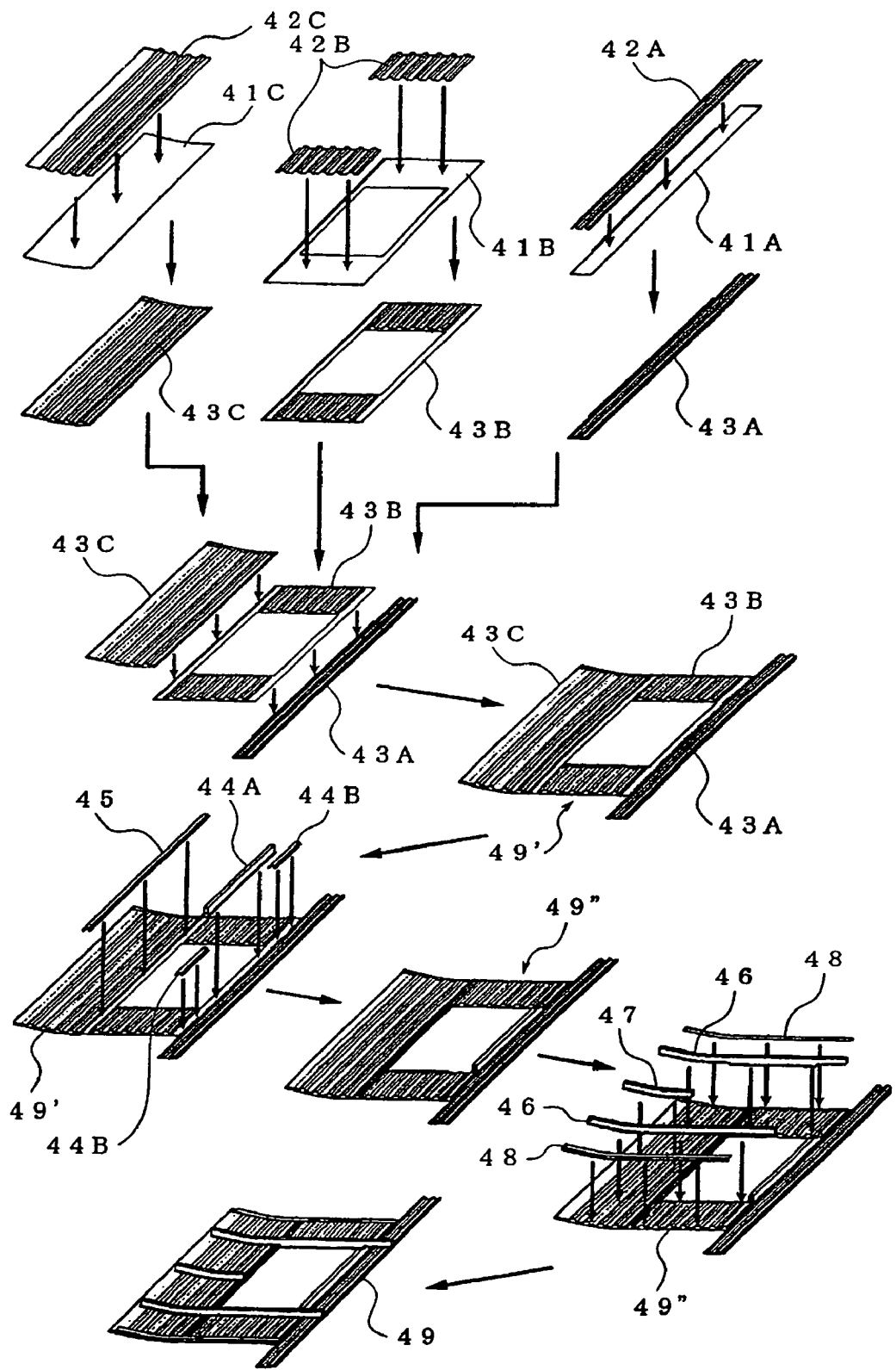
FIG. 16 is an explanatory view illustrating one exemplary procedure for assembling a side construction for rolling stock according to the present invention.
Figure 17:
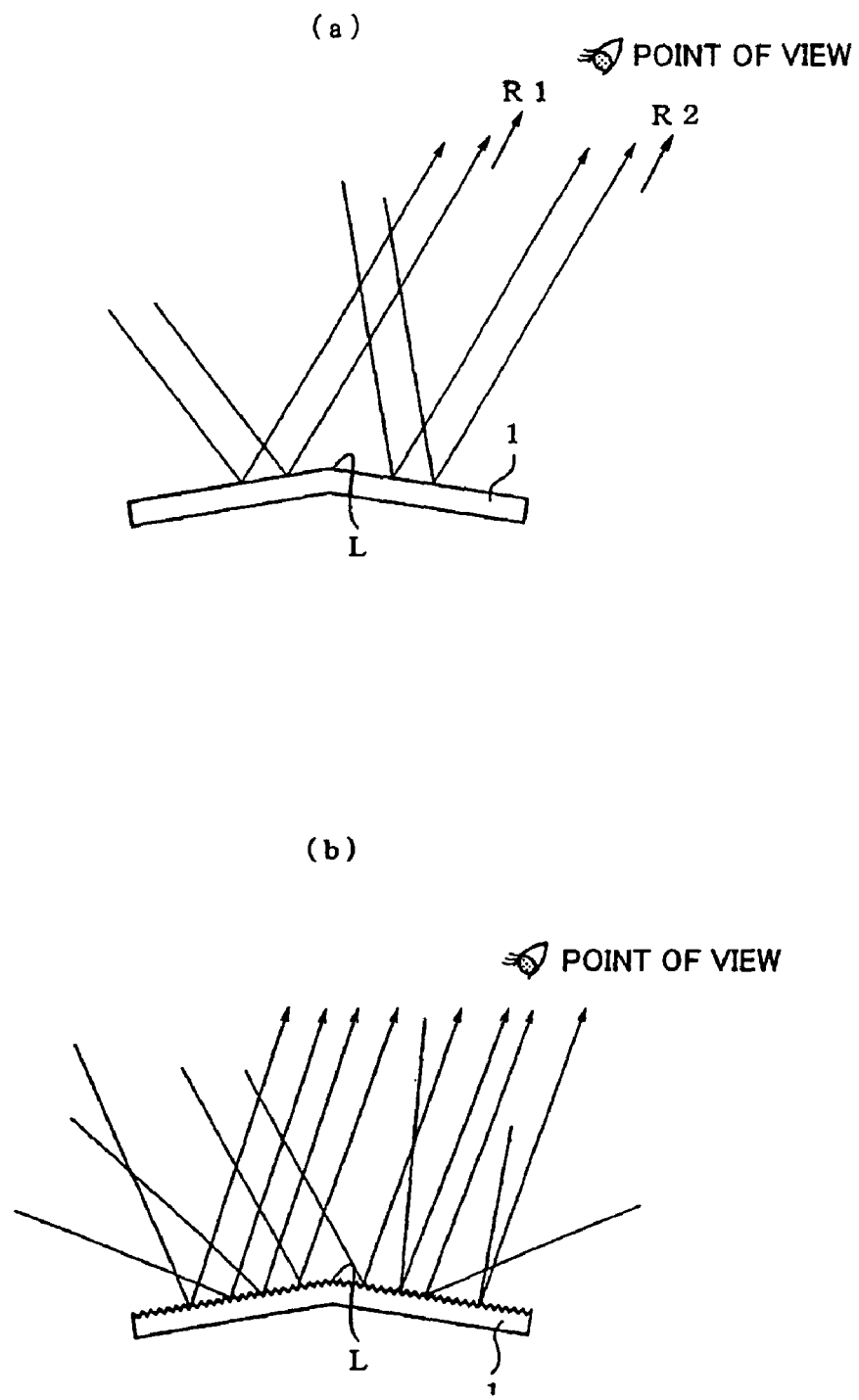
FIGS. 17(a) and 17(b) are each an explanatory view illustrating the principle based on which a weld line is rendered invisible.
Figure 18:
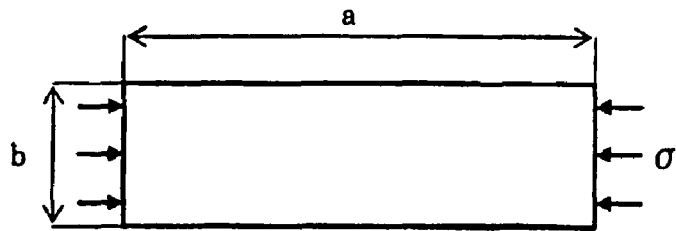
FIG. 18(a) is an explanatory view illustrating a buckling problem associated with a rectangular plate.
FIG. 18(b) is an explanatory view illustrating a shear buckling problem associated with a rectangular plate.
FIG. 18(c) is an explanatory view illustrating a buckling mode of an elongate rectangular plate.
Figure 18:
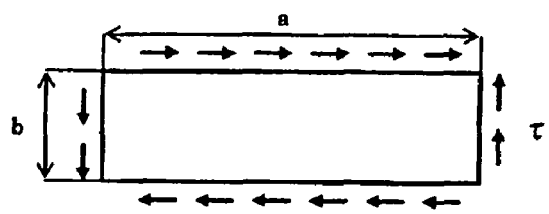
Figure 18:
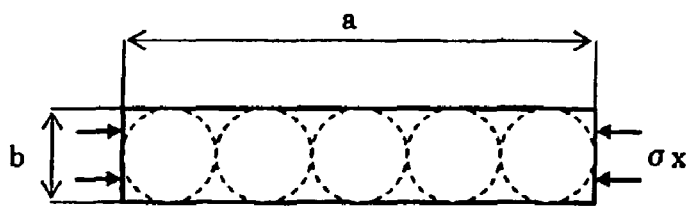
Figure 18:
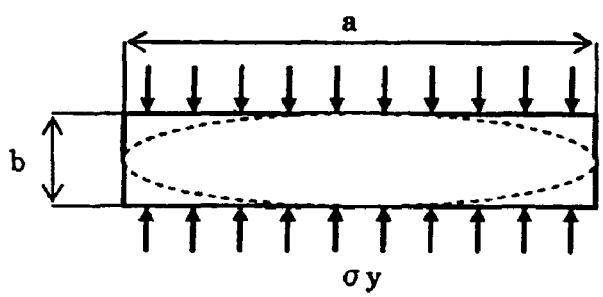
Figure 18:
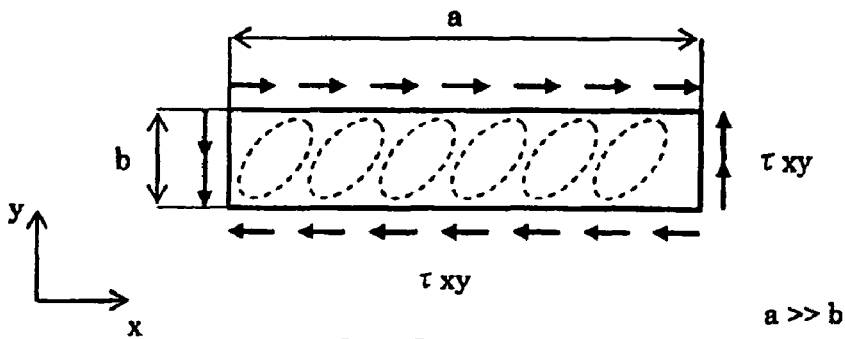
Figure 19:
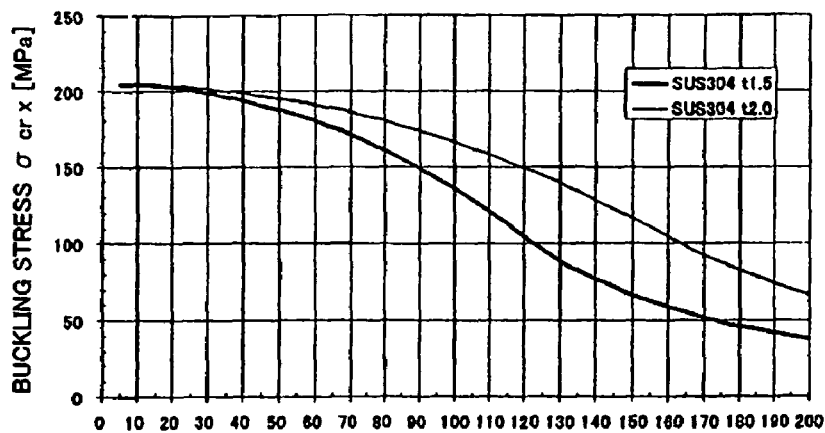
FIG. 19(a) is an explanatory diagram plotting the relationship between short side length b and buckling stress σcr,x along the short side.
FIG. 19(b) is an explanatory diagram plotting the relationship between short side length b and buckling stress σcr,y along the short side.
FIG. 19(c) is an explanatory diagram plotting the relationship between short side length b and shear buckling stress τcr.
Figure 19:
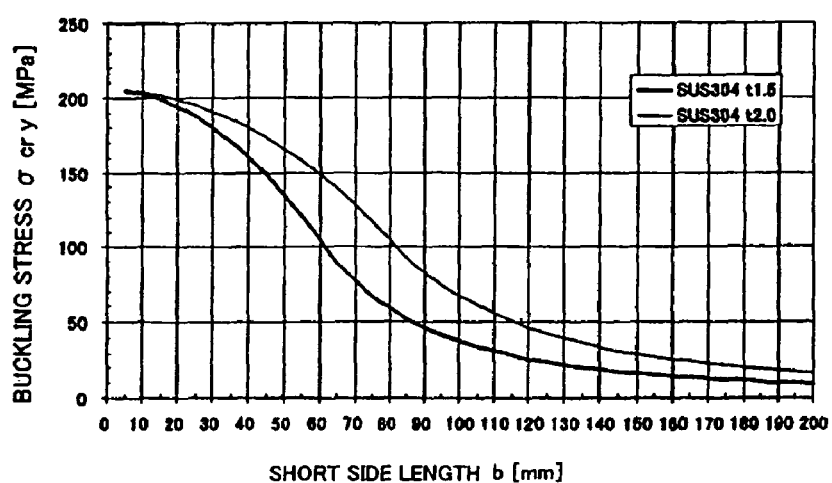
Figure 19:
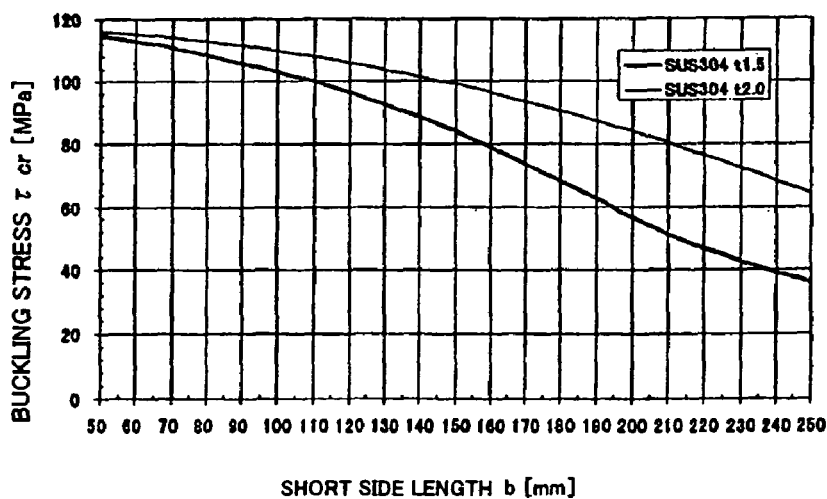

A side construction for rolling stock may be constructed in a different manner than described above in which the inside plate panels each shaped like a hat in section are replaced with an inside plate panel formed with repeated groove and ridge (made by joining inside plate panels each having a hat-shaped section one to another contiguously), as shown in FIG. 16.

In this case, outside sheathings 41A, 41B and 41C, which correspond to the frieze board part, pier panel/window periphery part and wainscot sheathing part, respectively, are each interiorly joined with a respective one of inside plate panels 42A, 42B and 42C each having a size adjusted to a respective one of the outside sheathings by partial penetration laser welding in the longitudinal direction of the railway car to form outside sheathing panels 43A, 43B and 43C for the frieze board part, pier panel/window periphery part and wainscot sheathing part, respectively. In this case, the groove portions (portions contacting the inside surfaces of the outside sheathings 41A to 41C) of the inside plate panels 42A to 42C extend in the longitudinal direction of the railway car and these portions are joined to the outside sheathings 41A to 41C by partial penetration laser welding.

Subsequently, the outside sheathings 43A, 43B and 43C for respective of the frieze board part, pier panel/window periphery part and wainscot sheathing part are joined to each other to have predetermined positional relation by partial penetration laser welding in the longitudinal direction of the railway car, thus forming a construction 49'.

Thereafter, window heads 44A and 44B and a belt rail 45 are joined to portions lying above and under the window opening portion by partial penetration laser welding in the longitudinal direction of the railway car, thus forming a construction 49". Further, the construction 49" is joined with door end posts 46, window post 47 and doorframes 48 to ensure a required stiffness, thus forming a side construction 49.

Second Embodiment

Figure 20:
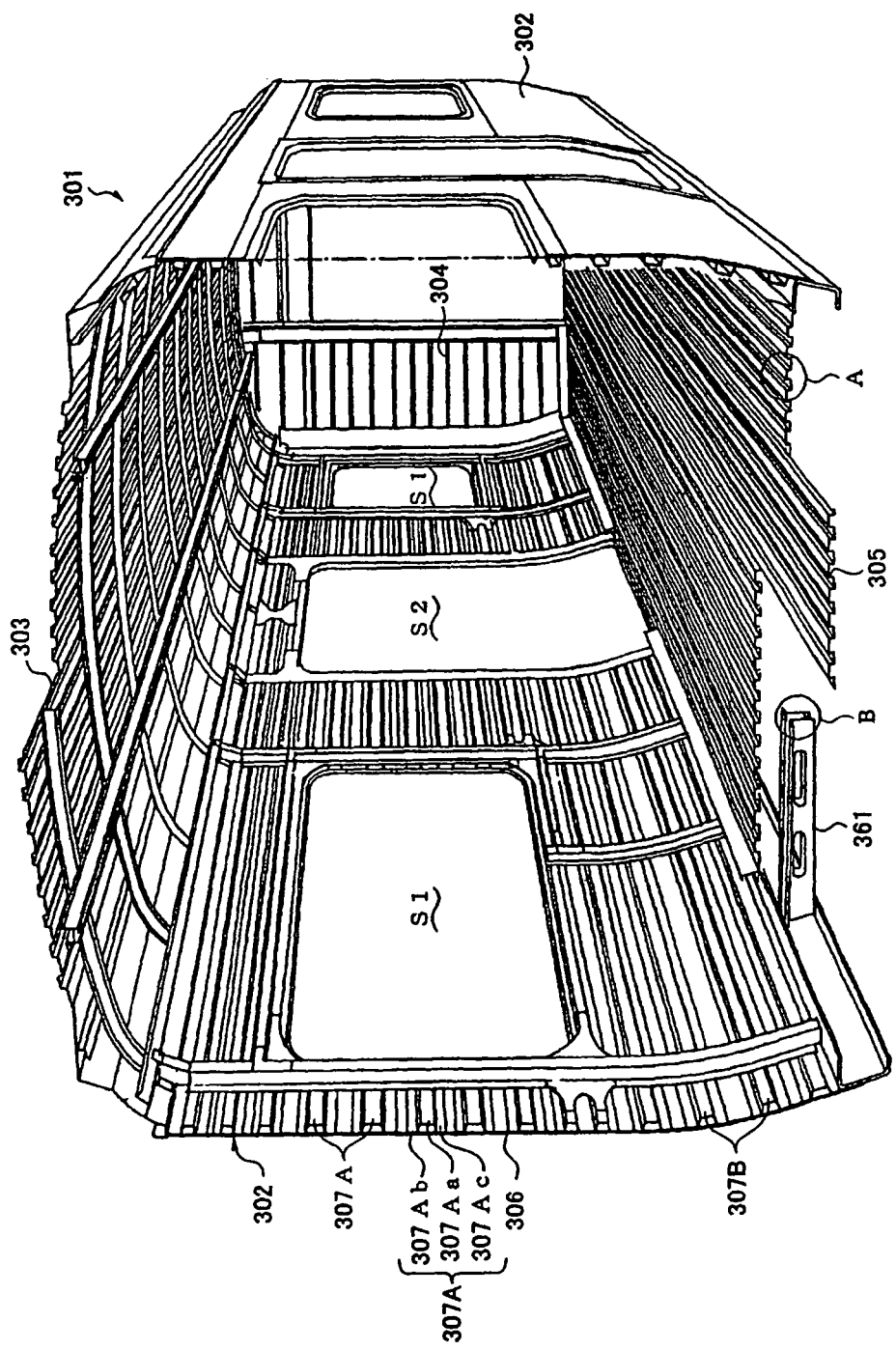
FIG. 20 is a perspective view showing a body structure for rolling stock according to a second embodiment of the present invention.

FIG. 20 is a perspective view showing a body structure for rolling stock according to a second embodiment of the present invention.

As shown in FIG. 20, the body structure 301 for rolling stock includes right and left side constructions 302, a roof construction 303, front and rear end constructions 304, and an underframe 305. Each of the side constructions 302 has an outside sheathing 306 and outside sheathing reinforcement members 307A and 307B (third reinforcement members) joined to the inside surface of the outside sheathing 306 by laser welding. (The same holds true for the roof construction 303 and the end constructions 304.) The outside sheathing reinforcement member 307A (or 307B) is shaped like a hat in section having a U-shaped part 307Aa having a U-shaped section, and fitting parts 307Ab and 307Ac extending continuously from the opposite end edges of the U-shaped part 307Aa in opposite directions. These fitting parts 307Ab and 307Ac are laser-welded to the outside sheathing 306.

A laser device (not shown) used for laser welding is attached to a wrist of a multijoint robot. This multijoint robot has plural axes (six axes for example) and is capable of moving the laser device along a predetermined weld line U on a to-be-welded thin plate (for example, outside sheathing 306) in a fixed condition. Such a laser device for laser lap welding is integrated with a laser focusing device and pressing means. This laser device presses the pressing means having, for example, a roller (hold-down roller 331) against a portion of a work adjacent a weld position while moving the pressing means along the weld line U and applies a laser beam 312 through the laser focusing device to the weld position. Thus, the laser device is configured to be capable of accurately keeping a focal length of the laser beam while ensuring intimate contact between lapped portions.

The outside sheathing 306 and an edging member 308 (such as a window frame or a door mask) to be provided on the peripheral edge of an opening portion (window opening portion S1 or a doorway opening portion S2) are joined together by continuous laser welding. The joint formed in this case may be a lap joint or a butt joint. Though not illustrated in detail, the outside sheathings are joined to each other by continuous laser welding.

Meanwhile, from a stress analysis on a conventional railway car in which an in-plane stress component exerted on the outside sheathing 306 is resolved into uniaxial stresses $\sigma x$ and $\sigma y$ in respective of the rail direction and a direction perpendicular thereto and shear stress $\tau$, it can be estimated that stresses $\sigma x$, $\sigma y$ and $\tau$ working at a corner of the window opening portion S1 are about 130, 50 and 35 Mpa, respectively. Substitution of the values of stresses $\sigma x$, $\sigma y$ and $\tau$ thus estimated into the aforenoted formula (11) yields b=min(104, 87, 255)=87 mm as a theoretical value of pitch b of the reinforcement members 307 A to be arranged in the vicinity of the corner of the window opening portion S1. Actually, for the structure to have a slightly higher strength for safety, the pitch b of the outside sheathing reinforcement members 307A arranged in the vicinity of the corner of the window opening portion S is set to 80 mm. From this fact, it can be said that the pitch b of outside sheathing reinforcement members 307A defined by the spacing between adjacent weld lines U formed by laser welding is determined based on the buckling strength of a portion at which the load imposed on the outside sheathing reinforcement members 307A becomes maximized in the rail direction in which the outside sheathing reinforcement members 307A extend.

Figure 21:
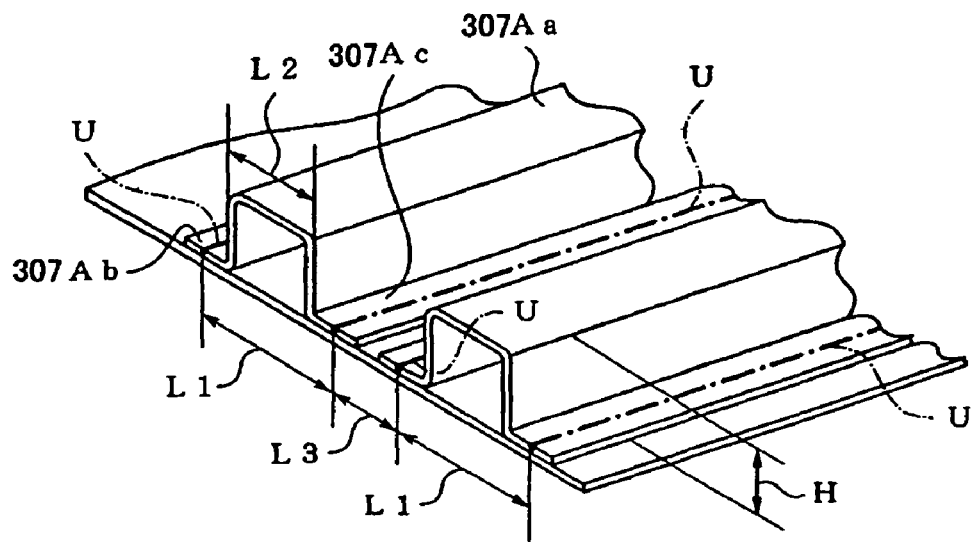
FIG. 21 is an explanatory view illustrating the relation between an outside sheathing and outside sheathing reinforcement members.

By setting the spacing L1 defined by laser welding (weld lines U) to 80 mm (hat width L2=50 mm) as shown in FIG. 21, the aforementioned pitch b of outside sheathing reinforcement members 307A can be set to 80 mm. The hat width L2 of each of outside sheathing reinforcement members provided on other part of the outside sheathing 306 and the laser welding spacing L1 associated therewith are established in the same manner as described above. For example, the hat width L2 of each of outside sheathing reinforcement members 307B and the laser welding spacing L1 are set to 70 mm and 100 mm, respectively. Laser welding spacing L3 between outside sheathing reinforcement members 307A and 307B positioned adjacent to each other is appropriately established in accordance with the shapes and sizes of the outside sheathing reinforcement members 307A and 307B, the laser welding spacing L1 and the like. In this embodiment, the spacing L3 is set to 20 to 50 mm. The height H of the outside sheathing reinforcement members 307A and 307B is appropriately established based on the general buckling strength of the outside sheathing 306 of the side construction 302. The height H established here is 25 mm.

If the sectional shape of an outside sheathing reinforcement member is determined part by part of outside sheathing 306, there will be an increase in the number of types of outside sheathing reinforcement members to be used. For this reason, the sectional shapes of the outside sheathing reinforcement members used in this embodiment are limited to two types.

In this way, the side construction is formed in which the hat width L2 (the width of the U-shaped part) of each of the outside sheathing reinforcement members 307A provided in the vicinity of each corner of the window opening portion S1 and in the vicinity of each of the upper corners of the doorway opening S2 is set to 50 mm while the hat width of each of the outside sheathing reinforcement members 307B provided on other part set to 70 mm. Thus, the hat width of each of the outside sheathing reinforcement members 307A provided in the vicinity of each corner of the window opening portion S1 and in the vicinity of each of the upper corners of the doorway opening S2 where the stress exerted is high and the load imposed is large, is set larger than the hat width of each of the outside sheathing reinforcement members 307B provided on other part. The outside sheathing is stiffened by stringers provided separately against antiplane flexure in the direction perpendicular to the rail direction.

The outside sheathing 306 and each of the outside sheathing reinforcement members 307A and 307B define a closed space therebetween. Since the portion of the outside sheathing 306 and/or the portion of each of the outside sheathing reinforcement members 307A and 307B, which are located near the entrance of the closed space, are not reinforced, the outside sheathing 306 of the side construction to be subjected to relatively bad load conditions and the like might buckle in the direction perpendicular to the direction in which the outside sheathing reinforcement members 307A and 307B extend. For the purpose of reinforcing the portion of the outside sheathing 306 and/or the portion of each of the outside sheathing reinforcement members 307A and 307B which are located near the entrance of the closed space, a small-sized reinforcement plate may be joined to a portion located coincidentally with the closed space prior to the formation of the closed space by joining of the outside sheathing reinforcement member 307A or 307B to the outside sheathing 306. For the workability to be enhanced, structures as shown in FIGS. 22(a) to 22(b) may be employed.

If a small-sized reinforcement member 311 (a fourth reinforcement member) having a U-shaped section is previously provided inside the outside sheathing reinforcement member 307 having a hat-shaped section, local reinforcement can be achieved. That is, the two reinforcement members 307 and 311 are simply integrated together previously by positioning the reinforcement member 311 in an end portion of the outside sheathing reinforcement member 307 and joining opposite side portions 311a of the reinforcement member 311 to respective of the opposite side portions of the U-shaped part 307a of the outside sheathing reinforcement member 307 by laser welding along the weld line U.

With such a structure, the reinforcement member 311 can also be mounted on the outside sheathing 306 by merely joining the outside sheathing reinforcement member 307 to the outside sheathing 306 by laser welding. Also, the opening portion of the outside sheathing reinforcement member can be reinforced and, hence, necessary and minimum reinforcement can be provided on a portion requiring reinforcement without the need to increase the number of processes.

Figure 22:
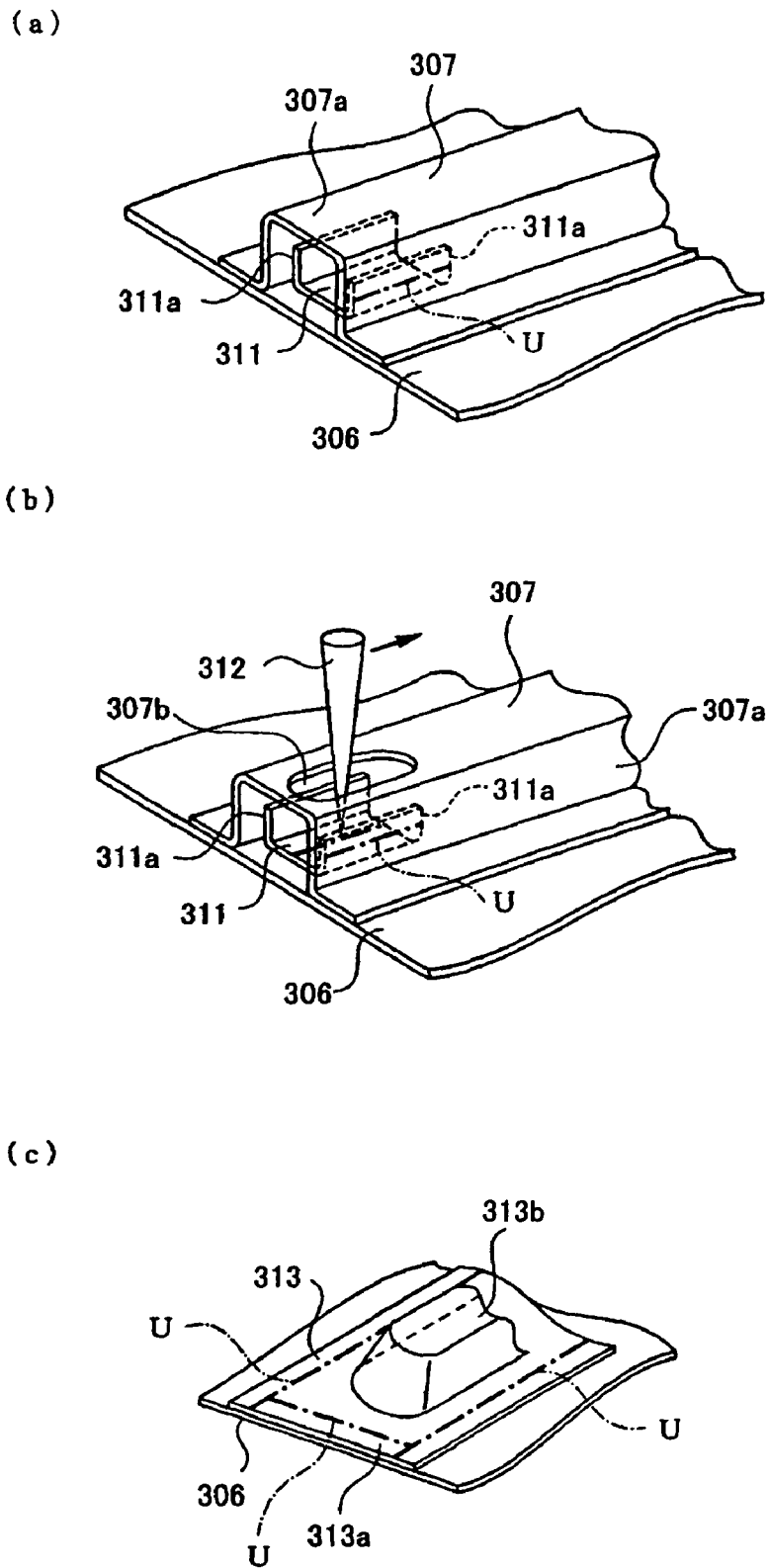
FIGS. 22(a) and 22(b) are each a view showing an embodiment in which outside sheathing reinforcement member are provided at their end portions with a small-type reinforcement member.
FIG. 22(c) is a perspective view showing a variation of the outside sheathing reinforcement member.

In addition to the above-described reinforcement, the bottom portion of the reinforcement member 311 may be joined to the outside sheathing 306 by means of a laser beam 312 of laser welding (or a spot-welding gun) through an opening 307b (or a notch) formed in the outside sheathing reinforcement member 307 (the head portion of the U-shaped part 307a), as shown in FIG. 22(b). By so doing, the buckling strength of the outside sheathing 306 can be further enhanced.

Usually, the aforementioned outside sheathing reinforcement member 307A shaped like a hat in section is formed by bending a flat plate material into a V-shape by means of a press. Since the outside sheathing reinforcement member 307A has a two-dimensional section, an end portion of the outside sheathing reinforcement member 307A reaching the opening portion S1 or S2 of a side window or a side doorway forms an free edge exposing the closed section and, hence, the end portion might be weakened in stiffness. (The "free edge" means an exposed end portion of a member extending in a specific direction with its sectional shape held constant, the exposed end portion being free of any reinforcement or three-dimensional working.)

In view of this disadvantage, the aforementioned outside sheathing reinforcement member may be replaced with a reinforcement member 313 (with closed ends) having a root portion 313a and a hollow bulged portion 313b formed by drawing a central portion of the root portion 313a, as shown in FIG. 22(c). The root portion 313a is joined to the outside sheathing 306 by laser welding along a weld line U extending over the entire periphery of the root portion 313a as indicated by a long dashed short dashed line. This reinforcement member 313 can have enhanced buckling strength and stiffness at its ends. If continuous welding such as laser welding, in particular, is employed, the periphery of each end portion of the reinforcement member 313 can be closed completely. That is, since no free edge is formed at the end portions of the reinforcement member 313, it is possible to further enhance the stiffness of the end portions of the reinforcement member 313.

In cases where the V-bent pressed material is used as the outside sheathing reinforcement member as described above, it is preferable that an inside plate frame 314 in the form of flat plate is placed over the U-shaped parts 307a of outside sheathing reinforcement members 307 arranged on the peripheral edge portion of the opening portion S1 of, for example, a side window and then joined thereto by laser welding to interconnect the (free-edge) end portions of the outside sheathing reinforcement members 307. By so doing, the end portions of the outside sheathing reinforcement members 307 can be reinforced easily.

Figure 23:
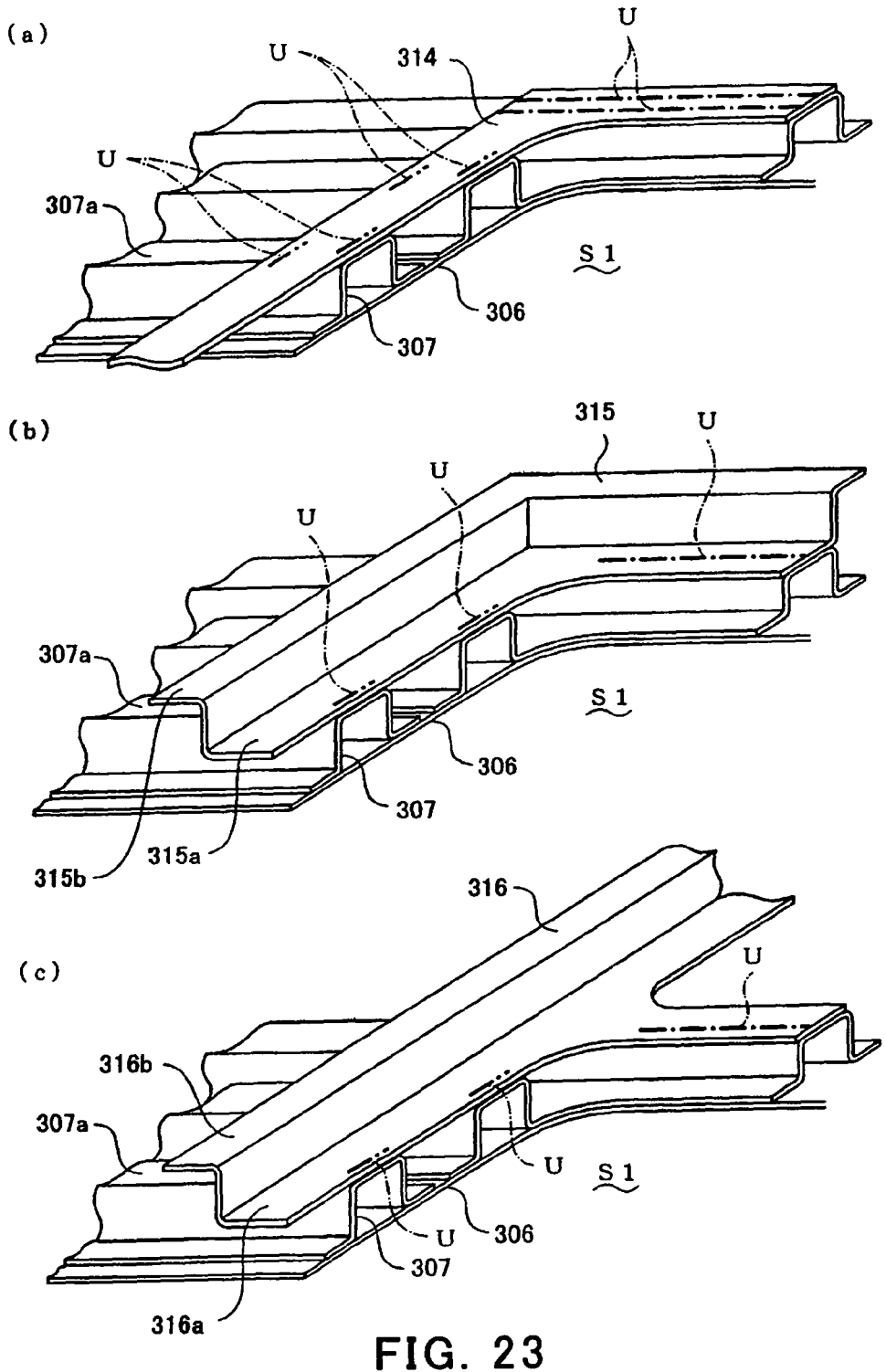
FIG. 23(a) is a perspective view showing a corner part of an opening portion.
FIG. 23(b) is a perspective view showing another example of a corner part of the opening portion.
FIG. 23(c) is a perspective view showing yet another example of a corner part of the opening portion.

The inside plate frame 314 in the form of flat plate may be replaced with an inside plate frame 315 or 316 having a certain height as shown in FIGS. 23(b) and 23(c). In this case, the inside plate frame 315 or 316 has a portion 315a or 316a to be laser-welded to the outside sheathing reinforcement members 307, and a portion 315b or 316b having an L-shaped section which extends continuously from the portion 315a or 315b on the side opposite away from the outside sheathing 306. Such an inside plate frame 315 or 316 has a higher stiffness than the inside plate frame 314 in the form of flat plate. As a result, it is possible to further enhance the stiffness of the end portions of the outside sheathing reinforcement members 307.

The above-described structures (see FIGS. 23(a) to 23(c)) are applicable not only to the peripheral edge portion of the opening portion S1 of a side window of the outside sheathing 306 but also to a corner portion of other opening portion.

If the inside plate frame 314 placed over the U-shaped parts 307a of the outside sheathing reinforcement members 307 located adjacent such an opening portion forms a free edge as shown in FIG. 23(b) or 23(c), it is difficult for shearing force to be decentralized over the inside plate frame 314 and, hence, the aforementioned opening portion sometimes have insufficient strength at its corners in particular.

Figure 24:
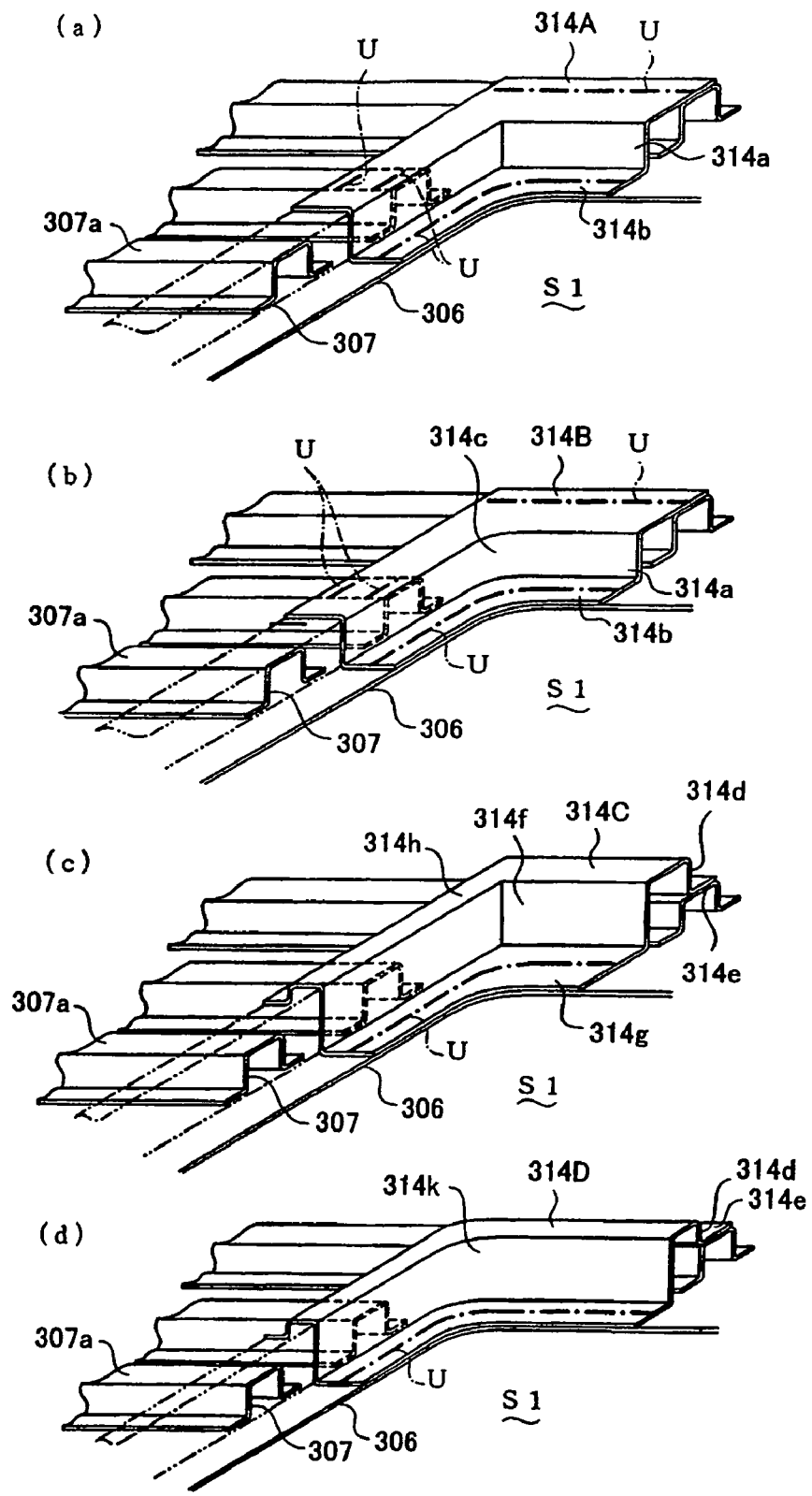
FIG. 24(a) is a perspective view showing another example of a corner part of the opening portion.
FIG. 24(b) is a perspective view showing another example of a corner part of the opening portion.
FIG. 24(c) is a perspective view showing another example of a corner part of the opening portion.
FIG. 24(d) is a perspective view showing another example of a corner part of the opening portion.

For this reason, it is desirable that an inside plate frame 314A have a body part placed over the U-shaped parts 307a of the outside sheathing reinforcement members 307, a leg part 314a extending continuously from the body part of the inside plate frame 314A down to the outside sheathing 306 so as to close the open ends of the outside sheathing reinforcement members 307, and a flange part 314b extending continuously from the leg part 314a in the direction perpendicular to the leg part 314a for direct joint to the outside sheathing 306 by laser welding, as shown in FIG. 24(a). Such a structure makes it possible to enhance the stiffness and strength of the end portions of the outside sheathing reinforcement members 307 because the inside plate frame 314 does not form any free edge as shown in FIG. 23(b) or 23(c). This structure is applicable to the corners of the opening portion S1. If the periphery of the opening portion S1 is reinforced with the inside plate frame 314A integrated with the leg part 314a and the flange part 314b, the stiffness of the opening portion and the strength of the corners can be further enhanced.

If the inside plate frame 314A for reinforcement of the peripheral edge of the opening portion S1 is mounted after the outside sheathing reinforcement members 307 each having a hat-shaped section have been joined to the outside sheathing 306, it is possible to avoid interference between the inside plate frame 314A and the hold-down roller to be described later.

A portion 314c of the leg part 14a of the inside plate frame 314B, which corresponds to a corner of the opening portion S1, may be curved by drawing or the like as shown in FIG. 24(b). Such a feature allows the inside plate frame 314B to impart the corner of the opening portion S1 with a sufficient strength assuredly.

When the outside sheathing reinforcement members 307 are required to have enhanced antiplane stiffness, an inside plate frame 314C having unequal leg sections may be used instead of the inside plate frame 314A or 314B. As shown in FIG. 24(c), the inside plate frame 314C comprises a first leg part 314d, a first flange part 314e extending continuously from and perpendicularly to the lower end edge of the first leg part 314d, a second leg part 314f formed to have a longer leg length than the first leg part 314d and extending substantially parallel with the first leg part 314d with a predetermined spacing therefrom, a second flange part 314g extending continuously from and perpendicularly to the lower end edge of the second leg part 314f, and a horizontal part 314h bridging the upper end edge of the first leg part 314d and the second leg part 314f. The first and second flange parts 314e and 314g extend away from each other. The inside plate frame 314C is configured such that in a condition where the first flange part 314e and the second flange part 314g are joined to the outside sheathing reinforcement members 307 (U-shaped parts 307a) and the outside sheathing 306, respectively, the horizontal part 314h is positioned to extend substantially parallel with the upper surfaces of the U-shaped parts of the reinforcement members 307 with a predetermined spacing therefrom. Such a feature makes it possible to enhance the antiplane stiffness of the outside sheathing reinforcement members 307.

In this case also, a portion 314k of the inside plate frame 314D, which corresponds to a corner of the opening portion, may be curved as shown in FIG. 24(b). Such a feature can enhance the strength of the corner of the opening portion S1.

The structure thus constructed provides merits including: (i) use of laser welding for joining various elements makes the outside sheathing free from decrease in buckling strength due to buckling between adjacent welded spots or initial strain and, hence, the structure can enjoy a buckling strength as designed; (i) accordingly, if the pitch of the outside sheathing reinforcement members is determined theoretically, there is no need to provide the outside sheathing with additional small reinforcement plates for further reinforcement, which can contributes to reduction in parts count and in man-hour; (iii) only two types of outside sheathing reinforcement members are used, the number of which is markedly smaller than required by the conventional art, thus leading to a reduction in the parts manufacturing cost; and (iv) the decreased number of types of parts makes it easy to improve the dimensional accuracy of the parts.

Since lap portions are metallurgically joined together continuously by continuous laser welding, a sealant as a separate part can be eliminated and the joint does not allow penetration of water therethrough due to aged deterioration. This is because laser welding can hardly cause thermal strain to occur by virtue of its high energy density, unlike arc welding.

By utilizing the feature that watertightness can be ensured by merely conducting continuous laser welding without provision of any sealant, it is possible to form a water channel such as rainwater guttering by the use of only the structural members of the body structure without the need to provide any additional water tube or rainwater guttering.

Figure 25:
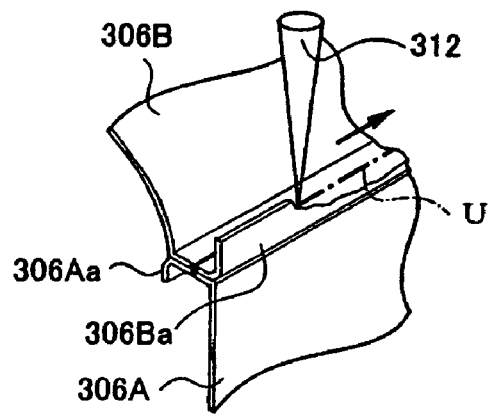
FIG. 25(a) is a perspective view showing a joint portion between a side outside sheathing and a roof outside sheathing.
FIG. 25(b) is a perspective view showing another example of a joint portion between the side outside sheathing and the roof outside sheathing.
Figure 25:
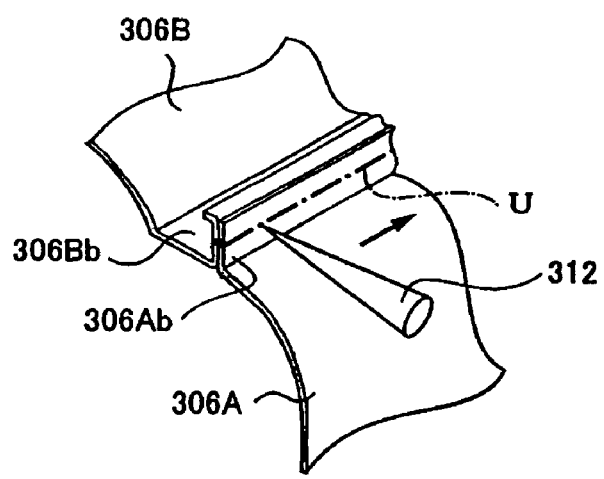

Specifically, a side outside sheathing and a roof outside sheathing are joined together by continuous laser welding. At that time, usually, at least one of the side outside sheathing and the roof outside sheathing has an edge portion that is folded to form a folded part as stiffness enhancing means for receiving counterforce produced during laser welding. As shown in FIG. 25(a), for example, an end portion of a side outside sheathing 306A (frieze board) of a side construction is folded inwardly to form a folded part 306Aa as a counterforce receiving part having a downwardly open U-shaped section for receiving counterforce produced during laser welding. An end portion of a roof outside sheathing 306B (cantrail) of a roof construction is folded outwardly to form a folded part 306Ba as a rainwater guttering part having an upwardly open U-shaped section. The upper surface of the folded part 306Aa of the side construction and the lower surface of the folded part 306Ba of the roof construction are lapped over the other, and the lap portions of the two are joined together by laser welding along a weld line U. By so doing, it is possible to ensure required stiffness as well as to form the rainwater guttering part (folded part 306Ba).

As shown in FIG. 25(b), it is possible that: the extent of the side construction is extended up to the roof outside sheathing (cantrail) lying above the side outside sheathing 306A (frieze board); and an end portion 306Ab of the side outside sheathing 306A is folded upwardly while an end portion 306Bb of the roof outside sheathing 306B to be joined with the end portion 306Ab folded outwardly to form a counterforce receiving part. Since this counterforce receiving part has an upwardly open U-shaped section, the counterforce receiving part, as it is, can be used as rainwater guttering.

Figure 26:
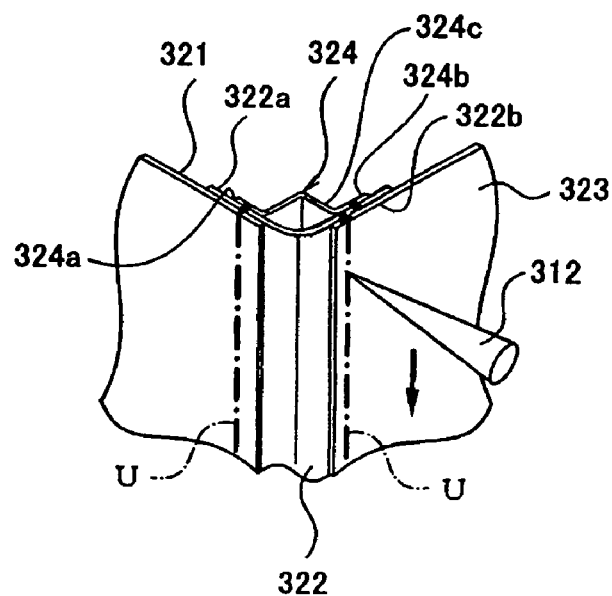
FIG. 26(a) and FIG. 26(b) are each a perspective view showing a joint portion between a side outside sheathing and an end outside sheathing.
Figure 26:
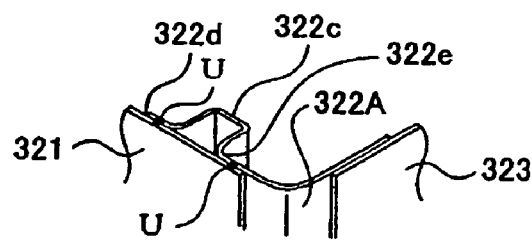

As shown in FIGS. 26(a) and 26(b), the side construction and the end construction are joined together by joining a side outside sheathing 323 to an end corner post 322 by continuous laser welding using the end corner post 322 as a counterforce receiver, the end corner post 322 having a substantially L-shaped horizontal section and having been previously joined with an end outside sheathing 321 of the end construction. The end outside sheathing 321 and the side outside sheathing 323 are positioned to extend perpendicular to each other.

In this case, if a separate member 324 is provided such as to define a closed space cooperatively with the end corner post 322 as shown in FIG. 26(b), a rainwater guttering can be formed for guiding rainwater from the roof to the ground. Thus, there is no need to provide an additional water tube for guiding rainwater from the roof to the ground. The end corner post 322 has a first face plate part 322a to be joined to the end outside sheathing 321, and a second face plate part 322b to be joined to the side outside sheathing 323. The member 324 has flange parts 324a and 324b to be joined to the face plate parts 322a and 322b, respectively, of the end corner post 322 and a curved body part 324c intervening between the flange parts 324a and 324b. The body part 324c and the end corner post 322 define therebetween the closed space for use as a water channel (rainwater guttering).

Such a closed space may be defined between the end corner post 322A and the end outside sheathing 321 as shown in FIG. 26(b). In this case, a closed space defining part 322c having a hat-shaped section is continuous with the end corner post 322A on the end outside sheathing 321 side. Flange parts 322d and 322e on opposite sides of the closed space defining part 322c are continuously laser-welded to the end outside sheathing 321, thereby ensuring watertightness.

Figure 27:
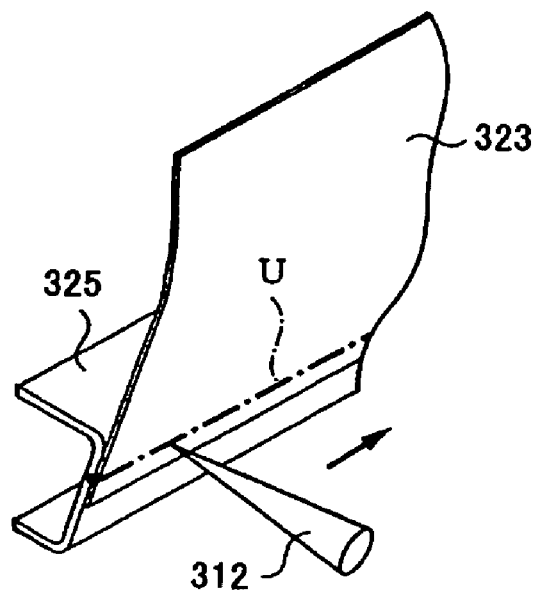
FIG. 27 is a perspective view showing a joint portion between a side outside sheathing (wainscot sheathing) and a side beam.

As shown in FIG. 27, the side outside sheathing 323 and the underframe (side beam 325) are joined together by joining a lower portion (wainscot sheathing) of the side outside sheathing 323 to the side beam 325 having a U-shaped section by continuous laser welding using the side beam 325 as a counterforce receiver.

Figure 28:
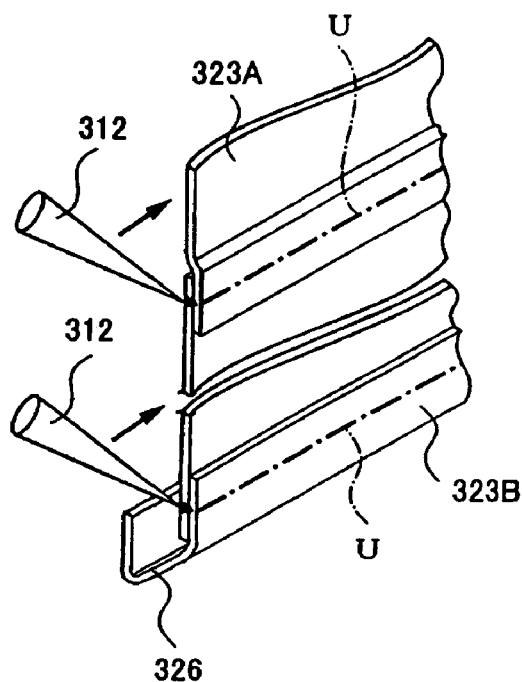
FIG. 28(a) is an explanatory view illustrating a joint portion of a side outside sheathing.
FIGS. 28(b) and 28(c) are each an explanatory view illustrating a joint portion of a side outside sheathing.
Figure 28:
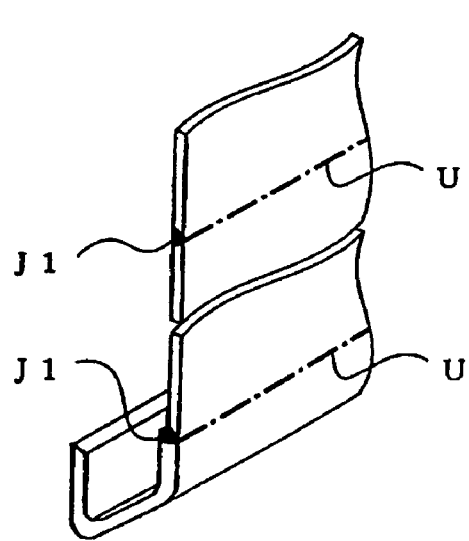
Figure 28:
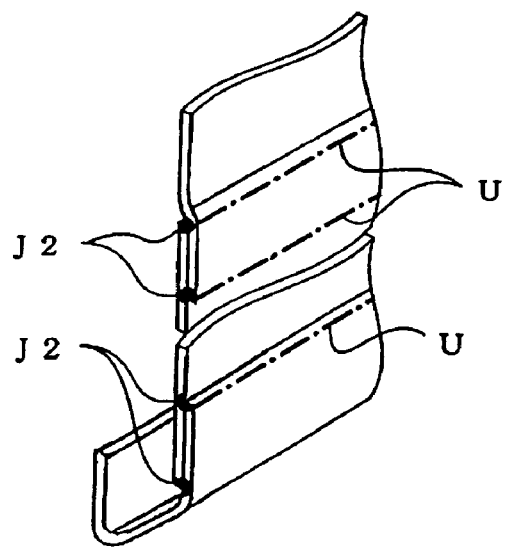

With respect to the side outside sheathing, a lap joint is formed by joining lapped end portions of respective outside sheathings 323A and 323B together or lapped portions of respective of the outside sheathing 323B and a frame member 326 (edging member of an opening portion) together by continuous laser welding. Because continuous laser welding is performed on construction units of respective of the outside sheathings 323A and 323B or construction units of respective of the outside sheathing 323B and the frame member 326 in a condition set on a jig prior to the assemblage of the body structure, there is no need to provide any counterforce receiver. Beside such a lap joint, a butt joint J1 and lap fillet weld joint as shown in FIGS. 28(b) and 28(c) are possible.

In laser-welding the outside sheathing 323B and the frame member 326 (edging member of the opening portion) to each other, if the thickness of the plate material forming the frame member 326 is comparable to or smaller than that of the outside sheathing 323B, weld scorch and edge bend occur on the surface of the outside sheathing 323B and, as the case may be, the weld bead is pierced through. In such a case, a weld mark appears around the opening portion, thus impairing the outward appearance in aesthetic terms.

Figure 29:
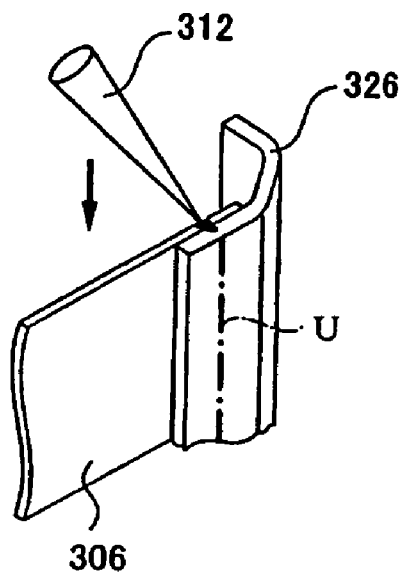
FIG. 29 is a perspective view showing a joint portion between a side outside sheathing and an edging member.

To avoid such an inconvenience, the edging member 326 located on the outside surface, such as a window frame or a door mask, may comprise a thick plate that is thicker than the outside sheathing 306 as shown in FIG. 29. If the plate thickness of the edging member 326 located on the outside surface is not less than 3 mm, the weld line U can be rendered substantially invisible irrespective of the type and condition of surface finishing.

Figure 30:
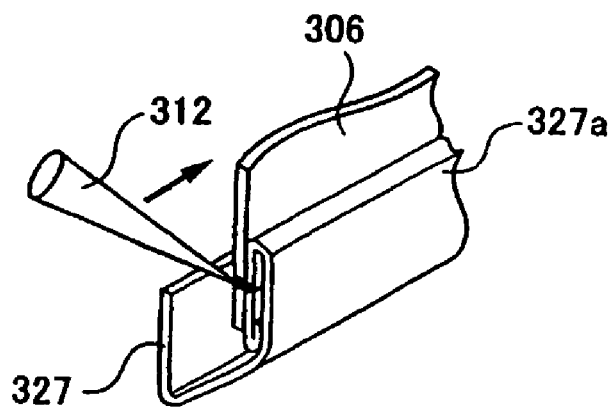
FIG. 30 is a perspective view showing a joint portion between a side outside sheathing and an edging member.

If the plate material forming the edging member 326 forming the lap joint is rolled to form a roll part 327a defining a space therewithin as shown in FIG. 30, the outside surface of the structure will not be affected even by piercing welding. Such a roll part 327a can be formed by drawing or roll diffusion bonding or by V-bending a plate material by press or pressing a steel tube. Within the roll part 327a, inner plate surfaces may be brought into contact with each other without defining the space. The space need not necessarily be defined within the roll part 327a, but it is sufficient for the portion of the edging member 327 joined to the outside sheathing 306 to have a folded plate structure formed by folding a flat plate.

By so doing, it is possible to retain the watertightness with an unnecessary weight increase suppressed, as well as to further enhance the design characteristics. If three plates have to be lapped one over another in the manner of frame+outside sheathing+framework member, the roll part thus structured, which is free from being pierced through, allows lap welding of the three plates at a time.

It is possible to eliminate, for example, a window frame if the outside sheathing of a pier panel part comprises a thick plate (not less than 3 mm) as described above. In this case, the parts count can be lowered.

In laser lap welding, a hold-down roller 331 (having a diameter of about 100 mm), which is movable together with a laser beam, is used to ensure intimate contact between the lap portions as well as to keep the focal length of the laser beam accurate. This hold-down roller 331 is configured to move together with the laser beam and press a portion of reinforcement member 307 to be joined to the outside sheathing 306 against the outside sheathing 306 during laser-welding of the reinforcement member 307 to the outside sheathing 306.

If the edging member 332 (a frame such as a window frame or a door mask) is attached to end portions of the outside sheathing reinforcement members 307 before laser welding, the edging member 332 interferes with the hold-down roller 331 and hence does not allow continuous laser welding up to such an end portion to be achieved. For this reason, it has been a conventional practice to perform welding with the hold-down roller 331 removed, which requires very much man-hour. On the contrary, if the edging member 332 is attached after laser welding, the outside sheathing reinforcement member 307 might interfere with the hold-down roller 331, thus making continuous laser welding impossible.

To avoid such an inconvenience, the edging member 332 may be formed with a notch 332b which enables the hold-down roller 331 to advance to a location adjacent the end portion of the outside sheathing reinforcement member 307, the notch 332b being formed by cutting off only the portion (of flange 332a or the like) of the edging member 322 in which the hold-down roller 331 is expected to pass. This feature allows the outside sheathing 306 and the outside sheathing reinforcement member 307 to be laser-welded to each other quickly and accurately in one step without the need to remove the hold-down roller 331.

Figure 31:
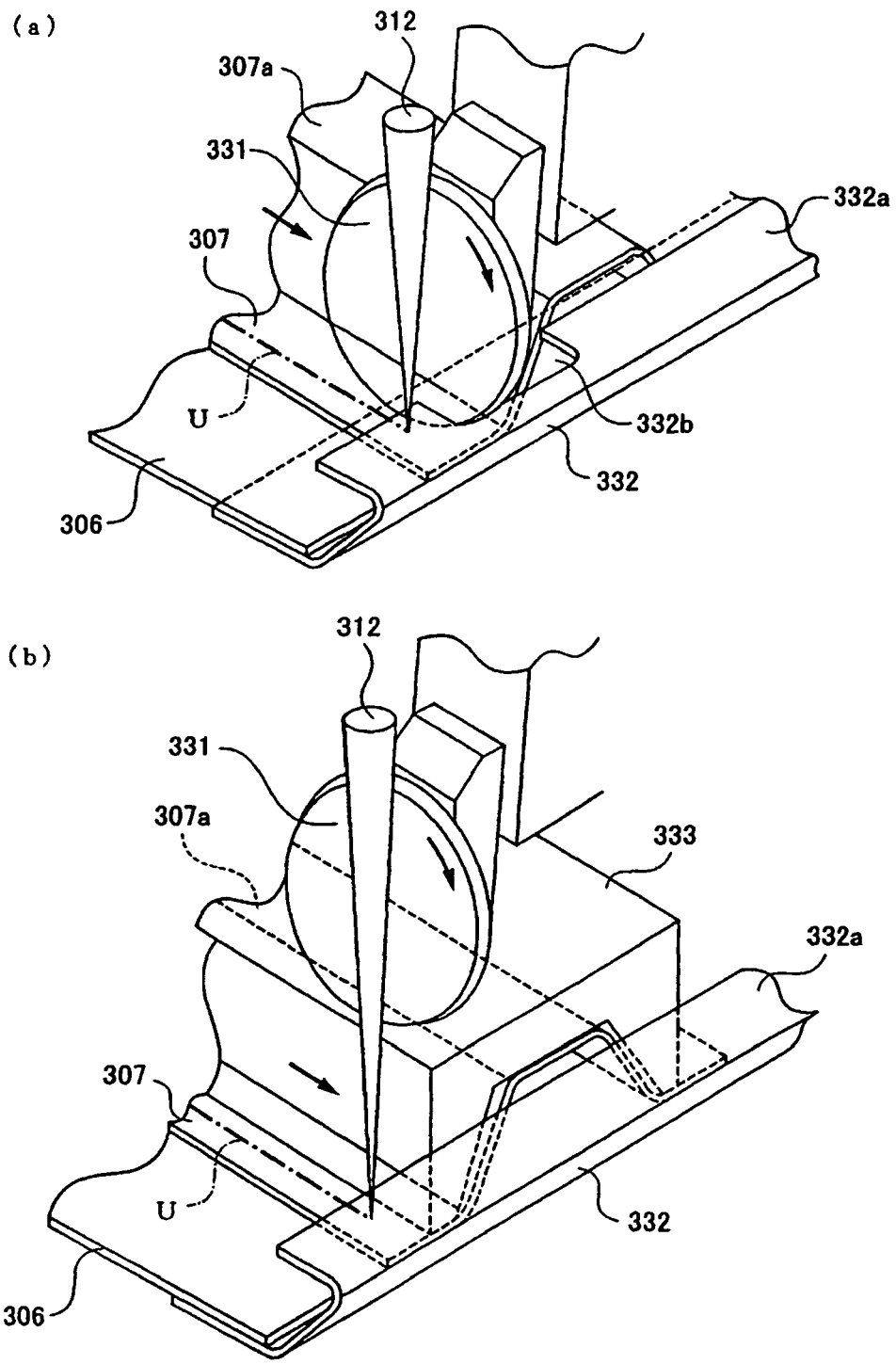
FIG. 31(a) is an explanatory view illustrating a method of joining an outside sheathing reinforcement member.
FIG. 31(b) is an explanatory view illustrating another method of joining an outside sheathing reinforcement member.
Figure 32:
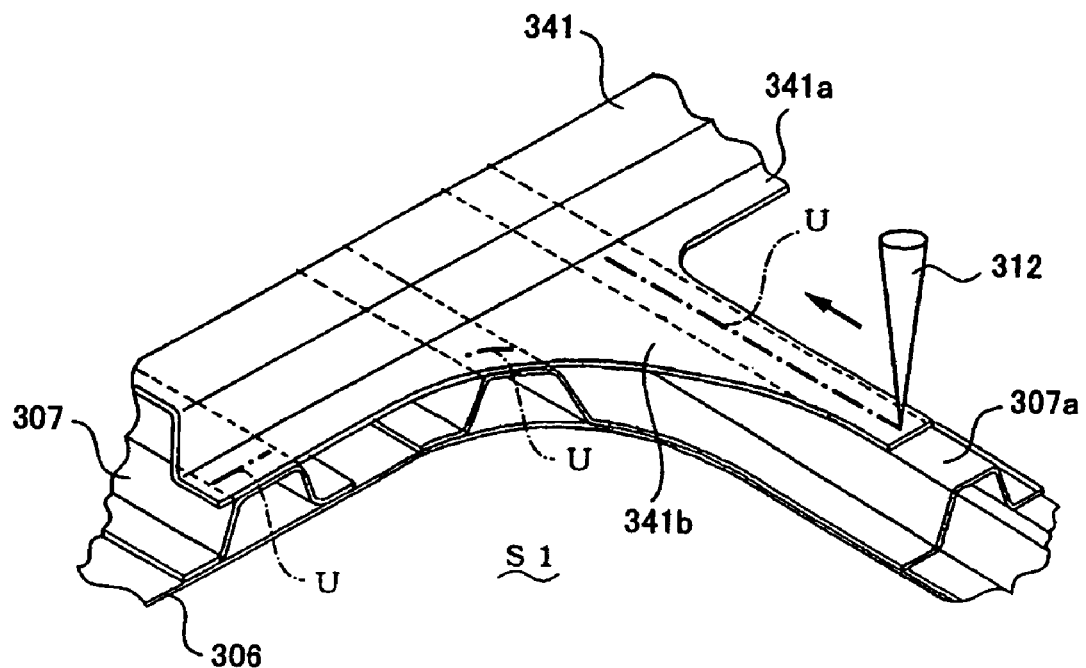
FIG. 32 is a perspective view showing another example of a corner part of the opening portion.

Alternatively, it is possible to place an elongate hold-down jig 333 having a larger height than the edging member 332 on the outside sheathing reinforcement member 307 and hold down the outside sheathing reinforcement member 307 from above the jig 333 by means of the hold-down roller 331 acting on the outside sheathing reinforcement member 307 through the jig 333, as shown in FIG. 31(b).

This feature has a merit that the outside sheathing reinforcement member 307 can be welded to the outside sheathing 6 up to the end portion of the reinforcement member 307 without modifying any structural member.

In order to obtain a stainless steel body structure having a high-precision outside surface of aesthetic value, the outside surface of the outside sheathing is beautifully finished by brushing or shot blasting after assemblage of the outside sheathing panel by continuous laser welding. Alternatively, it is possible that the outside sheathing is beautifully finished by brushing or shot blasting after assemblage of the body structure by laser welding. Otherwise, weld lines may be covered with color bands. The laser-welded joint may be formed by any one of piercing lap welding, partial penetration lap welding and butt welding.

If the plate thickness of the outside sheathing 306 is not less than 3 mm, partial penetration laser welding can be performed with no weld line appearing on the outside surface regardless of the surface finishing of the outside sheathing and the weld line direction.

By merely conducting such partial penetration laser welding, the high aesthetic value of the outside sheathing can be ensured without the need to conduct any post-finishing such as brushing.

In another embodiment, weld lines on the outside sheathing are made to extend in a fixed direction, particularly, weld lines on the side outside sheathing made to extend in the longitudinal direction of the railway car. By so doing, somewhat visible weld marks resulting on the surface of the outside sheathing can be rendered inconspicuous (unnoticeable) even if the outside sheathing has a conventional plate thickness.

In this embodiment, a "floating framework structure" is employed in which continuous outside sheathing reinforcement members (horizontal framework members) are laser-welded to the outside sheathing and main frames (vertical framework members) provided on the outside sheathing reinforcement members so as to extend perpendicularly thereto.

In joining the horizontal framework members and the vertical framework members by laser welding so as to make the two types of framework members to cross each other, the above-described hold-down roller is used to ensure intimate contact between lap portions during joining. If the flange of each vertical framework member positioned on the upper side is insufficient in plate thickness or stiffness, the flange part of the vertical frame member becomes deflected along with the horizontal framework members, so that intimate contact therebetween cannot be ensured. An additional large-sized hold-down jig is needed to avoid such a problem, which will considerably worsen the productivity and the cost efficiency.

If such a remedy is taken as to make the plate thickness (2.5 mm) of each vertical framework member positioned on the upper side larger than that (1 mm) of each horizontal framework member or to fold a flange end edge portion of each vertical framework member so as to impart the vertical framework member with sufficient stiffness, the horizontal framework members can be prevented from being deflected and, hence, lap portions to be joined together can be welded with use of a simple hold-down roller. This feature is excellent in productivity and cost efficiency.

In cases where a crossing part of horizontal and vertical framework members is located adjacent a corner of an opening of the outside sheathing such as a side window or a side doorway, a large shearing force is likely to work between the horizontal and vertical framework members and, hence, a sufficient strength cannot be ensured only by the lap joint between the horizontal framework member and a narrow flange part of the vertical framework member, as the case may be.

To avoid such an inconvenience, a flange part 341a of vertical framework member 341 may be widened to form a gusset-shaped extension (hereinafter will be referred to as gusset part) 341b, thereby ensuring a sufficient joint area. In this case, the associated horizontal framework members are preferably extended to a peripheral edge so as to match the corner shape of the opening of the outside sheathing 306.

A three-dimensional gusset can be formed by joining of the aforementioned gusset part 341b to the extensions of the outside sheathing reinforcement members 307. The gusset part 314b may be a component separate from the vertical framework member 341 positioned on the upper side. It is desirable that the gusset part 314b and the extensions of the outside sheathing reinforcement members 307 be welded together by laser welding.

Such a feature makes it possible to relieve the shear stress produced on the lap portions of the horizontal framework member (reinforcement member 307) and vertical framework member 341. Further, the three-dimensional gusset can relieve the stress produced on the outside sheathing 306.

Figure 33:
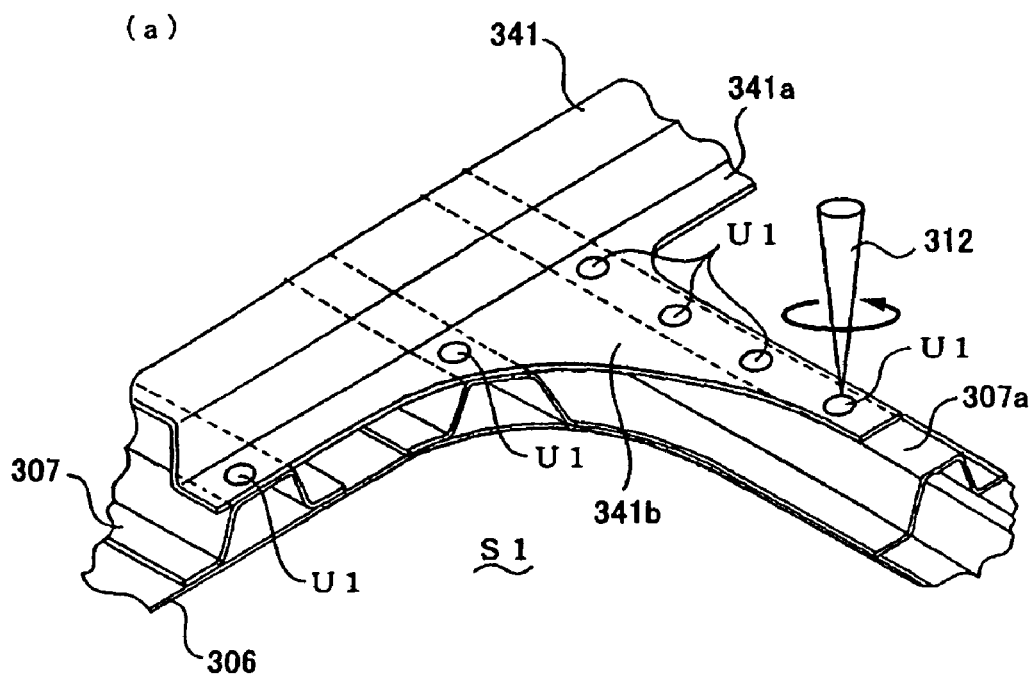
FIG. 33(a) is a perspective view showing another example of a corner part of the opening portion.
FIG. 33(b) is an explanatory view illustrating a welding method.
Figure 33:
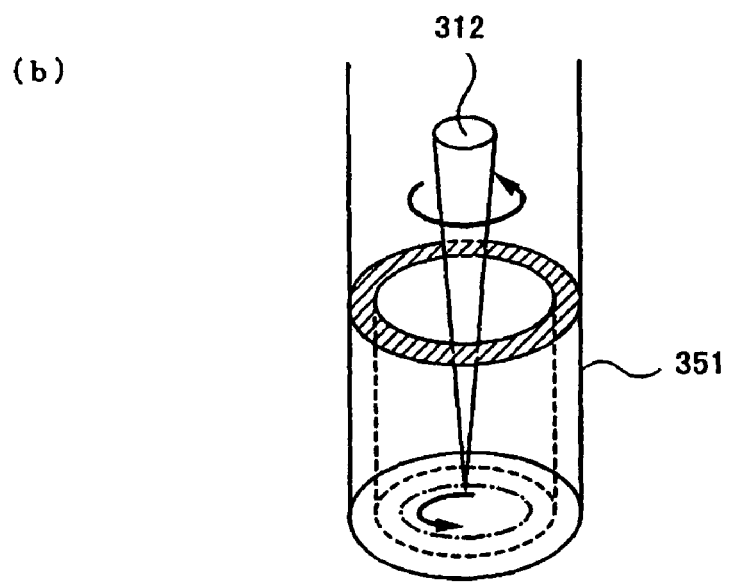

If laser welding is used for narrow and small portions such as lap portions of the horizontal framework members (outside sheathing reinforcement members 307) and the vertical framework members 341 and lap portions of the horizontal framework members (outside sheathing reinforcement members 307) and the gusset part 314b, discrete short weld lines result. For this reason, such a narrow and small portion may be subjected to such laser welding as to form a closed ring-shaped weld line U1 by rotation of the optical axis of laser beam (ring welding to form a weld line ring having a diameter of about 10 to 20 mm), as shown in FIG. 33(a). The ring diameter is appropriately determined from a joint area, required strength and the like.

By so doing, a relatively long weld line U can be ensured even in a narrow and small portion and, hence, a required strength can be obtained. In addition, fissuring can hardly occur because there is no weld end.

If a tubular hold-down jig 351 is used in ring welding as shown in FIG. 33(b), intimate contact between the upper and lower members can be ensured to allow proper laser welding to be achieved.

Figure 34:
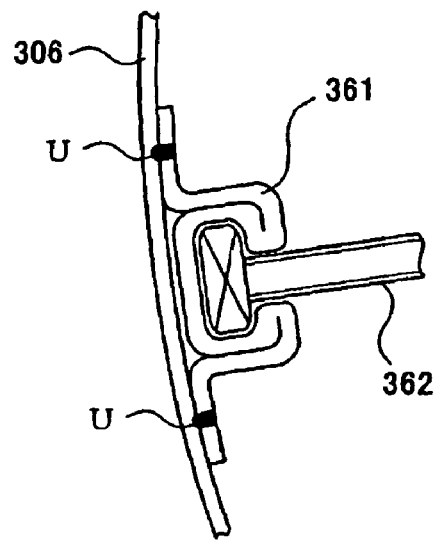
FIGS. 34(a) and 34(b) are each an explanatory view showing a mounting structure for interior trim or equipment.
Figure 34:
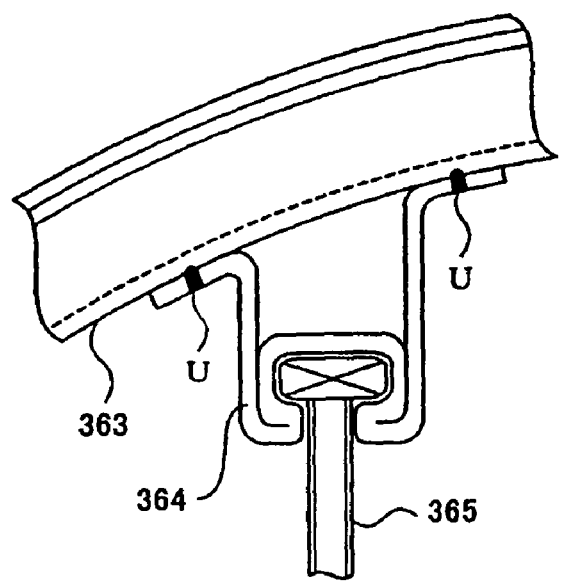

FIG. 34(a) shows one example of a structure for mounting interior trim or equipment to a side outside sheathing. As shown in FIG. 34(a), a continuous rail member 361, which is formed into a rail shape by folding a plate material, is mounted on the side outside sheathing 306 to extend in the longitudinal direction of the railway car or in the direction perpendicular thereto. This rail member 361 has a recess for engagement with the head of a fitting member 362 such as a square-headed special bolt or nut. The rail member 316 is formed by folding a single plate material in such a manner as to form double-wall portions on opposite sides of the recess and fitting portions extending from opposite end portions of the respective outer walls of the double-wall portions in opposite directions. A seat or an interior panel as the interior trim or equipment is attached to the fitting member 362 engaged with the rail member 361. In this way, the interior trim or equipment can be mounted on the side outside sheathing.

It is possible that a rail member 364 is mounted on a horizontal framework member (carline) 363 of the roof construction so as to extend in the longitudinal direction of the railway car and engaged with a fitting member 365, as shown in FIG. 34(b). Such a structure allows a unit of ceiling air duct, fluorescent lamp or the like as the interior trim or equipment to be suspended from the horizontal framework member 363 of the roof construction.

Figure 35:
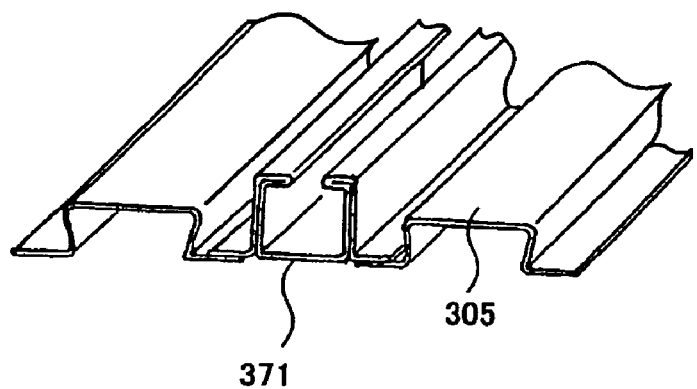
FIG. 35(a) is a detail view of a portion A shown in FIG. 24.
FIG. 35(b) is a detail view of a portion B shown in FIG. 24.
Figure 35:
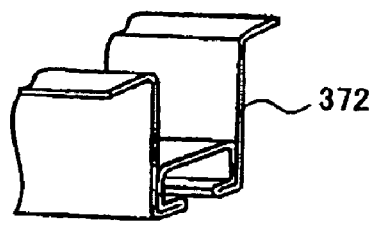

It is also possible that a rail member 371 is joined between floor boards (steel decks) 305 of the underframe so as to extend in the longitudinal direction of the railway car for seats to be mounted thereon (seat track), as shown in FIG. 35(a).

A rail member 372 may be used as a cross beam of the underframe as shown in FIG. 35(b) so as to allow underfloor equipment to be suspended therefrom.

In this case, the rail member is formed to have a rail shape by drawing or roll diffusion bonding. This continuous rail member is joined to the outside sheathing or the main frame by laser welding. Though laser welding is used to join the rail member to the main frame in this embodiment, arc welding or resistance spot welding may be used instead.

By so doing, it is possible to reduce the parts count and the man-hour for mounting secondary structural members such as internal framework and facilitate dimensional control.

The aforementioned drawing is capable of forming the rail member far more inexpensively and accurately than the common press forming. As a result, precise fitting of the head of a fitting member into the rail can be realized.

The subsequent description will be made of a method of assembling a side construction and a method including preparing plural divided units to form a side construction and then joining these units together by laser welding.

Figure 36:
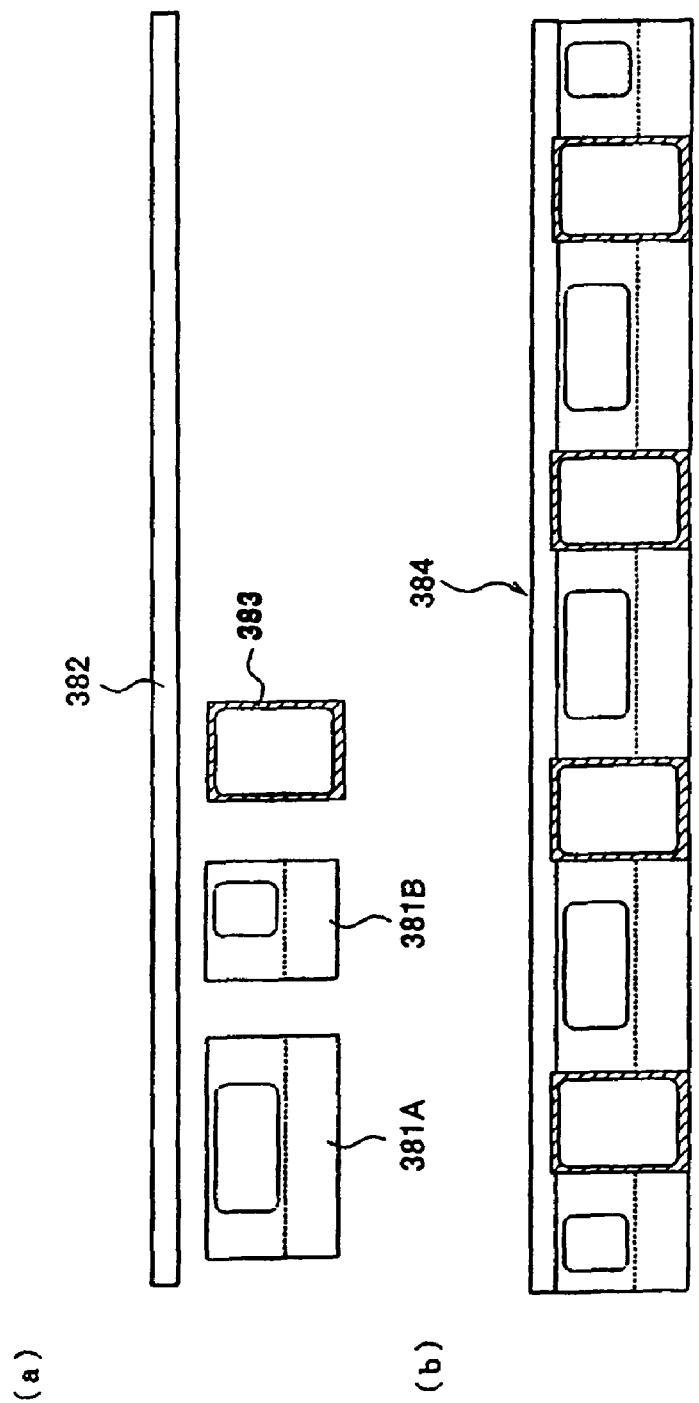
FIGS. 36(a) and 36(b) are explanatory views illustrating a method of assembling a side construction.

(1) According to a first method, two types of side units 381A and 381B, a frieze board unit 382 and a door mask 383 are manufactured separately and then joined together to form a side construction 384 by laser welding, as shown in FIGS. 36(a) and 36(b). In this case, the side units 381A and 381B and the frieze board unit 382 may be assembled by laser welding.

Figure 37:
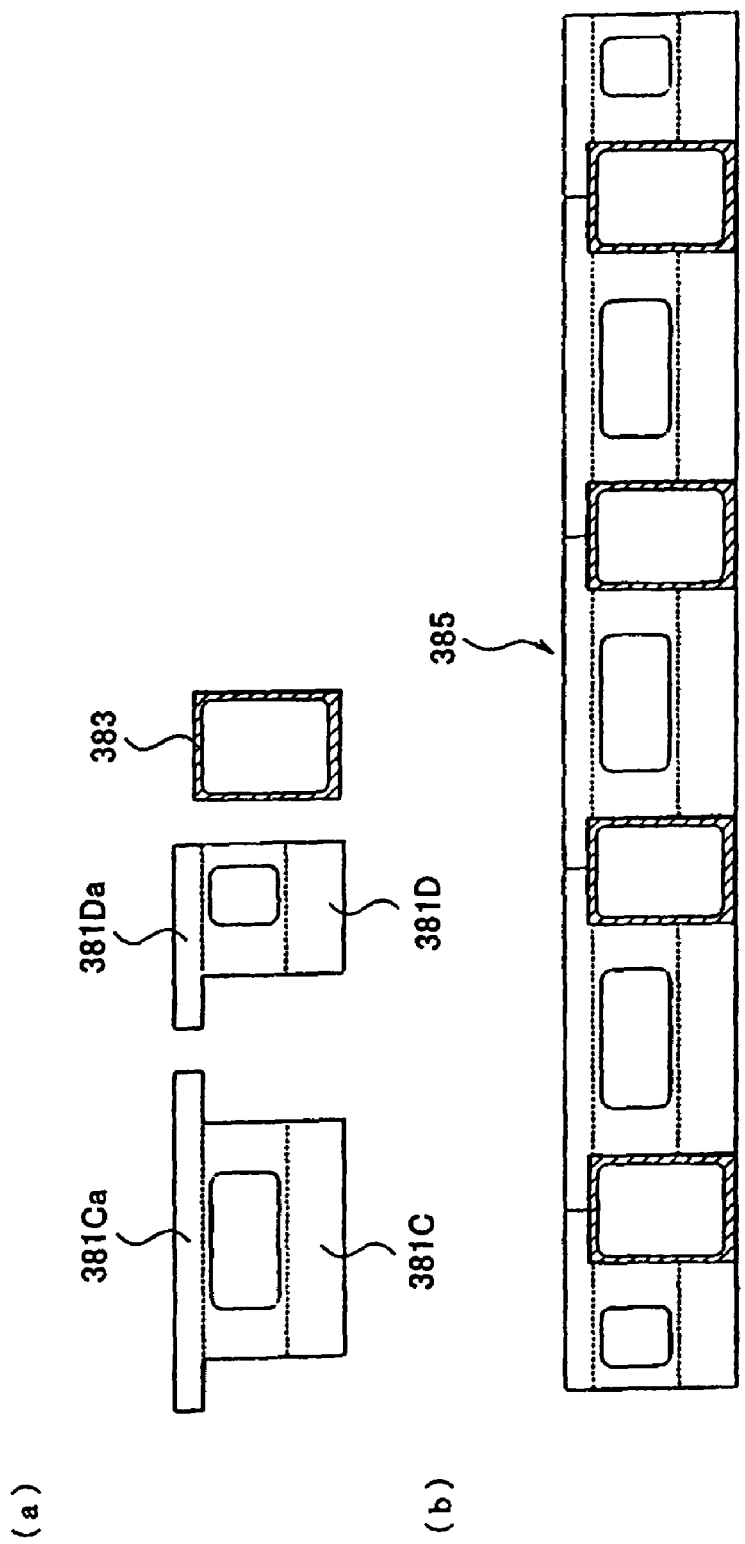
FIGS. 37(a) and 37(b) are explanatory views illustrating a method of assembling a side construction.

(1) According to a second method, side units 381C and 381D including respective frieze board parts 381Ca and 381Da and the door mask 383 are manufactured separately and then joined together to form a side construction 385 by laser welding, as shown in FIGS. 37(a) and 37(b).

The aforementioned side units 381C and 381D are assembled by laser welding. The door mask 383 is also joined by laser welding. The frieze board parts 381Ca and 381Da of the side unit 381C and 381D are joined to each other by laser welding or arc welding.

Figure 38:
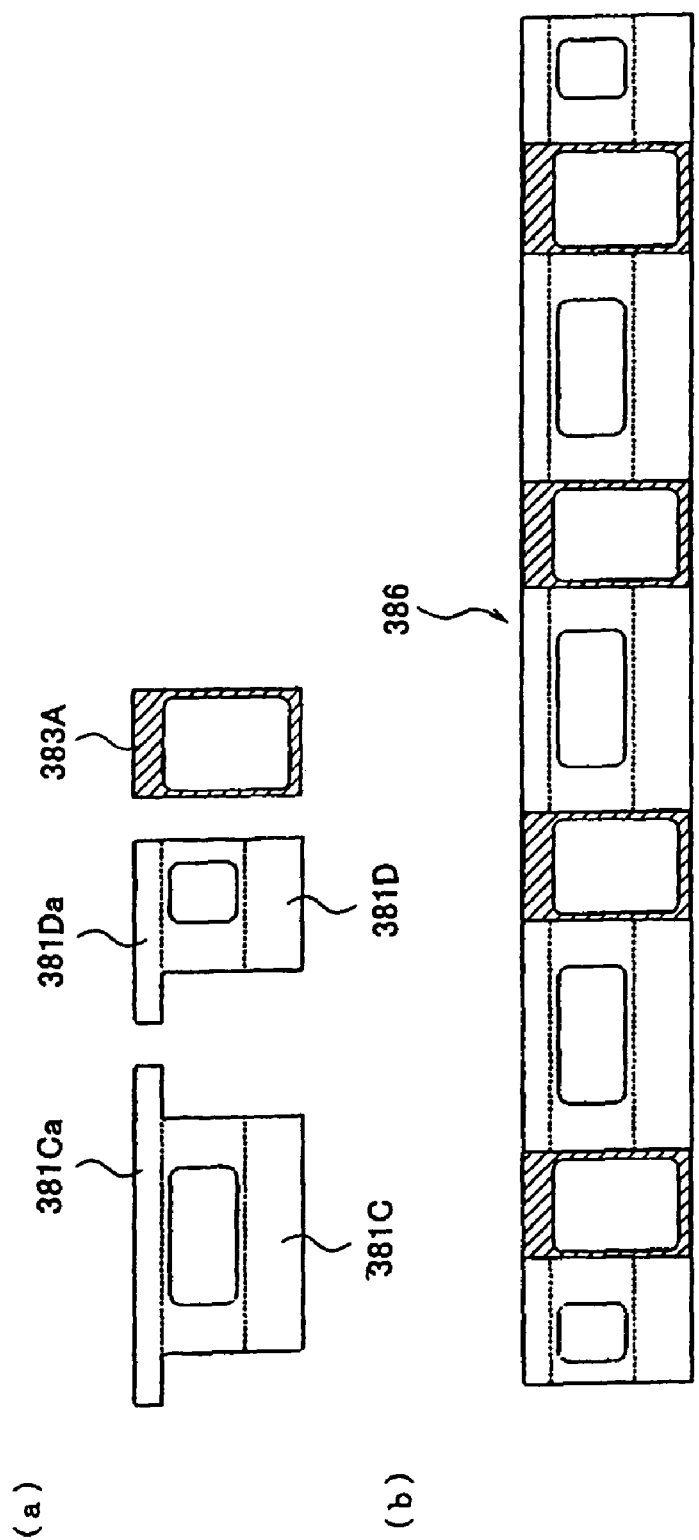
FIGS. 38(a) and 38(b) are explanatory views illustrating a method of assembling a side construction.

(3) According to a third method, side units 381C and 381C including respective frieze board parts 381Ca and 381Da, and a door mask 383A extending to cover the frieze board part are manufactured separately and then joined together to form a side construction 386 by laser welding, as shown in FIGS. 38(a) and 38(b). The extension of the door mask 383A covering the frieze board part is located exteriorly of the frieze board parts 381Ca and 381Da of the respective side units 381C and 381D.

The side units 381C and 381D are assembled by laser welding. The method of joining the door mask 383A and the method of joining the frieze board parts 381Ca and 381Da of the respective side units 381C and 381D are the same as described above.

Figure 39:
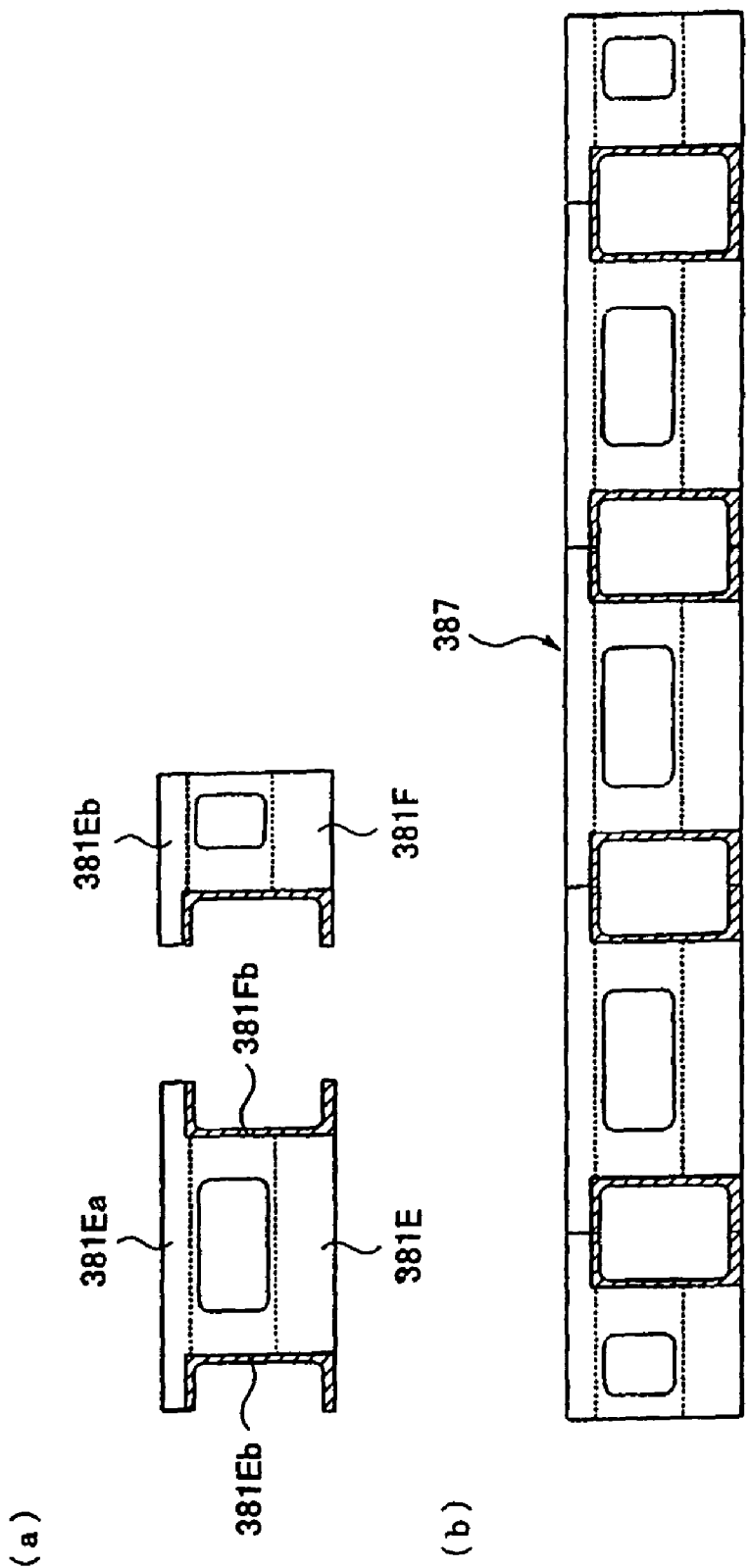
FIGS. 39(a) and 39(b) are explanatory views illustrating a method of assembling a side construction.

(4) According to a fourth method, side units 381E and 381F including respective door mask mating halves 381Ea and 381Fa and respective frieze board parts 381Ea and 381Fa are manufactured separately and then joined together to form a side construction 387 by laser welding, as shown in FIGS. 39(a) and 39(b).

The side units 381E and 381F are assembled by laser welding.

These methods are advantageous in enhancing the speed at which each of the side constructions 384 to 387 is constructed, improving the side outside sheathing in aesthetic terms, rendering each side construction sealless with its watertightness ensured, and improving the dimensional accuracy.

Figure 40:
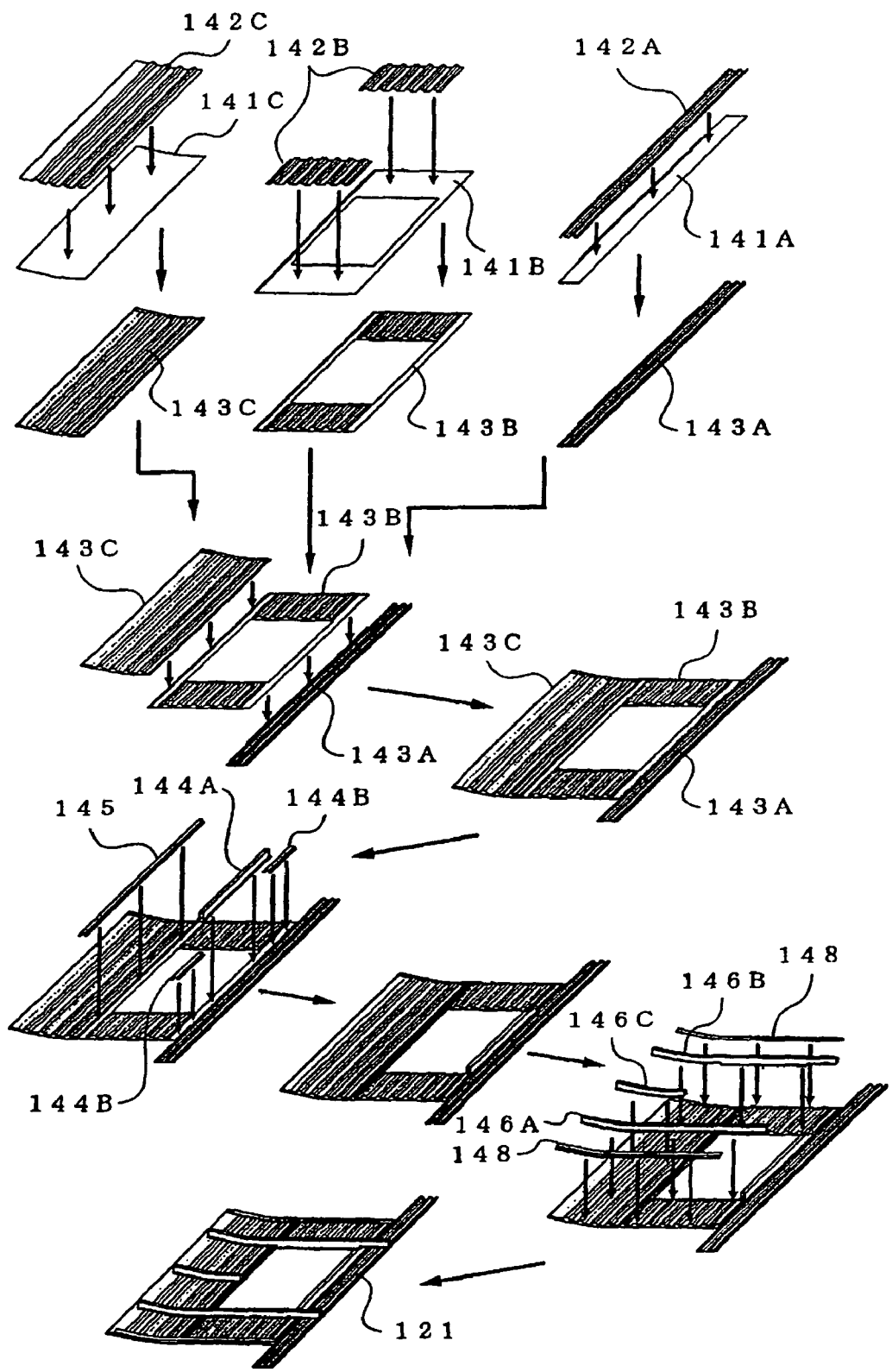
FIG. 40 is an explanatory view illustrating one exemplary procedure for assembling a side construction for rolling stock according to the present invention.

According to a method of assembling each of the aforementioned side units 381A to 381F, wainscot sheathing 141A, pier plate 141B and frieze board 141c are divisions of the side outside sheathing, and their respective outside sheathings 141A to 141C are joined with respective outside sheathing reinforcement members 142A to 142C by laser welding to form wainscot panel 143A, pier panel 143B and frieze board panel 143C, as shown in FIG. 40 for example.

In this case, the outside sheathing 141A and the flange part of the outside sheathing reinforcement member 142A form a lap joint, and partial penetration laser welding is conducted from the outside sheathing reinforcement member 142A side to join the two together, as shown in FIGS. 41(a) to 41(d). This holds true for the joint between the outside sheathing 141B and the outside sheathing reinforcement member 142B and the joint between the outside sheathing 141C and the outside sheathing reinforcement member 142C. Note that a window frame (not shown) is previously joined to the pier plate 141B by laser welding in a similar manner.

Figure 42:
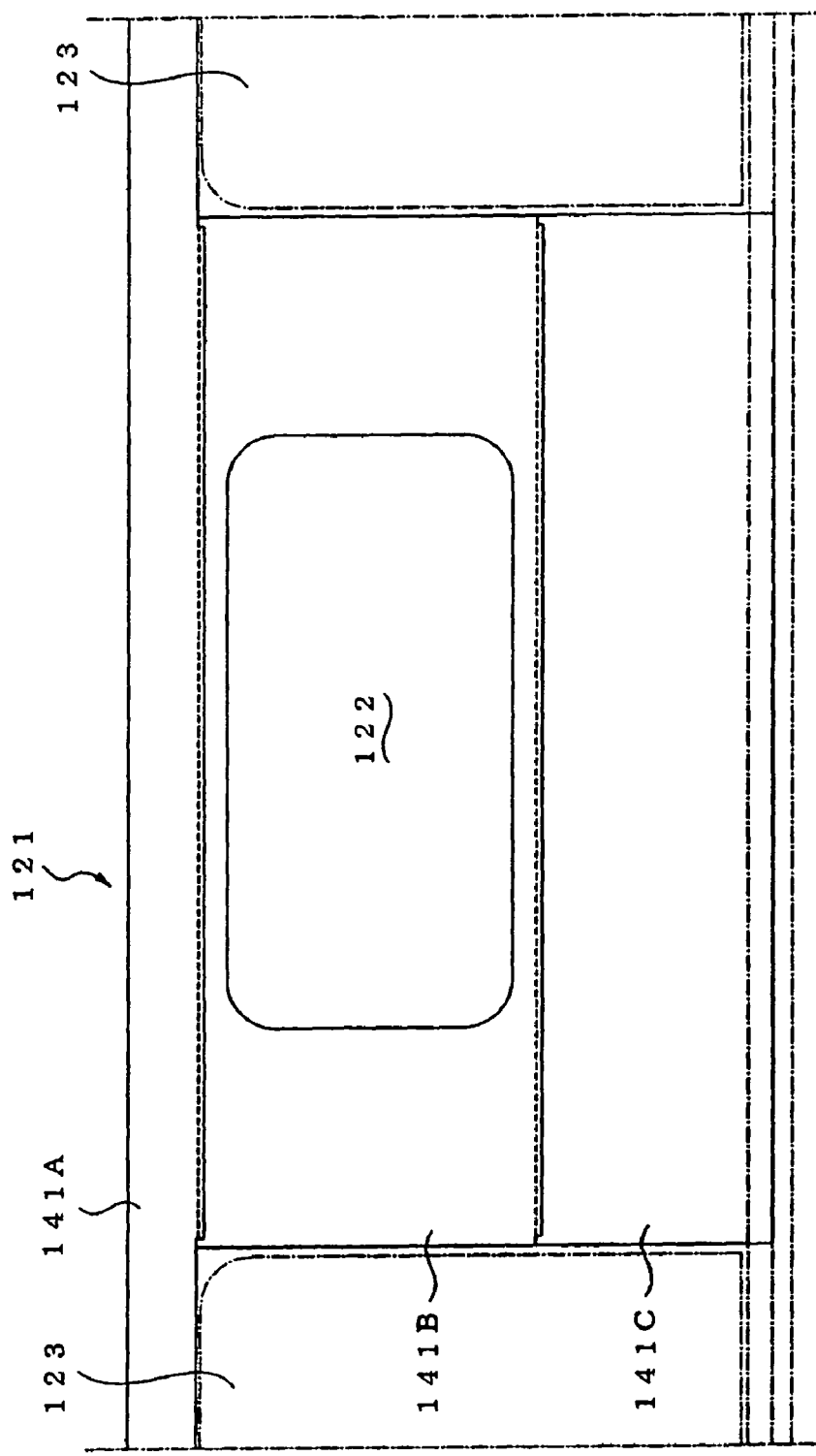
FIG. 42 is a view showing a side construction for rolling stock according to the second embodiment of the present invention as viewed from the outside of the railway car.

The pier plate 141B and the frieze board 141C having respective lower end edges each formed with a joggled portion. Lap joints are formed between the joggled portion of the lower end edge of the pier plate 141B and the upper end of the wainscot sheathing 141A and between the joggled portion of the lower end edge of the frieze board 141C and the upper end of the pier plate 141B by laser welding to form a side unit 121 (see FIG. 42). Note that reference numerals 122 and 123 denote a window opening portion and a doorway opening portion, respectively.

Figure 43:
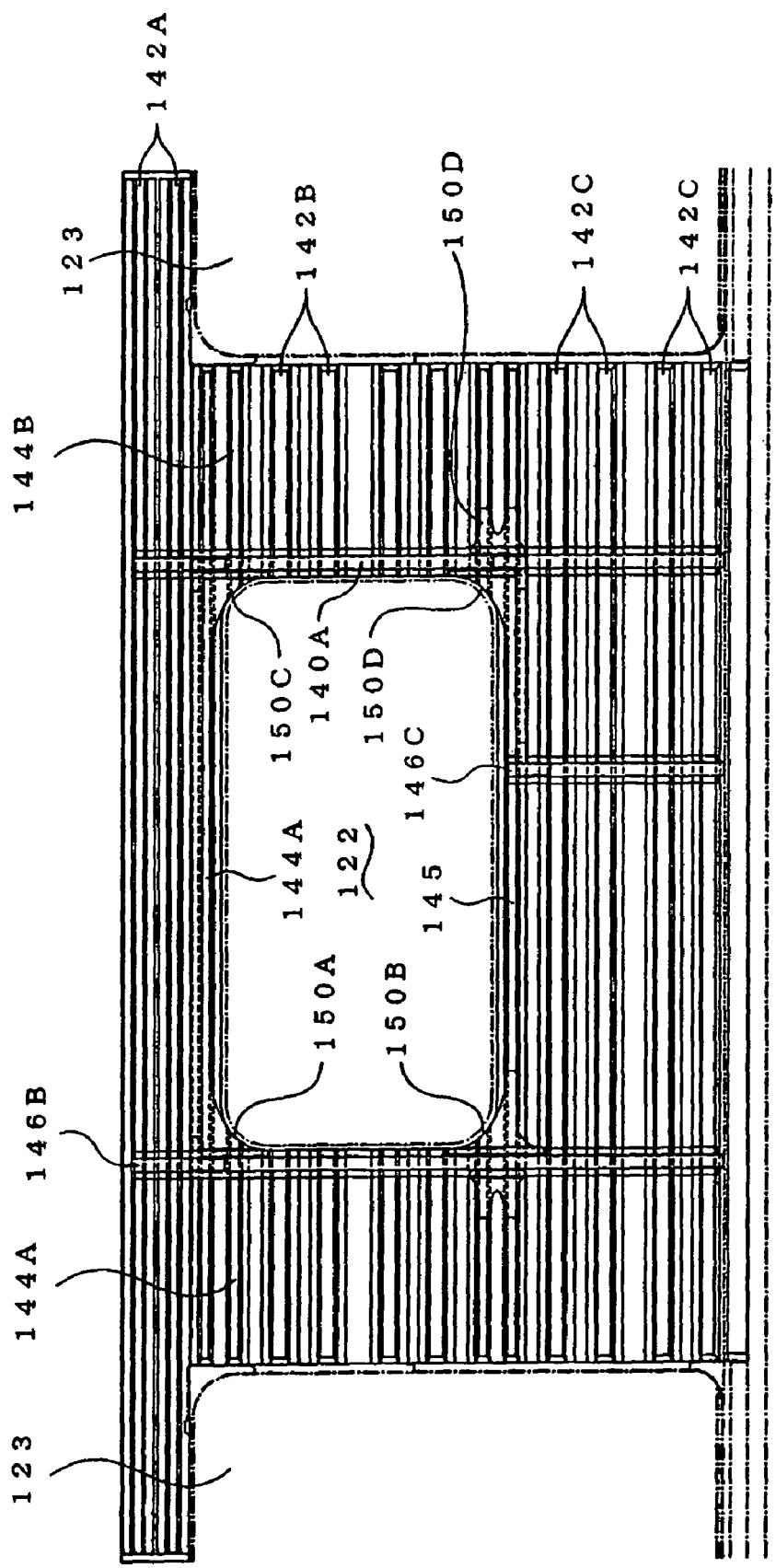
FIG. 43 is a view showing the side construction for rolling stock as viewed from the inside of the railway car.

Further, belt rail 145 and window heads 144A and 144B, which are located at the respective lap joints, are joined to the outside sheathing by laser welding (see FIG. 43). The belt rail 145 and window heads 144A and 144B may be previously joined to the pier plate 141B if these members can be positioned so as not to hinder the laser welding between the wainscot panel 143A and the pier panel 143B or between the pier panel and the frieze board panel.

Figure 41:
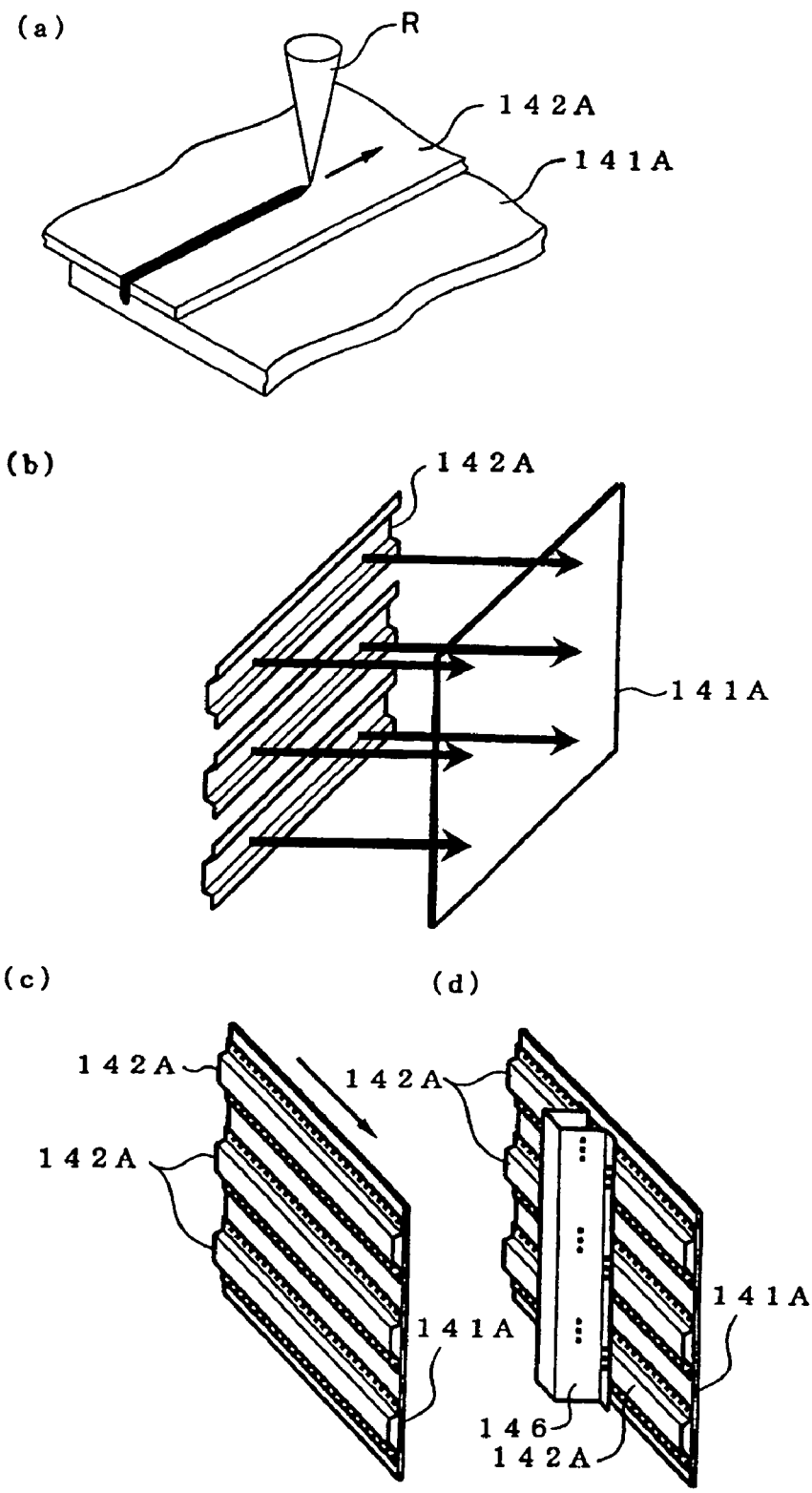
FIG. 41(a) is an explanatory view illustrating the principle underlying a laser-welded joint according to the present invention.
FIGS. 41(b) to 41(d) are each an explanatory view illustrating an outside sheathing panel according to the present invention.

Subsequently, the vertical posts 146 including front and rear door end posts 146A and 146B and intermediate post 146C are joined to the top of each of the outside sheathing reinforcement members 142A by laser welding (see FIGS. 40, 41(d) and 43). The weld line resulting from the laser welding may be either a short weld line or a ring-shaped weld line ensuring further stabilized joint strength. Reference numeral 148 denotes a doorframe.

Figure 44:
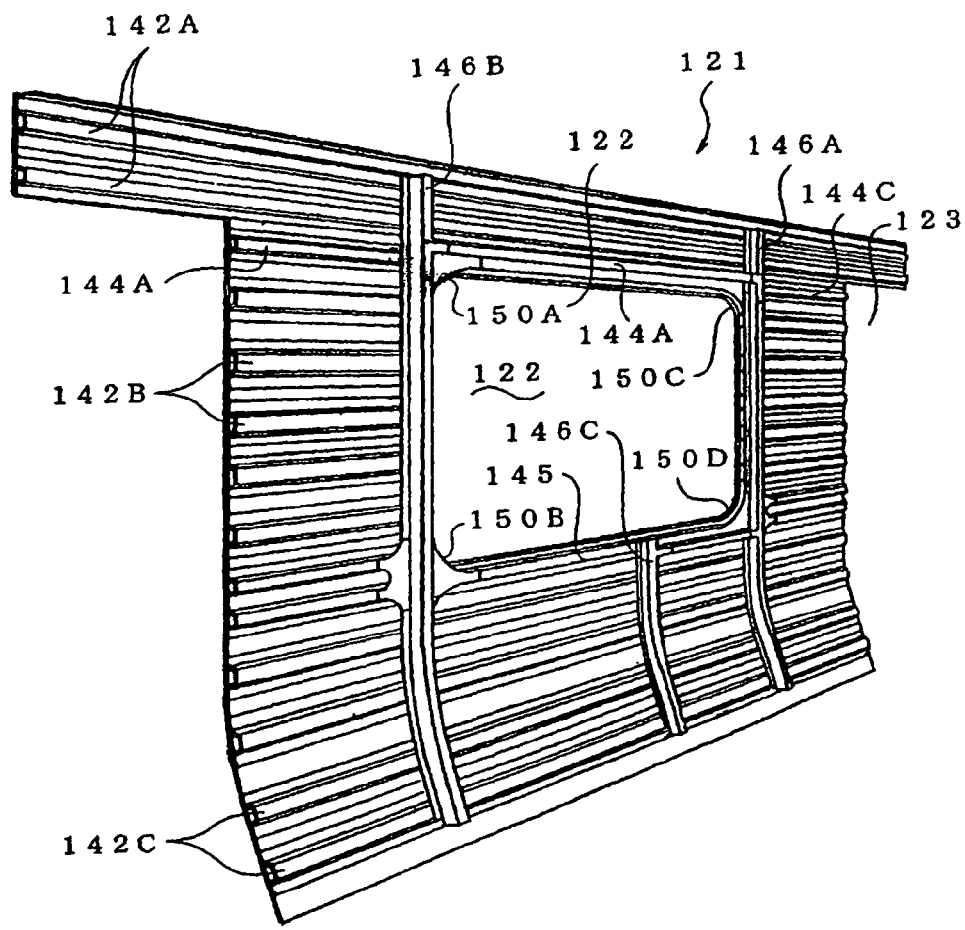
FIG. 44 is a perspective view showing the side construction as viewed from the inside of the railway car.
Figure 45:
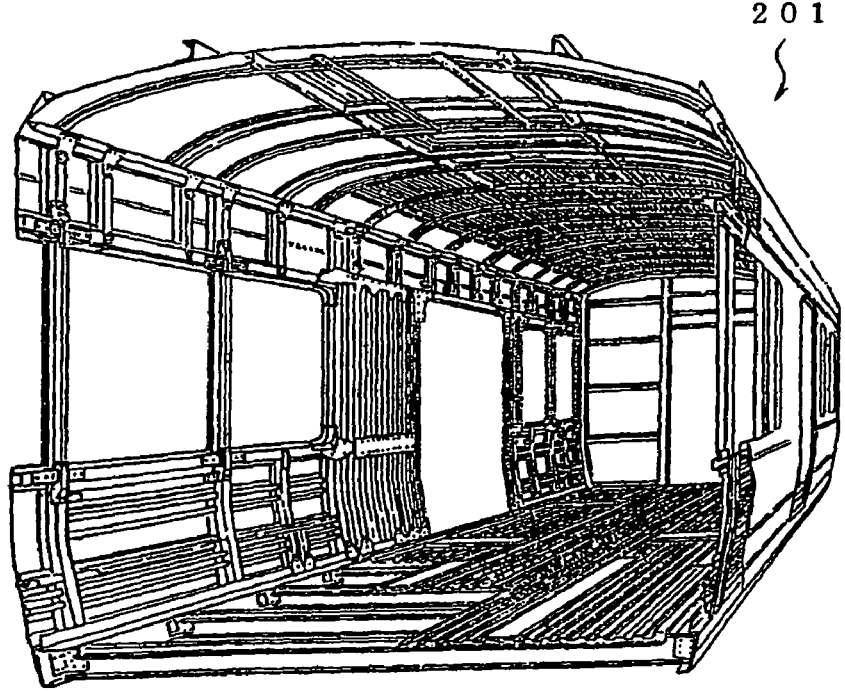
FIGS. 45(a) and 45(b) are each an explanatory view illustrating a conventional stainless steel body structure.
Figure 45:
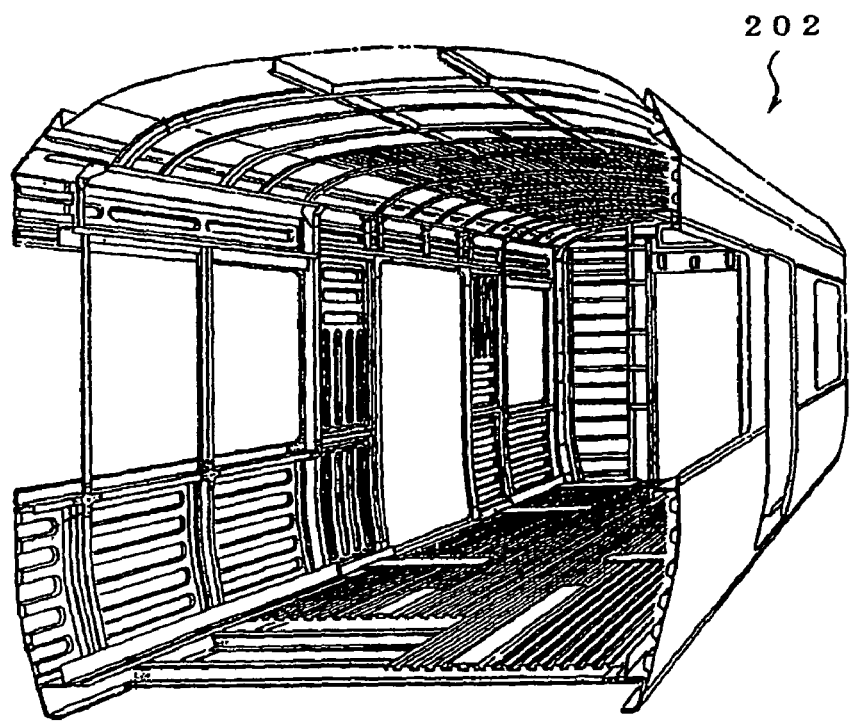
Figure 46:
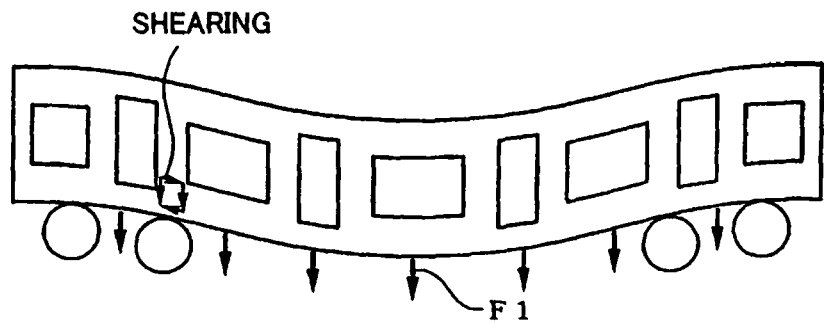
FIGS. 46(a) and 46(b) are each an explanatory view illustrating a conventional body structure for rolling stock in a deformed condition.
FIG. 46(c) is an explanatory view illustrating the relation between an outside sheathing and outside sheathing reinforcement members according to a conventional technique.
Figure 46:
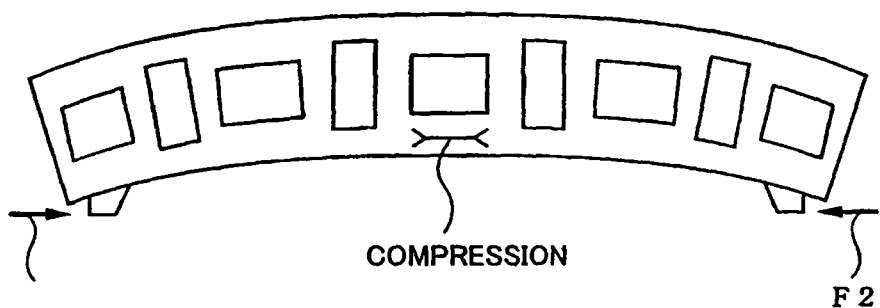
Figure 46:
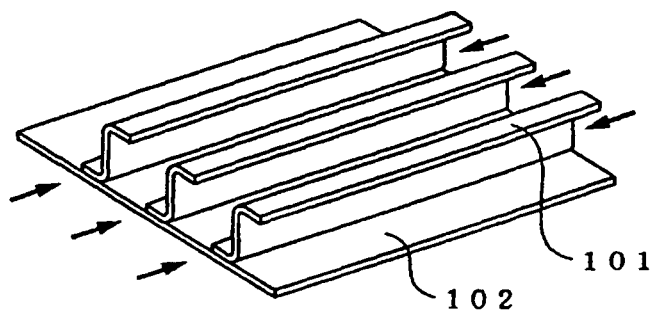

Finally, gussets 150A to 150D are joined to respective portions each located on and around each of the joints between the door end post 146B and the belt rail 145 and between the door end post 146B and the window heads 144A and 144B by laser welding, thus completing the side unit 121 (see FIG. 44).

The side unit manufacturing method described above is applicable to any one of the end construction unit, roof construction unit and underframe unit.

In the case of the roof construction unit, roof outside sheathings are joined to each other by continuous laser welding and then carlines are joined to the roof outside sheathings by laser welding from the outside sheathing side. Since the roof construction does not call for a high aesthetic value, the laser welding for the roof construction may be either of piecing welding and partial penetration welding.

In the case of the underframe unit, side beams and cross beams are joined together using gussets by laser welding or resistance spot welding to form framework and then a floor board comprising steel decks is joined to the cross beams by laser welding from the floor board side. Since the lower part of the underframe and the floor board surface become blind spots or hidden portions which do not call for any aesthetic value when the railway car is completed, the laser welding used therefor may be either of piecing welding and partial penetration welding.

Finally, the body structure for rolling stock is assembled by joining the right and left side units, roof unit, underframe unit and front and rear end units together according to the methods illustrated in FIGS. 25 to 37.

It should be noted that the foregoing embodiments are merely illustrative and may be modified variously without departing from the spirit of the present invention and, hence, the present invention is not limited to the foregoing embodiments.

The invention claimed is:

1. A laser welding method comprising the steps of:
lapping plural plate members one over another;
continuously irradiating one of the lapped plate members with a moving laser beam from an antiplane direction to heat said lapped plate members until a region extending to an inner portion of another one of said lapped plate members which is positioned on an opposite side away from the plate member irradiated with the laser beam becomes molten; and
joining said plural plate members together while controlling the laser power or moving speed of the laser beam so as not to allow a bottom portion of a resulting molten pool to reach an outside surface of said plate member positioned on the opposite side,
the laser welding method characterized by previously polishing the outside surface of said opposite-side plate member substantially in parallel with the direction of a weld line to be formed by the laser beam.

2. A laser-welded joint comprising plural plate members joined together by:
lapping said plural plate members one over another;
continuously irradiating one of the lapped plate members with a moving laser beam from an antiplane direction to heat said lapped plate members until a region extending to an inner portion of another one of said lapped plate members which is positioned on an opposite side away from the plate member irradiated with the laser beam becomes molten; and
joining said plural plate members together while controlling the laser power or moving speed of the laser beam so as not to allow a bottom portion of a resulting molten pool to reach an outside surface of the plate member positioned on the opposite side,
the laser-welded joint characterized in that the outside surface of said opposite-side plate member is polished substantially in parallel with the direction of a weld line formed by the laser beam.

3. An outside sheathing panel comprising an outside sheathing, and a first reinforcement member lapped over said outside sheathing interiorly of said outside sheathing, said outside sheathing and said first reinforcement member being joined together by being continuously irradiated with a moving laser beam from the first reinforcement member side so as to be heated until a region extending to an inner portion of said outside sheathing becomes molten with the laser power or moving speed of the laser beam controlled so as not to allow a bottom portion of a resulting molten pool to reach an outside surface of said outside sheathing,
the outside sheathing panel characterized in that the outside surface of said outside sheathing is polished substantially in parallel with the direction of a weld line formed by the laser beam.

4. A body structure for rolling stock comprising an outside sheathing panel as a side outside sheathing of a side construction, said outside sheathing panel comprising an outside sheathing, and a first reinforcement member lapped over said outside sheathing interiorly of said outside sheathing, said outside sheathing and said first reinforcement member being joined together by being continuously irradiated with a moving laser beam from the first reinforcement member side so as to be heated until a region extending to an inner portion of said outside sheathing becomes molten with the laser power or moving speed of the laser beam controlled so as not to allow a bottom portion of a resulting molten pool to reach an outside surface of said outside sheathing,
the body structure characterized in that the outside surface of said outside sheathing of said outside sheathing panel is polished substantially in parallel with the direction of a weld line formed by the laser beam; and the direction of said weld line coincides with a specific direction.

5. The body structure for rolling stock according to claim 4, wherein:
said first reinforcement member has a portion shaped like a hat in section; and
said portion has a body part substantially U-shaped in section and flange parts extending continuously from opening defining edges of said body part in opposite directions and joined to said outside sheathing by laser welding, said body part extending in a longitudinal direction of a railway car.

6. The body structure for rolling stock according to claim 5, wherein:

the substantially U-shaped section of said body part defines therein a space gradually widening as said space extends toward the open side;

said first reinforcement member is provided on the opposite side away from said outside sheathing with a second reinforcement member which is shaped like a hat in section and extends in a direction perpendicular to said first reinforcement member; and said second reinforcement member has flange portions joined to said body part of said first reinforcement member.

* * * * *